United States Patent
Snydacker et al.

(10) Patent No.: US 10,648,090 B2
(45) Date of Patent: *May 12, 2020

(54) INTEGRATED SYSTEM FOR LITHIUM EXTRACTION AND CONVERSION

(71) Applicant: Lilac Solutions, Inc., Middletown, RI (US)

(72) Inventors: David Henry Snydacker, San Francisco, CA (US); Alexander John Grant, San Francisco, CA (US); Ryan Ali Zarkesh, Richmond, CA (US)

(73) Assignee: LILAC SOLUTIONS, INC., Middletown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,697

(22) Filed: Mar. 27, 2019

(65) Prior Publication Data

US 2019/0256987 A1    Aug. 22, 2019

Related U.S. Application Data

(63) Continuation of application No. PCT/US2019/017885, filed on Feb. 13, 2019.

(Continued)

(51) Int. Cl.
*B01D 15/36* (2006.01)
*B01D 61/42* (2006.01)
(Continued)

(52) U.S. Cl.
CPC .............. *C25B 1/46* (2013.01); *B01D 9/0018* (2013.01); *B01D 9/0059* (2013.01); *B01D 15/362* (2013.01); *B01D 61/422* (2013.01); *B01J 39/02* (2013.01); *B01J 39/05* (2017.01); *B01J 39/07* (2017.01); *B01J 39/09* (2017.01); *B01J 39/10* (2013.01); *B01J 39/12* (2013.01); *B01J 39/19* (2017.01); *B01J 47/016* (2017.01);
(Continued)

(58) Field of Classification Search
CPC ...... C02F 1/42; C02F 1/46104; C02F 1/4618; C02F 2001/46185; C02F 2001/4619; C02F 2001/46195

See application file for complete search history.

(56) References Cited

U.S. PATENT DOCUMENTS

| 3,793,433 A | 2/1974 | Seeley et al. |
| 4,116,858 A | 9/1978 | Lee et al. |

(Continued)

FOREIGN PATENT DOCUMENTS

| CN | 101961634 A | 2/2011 |
| CN | 102872792 A | 1/2013 |

(Continued)

OTHER PUBLICATIONS

Chitrakar et al. Lithium recovery from salt lake brine by H2TiO3. Dalton Trans 43:8933-8939 (2014).

(Continued)

*Primary Examiner* — Salil Jain
(74) *Attorney, Agent, or Firm* — Wilson Sonsini Goodrich & Rosati

(57) ABSTRACT

The present invention relates to the extraction of lithium from liquid resources, such as natural and synthetic brines, leachate solutions from clays and minerals, and recycled products.

20 Claims, 11 Drawing Sheets

Related U.S. Application Data

(60) Provisional application No. 62/781,515, filed on Dec. 18, 2018, provisional application No. 62/631,688, filed on Feb. 17, 2018.

(51) Int. Cl.

| | | |
|---|---|---|
| *B01D 9/00* | (2006.01) | |
| *B01J 39/02* | (2006.01) | |
| *B01J 39/09* | (2017.01) | |
| *B01J 39/10* | (2006.01) | |
| *C01D 15/02* | (2006.01) | |
| *C25B 1/46* | (2006.01) | |
| *C25B 9/10* | (2006.01) | |
| *B01J 39/12* | (2006.01) | |
| *B01J 39/07* | (2017.01) | |
| *B01J 39/19* | (2017.01) | |
| *B01J 47/016* | (2017.01) | |
| *B01J 39/05* | (2017.01) | |
| *B01D 61/02* | (2006.01) | |

(52) U.S. Cl.
CPC ............... *C01D 15/02* (2013.01); *C25B 9/10* (2013.01); *B01D 61/025* (2013.01); *B01D 2009/0086* (2013.01); *B01D 2311/04* (2013.01); *B01D 2311/2623* (2013.01); *B01D 2311/2642* (2013.01); *B01D 2311/2669* (2013.01); *B01D 2311/2673* (2013.01); *B01D 2311/2684* (2013.01)

(56) References Cited

U.S. PATENT DOCUMENTS

| | | | |
|---|---|---|---|
| 4,159,311 A | 6/1979 | Bauman et al. | |
| 5,039,382 A * | 8/1991 | Suzuki | C08J 5/2281 |
| | | | 204/296 |
| 7,435,477 B2 | 10/2008 | Adachi et al. | |
| 8,506,851 B2 | 8/2013 | Ravet et al. | |
| 8,679,224 B2 | 3/2014 | Brown et al. | |
| 8,741,150 B2 | 6/2014 | Chung et al. | |
| 8,778,289 B2 | 7/2014 | Chon et al. | |
| 9,034,294 B1 * | 5/2015 | Harrison | C01D 15/08 |
| | | | 423/421 |
| 9,677,181 B2 | 6/2017 | Bourassa et al. | |
| 10,150,056 B2 * | 12/2018 | Snydacker | B01D 15/362 |
| 2004/0005267 A1 | 1/2004 | Boryta et al. | |
| 2007/0138020 A1 * | 6/2007 | Balagopal | C02F 1/4674 |
| | | | 205/500 |
| 2010/0116748 A1 | 5/2010 | Rasmussen et al. | |
| 2011/0044882 A1 | 2/2011 | Buckley et al. | |
| 2011/0174739 A1 | 7/2011 | Chung et al. | |
| 2013/0306565 A1 * | 11/2013 | Davis | C02F 1/42 |
| | | | 210/675 |
| 2014/0113197 A1 | 4/2014 | Xiao et al. | |
| 2014/0239221 A1 * | 8/2014 | Harrison | C09K 5/10 |
| | | | 252/67 |
| 2015/0013499 A1 | 1/2015 | Asano et al. | |
| 2015/0083667 A1 | 3/2015 | Stouffer | |
| 2015/0197830 A1 | 7/2015 | Chon et al. | |
| 2016/0115040 A1 | 4/2016 | Yi et al. | |
| 2016/0230250 A1 * | 8/2016 | Chung | C02F 1/28 |
| 2017/0022617 A1 | 1/2017 | Magnan et al. | |
| 2017/0028395 A1 | 2/2017 | Bewsey | |
| 2017/0189855 A1 | 7/2017 | Xiang et al. | |
| 2017/0217796 A1 | 8/2017 | Snydacker et al. | |
| 2018/0080133 A1 | 3/2018 | Smith et al. | |
| 2018/0133619 A1 | 5/2018 | Snydacker | |
| 2019/0044126 A1 | 2/2019 | Snydacker et al. | |
| 2019/0046898 A1 | 2/2019 | Snydacker | |

FOREIGN PATENT DOCUMENTS

| | | | | |
|---|---|---|---|---|
| CN | 103794779 A | | 5/2014 | |
| FR | 3034781 | * | 10/2014 | .......... C02F 1/46104 |
| JP | 5898021 B2 | | 4/2016 | |
| WO | WO-2016064689 A2 | | 4/2016 | |
| WO | WO-2016172017 A1 | | 10/2016 | |
| WO | WO-2017005113 A1 | | 1/2017 | |
| WO | WO-2017020090 A1 | | 2/2017 | |
| WO | WO-2017137885 A1 | | 8/2017 | |
| WO | WO-2018089932 A1 | | 5/2018 | |
| WO | WO-2019028148 A1 | | 2/2019 | |
| WO | WO-2019028174 A2 | | 2/2019 | |

OTHER PUBLICATIONS

Chitrakar et al. Selective Uptake of Lithium Ion from Brine by H1.33Mn1.67O4 and H1.6Mn1.6O4. Chem Lett 41:1647-1649 (2012).
Cho et al. High-Performance ZrO2-Coated LiNiO2 Cathode Material. Electrochem Solid-State Lett 4(10):A159-A161 (2001).
Department of Energy. Ion Exchange Materials for Lithium Extraction (Topic: 15, Subtopic:e)—Abstract. Available at https://www.sbir.gov/sbirsearch/detail/1307793 (3 pgs.) (2017).
Larumbe et al. Effect of a SiO2 coating on the magnetic properties of Fe3O4 nanoparticles. JPhys: Condens Matter 24(26):266007 (2012).
Nishihama et al. Selective recovery process of lithium from seawater using integrated ion exchange methods. Solvent Extraction and Ion Exchange 29:421-431 (2011).
Oh et al. Double Carbon Coating of LiFePO4 as High Rate Electrode for Rechargeable Lithium Batteries. Adv. Mater. 22:4842-4845 (2010).
Pareja et al. Corrosion behaviour of zirconia barrier coatings on galvanized steel. Surface and Coatings Technology 200(22-23):6606-6610 (2006).
Patel et al. Ionic and electronic conductivities of atomic layer deposition thin film coated lithium ion battery cathode particles. RSC Advances 6:98768-98776 (2016).
PCT/US2017/061384 International Search Report and Written Opinion dated Feb. 14, 2018.
PCT/US2018/044821 International Search Report and Written Opinion dated Oct. 12, 2018.
PCT/US2018/044868 International Search Report and Written Opinion dated Mar. 6, 2019.
Tarakina et al. Defect crystal structure of new TiO(OH)2 hydroxide and related lithium salt Li2TiO3. Dalton Trans 39:8168-8176 (2010).
U.S. Appl. No. 15/811,415 Office Action dated May 24, 2018.
U.S. Appl. No. 16/052,381 Office Action dated Nov. 1, 2018.
Co-pending U.S. Appl. No. 16/409,643, filed May 10, 2019.
PCT/US2019/017885 International Search Report and Written Opinion dated Jun. 14, 2019.
PCT/US2019/019780 International Search Report and Written Opinion dated Jun. 14, 2019.

\* cited by examiner

INTEGRATED SYSTEM FOR LITHIUM EXTRACTION AND CONVERSION

CROSS-REFERENCE

This application is a continuation of International Application No. PCT/US2019/017885, which claims the benefit of U.S. Provisional Application Ser. No. 62/631,688, filed Feb. 17, 2018; and U.S. Provisional Application Ser. No. 62/781,515, filed Dec. 18, 2018; each of which is incorporated herein by reference in its entirety.

BACKGROUND OF THE INVENTION

Lithium is an essential element for high-energy rechargeable batteries and other technologies. Lithium can be found in a variety of liquid solutions, including natural and synthetic brines and leachate solutions from minerals and recycled products.

SUMMARY OF THE INVENTION

Lithium can be extracted from liquid resources using an ion exchange process based on inorganic ion exchange materials. Inorganic ion exchange materials absorb lithium ions from a liquid resource while releasing hydrogen ions, and then elute lithium ions in acid while absorbing hydrogen ions. The ion exchange process can be repeated to extract lithium ions from a liquid resource and yield a concentrated lithium ion solution. The concentrated lithium ion solution can be further processed into chemicals for the battery industry or other industries.

One aspect described herein is an integrated process for generating a purified lithium concentrate from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material with an acid solution, wherein said lithium ions from said lithium-enriched ion exchange material are exchanged with hydrogen ions from said acid solution to produce a lithium eluate; d) providing a membrane cell in fluid communication with said ion exchange unit, wherein said membrane cell comprises (i) a first compartment containing an electrochemically reducing electrode, (ii) a second compartment containing an electrochemically oxidizing electrode, and (iii) an ion-conducting membrane separating said first compartment from said second compartment; e) passing said lithium eluate to said membrane cell; f) subjecting said lithium eluate in said membrane cell to an electric current, wherein said electric current causes electrolysis of said lithium eluate to produce an acidified solution and said purified lithium concentrate; and g) recycling said acidified solution from said membrane cell to said ion exchange unit of c).

In one embodiment, said lithium-enriched ion exchange material is treated in said ion exchange unit. In one embodiment, said lithium eluate is produced in said ion exchange unit. In one embodiment, said lithium eluate is passed from said ion exchange unit to said membrane cell.

In one embodiment, wherein prior to b), said ion exchange material in said ion exchange unit is treated with an acid solution to produce a hydrogen-enriched ion exchange material in said ion exchange unit. In one embodiment, wherein b) further comprises pH modulation, wherein said pH modulation maintains an equilibrium in favor of hydrogen ions from said hydrogen-rich ion exchange material being exchanged with lithium ions from said liquid resource. In one embodiment, said process further comprises treating said lithium-enriched ion exchange material with a base in addition to said acid solution. In one embodiment, the base is $Ca(OH)_2$ or NaOH.

In one embodiment, said process further comprises providing a reverse osmosis unit in fluid communication with said ion exchange unit and said membrane cell, and said reverse osmosis unit comprises a water-permeable membrane. In one embodiment, wherein prior to d), said lithium eluate is passed into said reverse osmosis unit contacting said water-permeable membrane, and wherein water molecules from said lithium eluate pass through said water-permeable membrane to produce water and a concentrated lithium eluate. In one embodiment, said concentrated lithium eluate is further subjected to d) to g).

In one embodiment, said water-permeable membrane comprises polyamide, aromatic polyamide, polyvinylamine, polypyrrolidine, polyfuran, polyethersulfone, polysulfone, polypiperzine-amide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof. In one embodiment, said water-permeable membrane further comprises a fabric, polymeric, composite, or metal support.

In one embodiment, said process further comprises providing a thermal evaporation unit in fluid communication with said ion exchange unit and said membrane cell, and said thermal evaporation unit comprises a heating element. In one embodiment, said process further comprises providing a purification unit in fluid communication with said ion exchange unit and said membrane cell. In one embodiment, wherein prior to d), said lithium eluate is passed into said purification unit to produce a purified lithium concentrate. In one embodiment, said purified lithium concentrate is further subjected to d) to g).

In one embodiment, said process further comprises providing a crystallizer in fluid communication with said membrane cell. In one embodiment, said lithium eluate is passed into said crystallizer. In one embodiment, said lithium eluate is processed by said crystallizer to produce a lithium salt.

In one embodiment, said lithium salt is lithium carbonate, lithium bicarbonate, lithium hydroxide, lithium chloride, lithium bromide, lithium sulfate, lithium bisulfate, lithium phosphate, lithium hydrogen phosphate, lithium dihydrogen phosphate, or lithium nitrate. In one embodiment, said lithium salt is in a solid, an aqueous solution, or a slurry.

In one embodiment, said liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, said ion exchange material is selected from the group consisting of $LiFePO_4$, $LiMnPO_4$, $Li_2MO_3$ (M=Ti, Mn, Sn), $Li_4TisO_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof; wherein x is from 0.1-10 and y is from 0.1-10.

In one embodiment, said ion exchange material comprises coated ion exchange particles, uncoated ion exchange particles, or combinations thereof. In one embodiment, said ion exchange material is a porous ion exchange material. In one embodiment, said ion exchange material is in the form of porous beads. In one embodiment, said ion exchange material is in a powder or slurry form.

In one embodiment, said acid solution is a solution of hydrochloric acid, sulfuric acid, phosphoric acid, hydrobromic acid, chloric acid, perchloric acid, nitric acid, formic acid, acetic acid, or combinations thereof.

In one embodiment, said ion-conducting membrane is a cation-conducting membrane or an anion-conducting membrane. In one embodiment, said cation-conducting membrane or said anion-conducting membrane comprises sulfonated tetrafluoroethylene-based fluoropolymer-copolymer, sulfonated tetrafluoroethylene, sulfonated fluoropolymer, sulfonated styrene-divinylbenzene polymer (MK-40™), co-polymers, or combinations thereof. In one embodiment, said anion-conducting membrane comprises a functionalized polymer structure. In one embodiment, said polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof.

In one embodiment, said cation-conducting membrane allows for transfer of lithium ions but prevents transfer of anion groups. In one embodiment, said ion-conducting membrane has a thickness from about 1 μm to about 1000 μm. In one embodiment, said ion-conducting membrane has a thickness from about 1 mm to about 10 mm.

In one embodiment, said electrodes are comprised of titanium, niobium, zirconium, tantalum, magnesium, titanium dioxide, oxides thereof, or combinations thereof. In one embodiment, said electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material with an acid solution, wherein said lithium ions from said lithium-enriched ion exchange material are exchanged with hydrogen ions from said acid solution to produce a lithium eluate; d) providing a chemical precipitation unit in fluid communication with said ion exchange unit, wherein said chemical precipitation unit is capable of facilitating the treatment of said lithium eluate to precipitate said purified lithium salt; e) passing said lithium eluate in said ion exchange unit to said chemical precipitation unit; and f) treating said lithium eluate in said chemical precipitation unit to produce said purified lithium salt.

In one embodiment, said purified lithium salt is LiCl. In one embodiment, said LiCl with $Na_2CO_3$ to produce $Li_2CO_3$. In one embodiment, said chemical precipitation unit distills off a mixture comprising HCl. In one embodiment, said HCl is recycled into c). In one embodiment, said purified lithium salt is $Li_2SO_4$. In one embodiment, said process further comprises treating said $Li_2SO_4$ with $Na_2CO_3$ to produce $Li_2CO_3$. In one embodiment, said purified lithium salt is treated with $Na_2CO_3$ in said chemical precipitation unit to produce $Li_2CO_3$.

In one embodiment, said lithium-enriched ion exchange material is treated in said ion exchange unit. In one embodiment, said lithium eluate is produced in said ion exchange unit. In one embodiment, said lithium eluate is passed from said ion exchange unit to said chemical precipitation unit.

In one embodiment, wherein prior to b), said ion exchange material in said ion exchange unit is treated with an acid solution to produce a hydrogen-enriched ion exchange material in said ion exchange unit. In one embodiment, wherein b) further comprises pH modulation, wherein said pH modulation maintains an equilibrium in favor of hydrogen ions from said hydrogen-rich ion exchange material being exchanged with lithium ions from said liquid resource. In one embodiment, said lithium eluate solution is purified by addition of an alkali or alkali earth hydroxide, carbonate or bicarbonate, combination thereof, or $NH_3$ to precipitate impurities as basic precipitates.

In one embodiment, said alkaline or alkaline earth hydroxide, carbonate or bicarbonate is selected from LiOH, NaOH, KOH, $Ca(OH)_2$, $Li_2CO_3$, $Na_2CO_3$, $K_2CO_3$, $CaCO_3$, or combination thereof. In one embodiment, said basic precipitates are recycled to b) for pH modulation. In one embodiment, said ion exchange material comprises coated ion exchange particles, uncoated ion exchange particles, or combinations thereof. In one embodiment, said coated ion exchange particles comprise a polymer coating. In one embodiment, said coating of said coated ion exchange particles comprise a chloro-polymer, a fluoro-polymer, a chloro-fluoro-polymer, a hydrophilic polymer, a hydrophobic polymer, co-polymers thereof, mixtures thereof, or combinations thereof.

One aspect described herein is an integrated system for generating a purified lithium concentrate from a liquid resource, comprising: a) an ion exchange unit, wherein said ion exchange unit comprises an ion exchange material, and wherein said ion exchange unit allows: (i) said ion exchange material to contact said liquid resource to produce a lithium-enriched ion exchange material; and (ii) said lithium-enriched ion exchange material to be treated by an acidified solution; b) a membrane cell, wherein said membrane cell comprises (i) a first compartment containing an electrochemically reducing electrode, (ii) a second compartment containing an electrochemically oxidizing electrode, and (iii) an ion-conducting membrane separating said first compartment from said second compartment; and c) a recycling loop capable of transporting said acidified solution from said membrane cell to said ion exchange unit; wherein said ion exchange unit, said membrane cell, and said recycling system are in fluid communication.

In one embodiment, said system further comprises a reverse osmosis unit in fluid communication with said ion exchange unit and said membrane cell, and said reverse osmosis unit comprises a water-permeable membrane. In one embodiment, said water-permeable membrane comprises polyamide, aromatic polyamide, polyvinylamine, polypyrrolidine, polyfuran, polyethersulfone, polysulfone, polypiperzine-amide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof. In one embodiment, said water-permeable membrane further comprises a fabric, polymeric, composite, or metal support.

In one embodiment, said system further comprises a thermal evaporation unit in fluid communication with said ion exchange unit and said membrane cell, and said thermal evaporation unit comprises a heating element. In one embodiment, said system further comprises a purification unit in fluid communication with said ion exchange unit and said membrane cell. In one embodiment, said system further comprises a crystallizer in fluid communication with said membrane cell.

In one embodiment, said liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, said ion exchange material is selected from the group consisting of $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof; wherein x is from 0.1-10 and y is from 0.1-10.

In one embodiment, said ion exchange material comprises coated ion exchange particles, uncoated ion exchange particles, or combinations thereof. In one embodiment, said ion exchange material is a porous ion exchange material. In one embodiment, said ion exchange material is in the form of porous beads. In one embodiment, said ion exchange material is in a powder form. In one embodiment, said acidified solution is a solution of $H_2SO_4$ or HCl.

One aspect described herein is an integrated system for generating a purified lithium salt from a liquid resource, comprising: a) an ion exchange unit, wherein said ion exchange unit comprises an ion exchange material, and said ion exchange material allows for: said ion exchange material to contact said liquid resource to produce a lithium-enriched ion exchange material; and said lithium-enriched ion exchange material to be treated by an acidified solution to produce a lithium eluate solution; b) an acid recovery unit wherein acid is recovered from said lithium eluate solution, and optionally recycled to said ion exchange unit; and c) a chemical precipitation unit; wherein said ion exchange unit, said acid recovery unit, and said chemical precipitation unit are in fluid communication.

In one embodiment, said system further comprises a reverse osmosis unit in fluid communication with said ion exchange unit, said acid recovery unit, and said chemical precipitation unit, and said reverse osmosis unit comprises a water-permeable membrane. In one embodiment, said water-permeable membrane comprises polyamide, aromatic polyamide, polyvinylamine, polypyrrolidine, polyfuran, polyethersulfone, polysulfone, polypiperzine-amide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof. In one embodiment, said water-permeable membrane further comprises a fabric, polymeric, composite, or metal support.

In one embodiment, said system further comprises a thermal evaporation unit in fluid communication with said ion exchange unit and said membrane cell, and said thermal evaporation unit comprises a heating element. In one embodiment, said system further comprises a purification unit in fluid communication with said ion exchange unit and said membrane cell.

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$.

In one embodiment, said liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, said ion exchange material is selected from the group consisting of $LiFePO_4$, $LiMnPO_4$, $Li_2MO_3$ (M=Ti, Mn, Sn), $Li_4TisO_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof; wherein x is from 0.1-10 and y is from 0.1-10.

In one embodiment, said ion exchange material comprises coated ion exchange particles, uncoated ion exchange particles, or combinations thereof. In one embodiment, said ion exchange material is a porous ion exchange material. In one embodiment, said ion exchange material is in the form of porous beads. In one embodiment, said ion exchange material is in a powder form. In one embodiment, said acid solution is a solution of $H_2SO_4$ or HCl.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a electrochemical cell in fluid communication with said ion exchange unit, wherein said electrochemical cell comprises (i) a first electrode that is electrochemically reducing electrode, (ii) a second electrode that is electrochemically oxidizing, and (iii) an ion-conducting solution separating said first electrode from said second electrode; e) passing said lithium eluate to said electrochemical cell; f) subjecting said lithium eluate in said electrochemical cell to an electric current, wherein said electric current causes electrolysis of said lithium eluate to produce an acidified solution and a lithium salt solution; g) crystallization of said lithium salt solution to form said purified lithium salt; and h) recycling said acidified solution from said electrochemical cell to said ion exchange unit of c).

In one embodiment, said lithium-enriched ion exchange material is treated in said ion exchange unit. In one embodiment, said lithium eluate is produced in said ion exchange unit. In one embodiment, said lithium eluate is passed from said ion exchange unit to said electrochemical cell.

In one embodiment, prior to b), said ion exchange material in said ion exchange unit is treated with an acid solution to produce a hydrogen-enriched ion exchange material in said ion exchange unit. In one embodiment, wherein b) further comprises pH modulation, wherein said pH modulation maintains an equilibrium in favor of hydrogen ions from said hydrogen-rich ion exchange material being exchanged with lithium ions from said liquid resource.

In one embodiment, said process further comprises providing a reverse osmosis unit in fluid communication with said ion exchange unit and said electrochemical cell, and said reverse osmosis unit comprises a water-permeable membrane. In one embodiment, wherein prior to d), said lithium eluate is passed into said reverse osmosis unit contacting said water-permeable membrane, and wherein water molecules from said lithium eluate pass through said water-permeable membrane to produce water and a concentrated lithium eluate. In one embodiment, said concentrated lithium eluate is further subjected to d) to h).

In one embodiment, said water-permeable membrane comprises polyamide, aromatic polyamide, polyvinylamine, polypyrrolidine, polyfuran, polyethersulfone, polysulfone, polypiperzine-amide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof. In one embodiment, said water-permeable membrane further comprises a fabric, polymeric, composite, or metal support.

In one embodiment, said process further comprises providing a thermal evaporation unit in fluid communication with said ion exchange unit and said electrochemical cell, and said thermal evaporation unit comprises a heating element. In one embodiment, said process further comprises providing a purification unit in fluid communication with said ion exchange unit and said electrochemical cell. In one embodiment, wherein prior to d), said lithium eluate is passed into said purification unit to produce a purified lithium concentrate. In one embodiment, said purified lithium concentrate is further subjected to d) to h).

In one embodiment, said process further comprises providing a crystallizer in fluid communication with said ion exchange unit and said electrochemical cell. In one embodiment, wherein prior to d), said lithium eluate is passed into said crystallizer to produce a lithium salt.

In one embodiment, said lithium salt is lithium carbonate, lithium bicarbonate, lithium hydroxide, lithium chloride, lithium bromide, lithium sulfate, lithium bisulfate, lithium phosphate, lithium hydrogen phosphate, lithium dihydrogen phosphate, or lithium nitrate. In one embodiment, said lithium salt is lithium carbonate. In one embodiment, said lithium salt is lithium hydroxide. In one embodiment, said lithium salt is in a solid, an aqueous solution, or slurry.

In one embodiment, said liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, said ion exchange material is selected from the group consisting of $LiFePO_4$, $LiMnPO_4$, $Li_2MO_3$ (M=Ti, Mn, Sn), $Li_4TiS_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, or $Li_2CuP_2O_7$. In one embodiment, said ion exchange material comprises coated ion exchange particles, uncoated ion exchange particles, or combinations thereof. In one embodiment, said coated ion exchange particles comprise a polymer coating. In one embodiment, said coating of said coated ion exchange particles comprise a chloro-polymer, a fluoro-polymer, a chloro-fluoro-polymer, a hydrophilic polymer, a hydrophobic polymer, co-polymers thereof, mixtures thereof, or combinations thereof. In one embodiment, said ion exchange material comprises coated ion exchange particles. In one embodiment, said ion exchange material is in a powder or slurry form.

In one embodiment, said acid solution is a solution of hydrochloric acid, sulfuric acid, phosphoric acid, hydrobromic acid, chloric acid, perchloric acid, nitric acid, formic acid, acetic acid, or combinations thereof.

In one embodiment, said ion-conducting membrane is a cation-conducting membrane, an anion-conducting membrane, or combinations thereof. In one embodiment, said ion-conducting membrane comprises sulfonated tetrafluoroethylene-based fluoropolymer-copolymer, sulfonated tetrafluoroethylene, sulfonated fluoropolymer, sulfonated styrene-divinylbenzene polymer (MK-40™), co-polymers, or combinations thereof. In one embodiment, said anion-conducting membrane comprises a functionalized polymer structure.

In one embodiment, said functionalized polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment, said cation-conducting membrane allows for transfer of lithium ions but prevents transfer of anion groups. In one embodiment, said ion-conducting membrane has a thickness from about 1 μm to about 1000 μm. In one embodiment, said ion-conducting membrane has a thickness from about 1 mm to about 10 mm.

In one embodiment, said electrodes are comprised of titanium, niobium, zirconium, tantalum, magnesium, titanium dioxide, oxides thereof, or combinations thereof. In one embodiment, said electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof.

One aspect described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a crystallizer in fluid communication with said ion exchange unit, wherein said crystallizer is configured to add a precipitant to said lithium eluate; e) passing said lithium eluate to said crystallizer; f) treating said lithium eluate in said crystallizer with a precipitant to precipitate a lithium salt and a residual eluate; g) providing an electrochemical cell in fluid communication with said crystallizer, wherein said electrochemical cell comprises (i) a first electrochemically reducing electrode and (ii) a second electrochemically oxidizing electrode; h) passing said residual eluate to said electrochemical cell; i) subjecting said residual eluate in said electrochemical cell to an electric current, wherein said electric current causes electrolysis of said residual eluate to produce an acidified solution and a basified solution; and j) recycling said acidified solution and said basified solution from said electrochemical cell to any one of said ion exchange unit of a) to c).

In one embodiment, said lithium-enriched ion exchange material is treated in said ion exchange unit. In one embodiment, said lithium eluate is produced in said ion exchange unit. In one embodiment, wherein prior to b), said ion exchange material in said ion exchange unit is treated with an acid solution to produce a hydrogen-enriched ion exchange material in said ion exchange unit. In one embodiment, wherein b) further comprises pH modulation, wherein said pH modulation maintains an equilibrium in favor of hydrogen ions from said hydrogen-rich ion exchange material being exchanged with lithium ions from said liquid resource.

In one embodiment, said process further comprises treating said lithium-enriched ion exchange material with a base. In one embodiment, the base is $Ca(OH)_2$ or NaOH.

In one embodiment, said process further comprises providing a reverse osmosis unit in fluid communication with said ion exchange unit and said crystallizer, and said reverse osmosis unit comprises a water-permeable membrane. In one embodiment, wherein prior to d), said lithium eluate is passed into said reverse osmosis unit contacting said water-permeable membrane, and wherein water molecules from said lithium eluate pass through said water-permeable membrane to produce water and a concentrated lithium eluate. In one embodiment, said concentrated lithium eluate is further subjected to d) to j).

In one embodiment, said water-permeable membrane comprises polyamide, aromatic polyamide, polyvinylamine, polypyrrolidine, polyfuran, polyethersulfone, polysulfone, polypiperzine-amide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof. In one embodiment, said water-permeable membrane further comprises a fabric, polymeric, composite, or metal support.

In one embodiment, said process further comprises providing a thermal evaporation unit in fluid communication with said ion exchange unit and said crystallizer, and said thermal evaporation unit comprises a heating element. In one embodiment, said process further comprises providing a purification unit in fluid communication with said ion exchange unit and said electrochemical cell. In one embodiment, wherein prior to d), said lithium eluate is passed into said purification unit to produce a purified lithium concentrate. In one embodiment, said purified lithium concentrate is further subjected to d) to j).

In one embodiment, said purified lithium salt is lithium carbonate, lithium bicarbonate, lithium hydroxide, lithium chloride, lithium bromide, lithium sulfate, lithium bisulfate, lithium phosphate, lithium hydrogen phosphate, lithium dihydrogen phosphate, or lithium nitrate. In one embodiment, said lithium salt is lithium carbonate. In one embodiment, said lithium salt is lithium hydroxide. In one embodiment, said purified lithium salt is in a solid, an aqueous solution, or slurry.

In one embodiment, said liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, said ion exchange material is selected from the group consisting of $LiFePO_4$, $LiMnPO_4$, $Li_2MO_3$ (M=Ti, Mn, Sn), $Li_4TiSO_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, solid solutions thereof, or combinations thereof; wherein x is from 0.1-10 and y is from 0.1-10.

In one embodiment, said ion exchange material comprises coated ion exchange particles, uncoated ion exchange particles, or combinations thereof. In one embodiment, said ion exchange material comprises coated ion exchange particles. In one embodiment, said coated ion exchange particles comprises a polymer coating. In one embodiment, said coating of said coated ion exchange particles comprise a chloro-polymer, a fluoro-polymer, a chloro-fluoro-polymer, a hydrophilic polymer, a hydrophobic polymer, co-polymers thereof, mixtures thereof, or combinations thereof. In one embodiment, said ion exchange material is in a powder or slurry form. In one embodiment, said acid solution is a solution of hydrochloric acid, sulfuric acid, phosphoric acid, hydrobromic acid, chloric acid, perchloric acid, nitric acid, formic acid, acetic acid, or combinations thereof.

In one embodiment, said ion-conducting membrane is a cation-conducting membrane or an anion-conducting membrane. In one embodiment, said cation-conducting membrane or said anion-conducting membrane comprises sulfonated tetrafluoroethylene-based fluoropolymer-copolymer, sulfonated tetrafluoroethylene, sulfonated fluoropolymer, sulfonated styrene-divinylbenzene polymer (MK-40™), co-polymers, or combinations thereof. In one embodiment, said anion-conducting membrane comprises a functionalized polymer structure. In one embodiment, said polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof.

In one embodiment, said cation-conducting membrane allows for transfer of lithium ions but prevents transfer of anion groups. In one embodiment, said ion-conducting membrane has a thickness from about 1 μm to about 1000 μm. In one embodiment, said ion-conducting membrane has a thickness from about 1 mm to about 10 mm.

In one embodiment, said electrodes are comprised of titanium, niobium, zirconium, tantalum, magnesium, titanium dioxide, oxides thereof, or combinations thereof. In one embodiment, said electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof.

In one embodiment, said precipitant is a carbonate or phosphate salt. In one embodiment, said precipitant is sodium carbonate.

One aspect described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit, and sodium hydroxide is added to the brine to neutralize protons from the ion exchange material; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a reverse osmosis unit in fluid communication with said ion exchange unit, wherein said reverse osmosis unit comprises a water permeable membrane; e) passing said lithium eluate from said ion exchange unit to said reverse osmosis unit thereby contacting said lithium eluate with said water permeable membrane, wherein water molecules from said lithium eluate passes through said water-permeable membrane to produce water and a concentrated lithium eluate; f) providing a thermal evaporation unit in fluid communication with said reverse osmosis unit, wherein said thermal evaporation unit comprises a heating element; g) passing said concentrated lithium eluate from said reverse osmosis unit to said thermal evaporation unit, thereby producing a further concentrated lithium eluate; h) providing a purification unit in fluid communication with said thermal evaporation unit; i) passing said further concentrated lithium eluate from said thermal evaporation unit to said purification unit, thereby producing a purified lithium concentrate; j) providing a crystallizer in fluid communication with said purification unit, wherein said crystallizer is configured to add a precipitant to said purified lithium concentrate; k) treating said purified lithium concentrate with said precipitant to precipitate a lithium salt and a residual eluate; l) providing an electrochemical cell in fluid communication with said crystallizer, wherein said electrochemical cell comprises (i) a first electrochemically reducing electrode and (ii) a second electrochemically oxidizing electrode; m) passing said residual eluate to said electrochemical cell; n) subjecting said residual eluate in said electrochemical cell to an electric current, wherein said electric current causes electrolysis of said residual eluate to produce an acidified solution and a basified solution; and o) recycling said acidified solution and said basified solution from said electrochemical cell to any one of said ion exchange unit of a) to c).

In one embodiment, said lithium-enriched ion exchange material is treated in said ion exchange unit. In one embodiment, said lithium eluate is produced in said ion exchange unit. In one embodiment, wherein prior to b), said ion exchange material in said ion exchange unit is treated with an acid solution to produce a hydrogen-enriched ion exchange material in said ion exchange unit.

In one embodiment, wherein b) further comprises pH modulation, wherein said pH modulation maintains an equilibrium in favor of hydrogen ions from said hydrogen-rich ion exchange material being exchanged with lithium ions from said liquid resource. In one embodiment, said process further comprises treating said lithium-enriched ion exchange material with a base in addition to said acid solution. In one embodiment, the base is $Ca(OH)_2$ or NaOH.

In one embodiment, said water-permeable membrane comprises polyamide, aromatic polyamide, polyvinylamine, polypyrrolidine, polyfuran, polyethersulfone, polysulfone, polypiperzine-amide, polybenzimidazoline, polyoxadiazole, acetylated cellulose, cellulose, a polymer with alternative functionalization of sulfonation, carboxylation, phosphorylation, or combinations thereof, other polymeric layer, or combinations thereof.

In one embodiment, said water-permeable membrane further comprises a fabric, polymeric, composite, or metal support. In one embodiment, said purified lithium salt is lithium carbonate, lithium bicarbonate, lithium hydroxide, lithium chloride, lithium bromide, lithium sulfate, lithium bisulfate, lithium phosphate, lithium hydrogen phosphate, lithium dihydrogen phosphate, or lithium nitrate. In one embodiment, said lithium salt is lithium carbonate. In one embodiment, said lithium salt is lithium hydroxide. In one embodiment, said purified lithium salt is in a solid, an aqueous solution, or slurry.

In one embodiment, said liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, said ion exchange material is selected from the group consisting of $LiFePO_4$, $LiMnPO_4$, $Li_2MO_3$ (M=Ti, Mn, Sn), $Li_4TiO_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, solid solutions thereof, or combinations thereof.

In one embodiment, said ion exchange material comprises coated ion exchange particles, uncoated ion exchange particles, or combinations thereof. In one embodiment, said ion exchange material comprises coated ion exchange particles. In one embodiment, said coated ion exchange particles comprise a polymer coating. In one embodiment, said coating of said coated ion exchange particles comprise a chloro-polymer, a fluoro-polymer, a chloro-fluoro-polymer, a hydrophilic polymer, a hydrophobic polymer, co-polymers thereof, mixtures thereof, or combinations thereof. In one embodiment, said ion exchange material is in a powder or slurry form.

In one embodiment, said acid solution is a solution of hydrochloric acid, sulfuric acid, phosphoric acid, hydrobromic acid, chloric acid, perchloric acid, nitric acid, formic acid, acetic acid, or combinations thereof.

In one embodiment, said ion-conducting membrane is a cation-conducting membrane or an anion-conducting membrane. In one embodiment, said cation-conducting membrane or said anion-conducting membrane comprises sulfonated tetrafluoroethylene-based fluoropolymer-copolymer, sulfonated tetrafluoroethylene, sulfonated fluoropolymer, sulfonated styrene-divinylbenzene polymer (MK-40™), co-polymers, or combinations thereof. In one embodiment, said anion-conducting membrane comprises a functionalized polymer structure. In one embodiment, said polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof.

In one embodiment, said cation-conducting membrane allows for transfer of lithium ions but prevents transfer of anion groups. In one embodiment, said ion-conducting membrane has a thickness from about 1 μm to about 1000 μm. In one embodiment, aid ion-conducting membrane has a thickness from about 1 mm to about 10 mm. In one embodiment, said electrodes are comprised of titanium, niobium, zirconium, tantalum, magnesium, titanium dioxide, oxides thereof, or combinations thereof.

In one embodiment, said electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof. In one embodiment, said precipitant is a carbonate or phosphate salt. In one embodiment, said precipitant is sodium carbonate.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
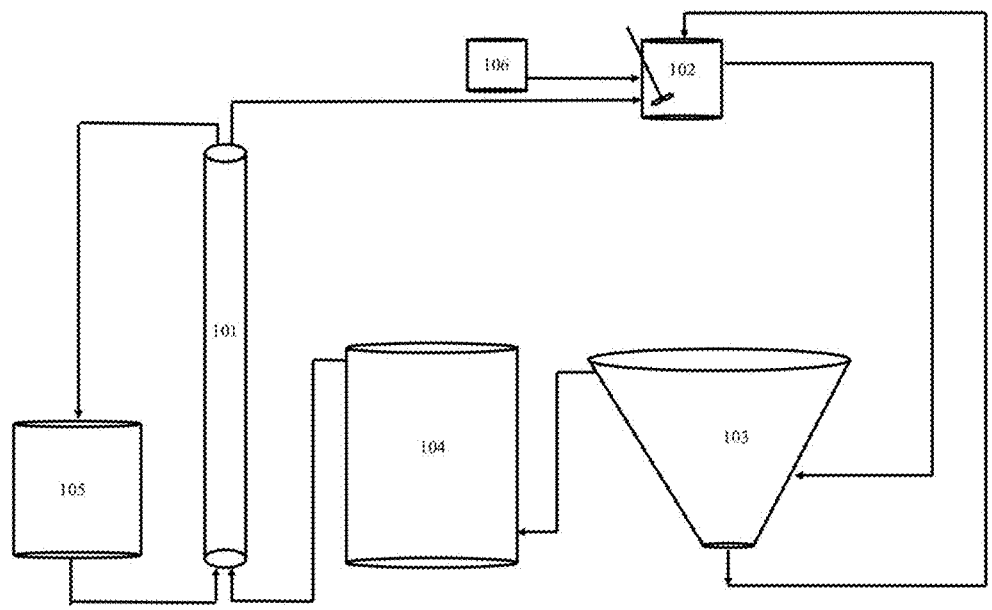
FIG. 1 illustrates a recirculating batch system comprising an ion exchange column, a mixing tank, a settling tank, and a recirculation tank.

The terms "lithium", "lithium ion", and "$Li^+$" are used interchangeably in the present specification and these terms are synonymous unless specifically noted to the contrary. The terms "hydrogen", "hydrogen ion", "proton", and "$H^+$" are used interchangeably in the present specification and these terms are synonymous unless specifically noted to the contrary.

Lithium is an essential element for batteries and other technologies. Lithium is found in a variety of liquid resources, including natural and synthetic brines and leachate solutions from minerals, clays, and recycled products. Lithium is optionally extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process is optionally repeated to extract lithium from a liquid resource to yield a concentrated lithium solution. The concentrated lithium solution is optionally further processed into chemicals for the battery industry or other industries.

Ion exchange materials are optionally formed into beads, and the beads are optionally loaded into ion exchange columns, stirred tank reactors, other reactors, or reactor system for lithium extraction. Alternating flows of brine, acid, and other solutions are optionally flowed through an ion exchange column, reactors, or reactor system to extract lithium from the brine and produce a lithium concentrate, which is eluted from the column using the acid. As brine flows through the ion exchange column, reactors, or reactor system, the ion exchange material absorbs lithium while releasing hydrogen, where both the lithium and hydrogen are cations. The release of hydrogen during lithium uptake will acidify the brine and limit lithium uptake unless the pH of the brine is optionally maintained in a suitable range to facilitate thermodynamically favorable lithium uptake and concomitant hydrogen release. In one embodiment, pH of the liquid resource is maintained near a set-point through addition of base to neutralized protons released from the ion exchange material into the liquid resource.

To control the pH of the brine and maintain the pH in a range that is suitable for lithium uptake in an ion exchange column, bases such as NaOH, Ca(OH)$_2$, CaO, KOH, or NH$_3$ are optionally added to the brine as solids, aqueous solutions, or in other forms. For brines that contain divalent ions such as Mg, Ca, Sr, or Ba, addition of base to the brine can cause precipitation of solids, such as Mg(OH)$_2$ or Ca(OH)$_2$, which can cause problems for the ion exchange reaction. These precipitates cause problems in at least three ways. First, precipitation can remove base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material; clogging can also cause large pressure heads in the column. Third, precipitates in the column dissolve during acid elution, and thereby contaminate the lithium concentrate produced by the ion exchange system. For ion exchange beads to absorb lithium from brine, an ideal pH range for the brine is optionally 5 to 7, a preferred pH range is optionally 4 to 8, and an acceptable pH range is optionally 1 to 9. In one embodiment, an pH range for the brine is optionally about 1 to about 14, about 2 to about 13, about 3 to about 12, about 4 to about 12, about 4.5 to about 11, about 5 to about 10, about 5 to about 9, about 2 to about 5, about 2 to about 4, about 2 to about 3, about 3 to about 8, about 3 to about 7, about 3 to about 6, about 3 to about 5, about 3 to about 4, about 4 to about 10, about 4 to about 9, about 4 to about 8, about 4 to about 7, about 4 to about 6, about 4 to about 5, about 5 to about 6, about 5 to about 7, about 5 to about 8, about 6 to about 7, about 6 to about 8, or about 7 to about 8.

Integrated System for Lithium Extraction, Purification, and Conversion

An aspect of the invention described herein is an integrated system for lithium extraction, purification, and conversion with a form that allows for efficient usage of chemical inputs. This integrated system functions to: extract lithium ions from a liquid resource using an ion exchange system, produce a lithium eluate solution from the ion exchange system, optionally concentrate and/or purify the lithium eluate solution to form a purified lithium concentrate, and optionally convert the lithium eluate solution or purified lithium concentrate into a refined solution or material. The integrated system includes recycling loops for acid and/or base reagents.

An aspect of the invention described herein is an integrated chemical facility for lithium extraction, purification, and conversion with a form that allows for efficient usage of chemical inputs. These integrated chemical facilities function to: extract lithium ions from a liquid resource using an ion exchange system, produce a lithium eluate solution from the ion exchange system, optionally concentrate and/or purify the lithium eluate solution to form a purified lithium concentrate, and optionally convert the lithium eluate solution or purified lithium concentrate into a refined solution or material. The integrated chemical facilities include recycling loops for acid and/or base reagents.

An aspect of the invention described herein is an integrated system for the extraction of lithium ions from a liquid resource and conversion of the lithium ions into a refined lithium chemical, comprising: a) an ion exchange material; b) an ion exchange system for selective lithium uptake, with a pH modulating setup for increasing the pH of the liquid resource in the system, that uses an acid to elute a lithium salt solution; c) one or more processing systems for processing the lithium salt solution to form a refined lithium chemical; and d) one or more recycling and/or regeneration loops for reuse of the acid. An aspect of the invention described herein is an integrated system for generating a purified lithium concentrate from a liquid resource, comprising: a) an ion exchange unit, wherein the ion exchange unit comprises an ion exchange material, and wherein the ion exchange unit allows: (i) the ion exchange material to contact the liquid resource to produce a lithium-enriched ion exchange material; and (ii) the lithium-enriched ion exchange material to be treated by an acidified solution; b) a membrane cell, wherein the membrane cell comprises (i) a first compartment containing an electrochemically reducing electrode, (ii) a second compartment containing an electrochemically oxidizing electrode, and (iii) an ion-conducting membrane separating at least the first compartment from the second compartment; and c) a recycling loop capable of transporting the acidified solution from the membrane cell to the ion exchange unit, wherein said ion exchange unit, said membrane cell, and said recycling system are in fluid communication.

In one embodiment, the system further comprises a reverse osmosis unit in fluid communication with the ion exchange unit and the membrane cell and the reverse osmosis unit comprises a water-permeable membrane. In one embodiment, the water-permeable membrane comprises polyamide, aromatic polyamide, polyvinylamine, polypyrrolidine, polyfuran, or other polymeric layer. In one embodiment, the water-permeable membrane comprises polyethersulfone, polysulfone, polypiperzine-amide, polybenzimidazoline, polyoxadiazole, acetylated cellulose, cellulose or other polymers with alternative functionalizations such as sulfonation, carboxylation, or phosphorylation, or other polymeric layer. In one embodiment, the water-permeable membrane further comprises a fabric, polymeric, composite, or metal support. In one embodiment, the system further comprises a thermal evaporation unit in fluid communication with the ion exchange unit and the membrane cell, and the thermal evaporation unit comprises a heating element. In one embodiment, the system further comprises a purification unit in fluid communication with said ion exchange unit and said membrane cell. In one embodiment, the system further comprises a crystallizer in fluid communication with the membrane cell.

In one embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In one embodiment, the ion exchange material is selected from the group consisting of LiFePO$_4$, LiMnPO$_4$, Li$_2$MO$_3$ (M=Ti, Mn, Sn), Li$_4$Ti$_5$O$_{12}$, Li$_4$Mn$_5$O$_{12}$, LiMn$_2$O$_4$, Li$_{1.6}$Mn$_{1.6}$O$_4$, LiMO$_2$ (M=Al, Cu, Ti), Li$_4$TiO$_4$, Li$_7$Ti$_{11}$O$_{24}$, Li$_3$VO$_4$, Li$_2$Si$_3$O$_7$, Li$_2$CuP$_2$O$_7$, Al(OH)$_3$, LiCl.xAl(OH)$_3$.yH$_2$O, SnO$_2$.xSb$_2$O$_5$.yH$_2$O, TiO$_2$.xSb$_2$O$_5$.yH$_2$O, solid solutions thereof, or combinations thereof; wherein x is from 0.1-10 and y is from 0.1-10.

In one embodiment, the ion exchange material comprises coated ion exchange particles, uncoated ion exchange particles, or combinations thereof. In a further one aspect, a coating material comprises a polymer. In an embodiment, the coating material comprises a chloro-polymer, a fluoro-polymer, a chloro-fluoro-polymer, a hydrophilic polymer, a hydrophobic polymer, co-polymers thereof, mixtures thereof, or combinations thereof.

In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof.

In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof.

In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In one embodiment, the ion exchange material is a porous ion exchange material. In one embodiment, the ion exchange material is in the form of porous beads. In one embodiment, the ion exchange material is in a powder form. In one embodiment, the acid solution is a solution of $H_2SO_4$ or HCl.

An aspect of the invention described herein is an integrated system for generating a purified lithium salt from a liquid resource, comprising: a) an ion exchange unit, wherein the ion exchange unit comprises an ion exchange material and the ion exchange material allows for: (i) the ion exchange material to contact the liquid resource to produce a lithium-enriched ion exchange material; and (ii) the lithium-enriched ion exchange material to be treated by an acidified solution to produce a lithium eluate solution with residual acid; b) an acid recovery unit, wherein residual acid is recovered from the lithium eluate solution so that the recovered acid can be recycled to the ion exchange unit; and c) a chemical precipitation unit.

In one embodiment, the system further comprises a reverse osmosis unit in fluid communication with the ion exchange unit and the chemical precipitation unit, and the reverse osmosis unit comprises a water-permeable membrane. In one embodiment, the water-permeable membrane comprises polyamide, aromatic polyamide, polyvinylamine, polypyrrolidine, polyfuran, or other polymeric layer. In one embodiment, the water-permeable membrane comprises polyethersulfone, polysulfone, polypiperzine-amide, polybenzimidazoline, polyoxadiazole, acetylated cellulose, cellulose or other polymers with alternative functionalizations such as sulfonation, carboxylation, or phosphorylation, or other polymeric layer. In one embodiment, the water-permeable membrane further comprises a fabric, polymeric, composite, or metal support. In one embodiment, the system further comprises a thermal evaporation unit in fluid communication with said ion exchange unit and said membrane cell, and said thermal evaporation unit comprises a heating element. In one embodiment, the system further comprises a purification unit in fluid communication with said ion exchange unit and said membrane cell. In one embodiment, the system further comprises a crystallizer in fluid communication with said membrane cell. In one embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In one embodiment, the ion exchange material is selected from the group consisting of $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof; wherein x is from 0.1-10 and y is from 0.1-10. In one embodiment, the ion exchange material comprises coated ion exchange particles, uncoated ion exchange particles or combinations thereof. In a further one aspect, a coating material comprises a polymer. In an embodiment, the coating material comprises a chloro-polymer, a fluoro-polymer, a chloro-fluoro-polymer, a hydrophilic polymer, a hydrophobic polymer, co-polymers thereof, mixtures thereof, or combinations thereof.

In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof.

In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof.

In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In one embodiment, the ion exchange material is a porous ion exchange material. In one embodiment, the ion exchange material is in the form of porous beads. In one embodiment, the ion exchange material is in a powder form. In one embodiment, the acid solution is a solution of $H_2SO_4$ or HCl.

An aspect of the invention described herein is an integrated system for lithium extraction, purification, and conversion, comprising: a) an ion exchange material; b) one or more ion exchange systems, incorporating the ion exchange material, that function to extract lithium ions from a liquid resource and elute the lithium ions into a lithium eluate; c) optionally one or more setups for concentration and/or purification of the lithium eluate to form a lithium concentrate, a purified lithium eluate, or a purified lithium concentrate; and d) optionally one or more setups for conversion of the lithium concentrate, purified lithium eluate, or purified lithium concentrate to form one or more refined lithium solutions or compounds. In an embodiment, reagents including acids and bases are reused and regenerated to improve the efficiency of the integrated system.

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

In one embodiment, the lithium salt solution is a lithium chloride solution and the acid is hydrochloric acid. In one embodiment, the lithium salt solution is a lithium sulfate solution and the acid is sulfuric acid. In one embodiment, the refined lithium chemical is lithium carbonate.

In one embodiment, the refined lithium chemical is lithium hydroxide. In one embodiment, the refined lithium chemical is lithium chloride. In one embodiment, the refined lithium chemical is lithium sulfate. In one embodiment, the refined lithium chemical is lithium phosphate. In one embodiment, the refined lithium chemical is lithium metal. In one embodiment, the refined lithium chemical is a solid. In one embodiment, the refined lithium chemical is in an aqueous solution or slurry. In one embodiment, the acid is hydrochloric acid, the lithium salt solution is a lithium chloride salt solution containing unreacted HCl, and the unreacted HCl is recovered and recycled to the ion exchange system. In one embodiment, HCl is recovered via distillation. In one embodiment, HCl is recovered via membrane distillation.

A System for Splitting a Residual Eluate

An aspect of the invention described herein is a system for lithium extraction, purification, and conversion of the lithium into a purified form. This system may function to extract lithium ions from a liquid resource using ion exchange, produce a lithium eluate, process the lithium eluate to precipitate a lithium salt and a residual eluate, further processing the residual eluate to produce acidified and basified solutions that may be recycled back into lithium extraction process.

In one embodiment, the system comprises an ion exchange system for selective lithium extraction. In one embodiment, the ion exchange system yields a lithium solution where acid and base are used to drive lithium release and uptake. In one embodiment, the system is for the concentration, neutralization, and purification of the lithium solution to produce a lithium concentrate. In one embodiment, the system is for the precipitation of lithium from the lithium concentrate by addition of sodium carbonate to yield a sodium solution. In one embodiment, the system recovers lithium ions from the sodium solution. In one embodiment, the system converts the sodium solution acidified or basified solution.

Figure 18:
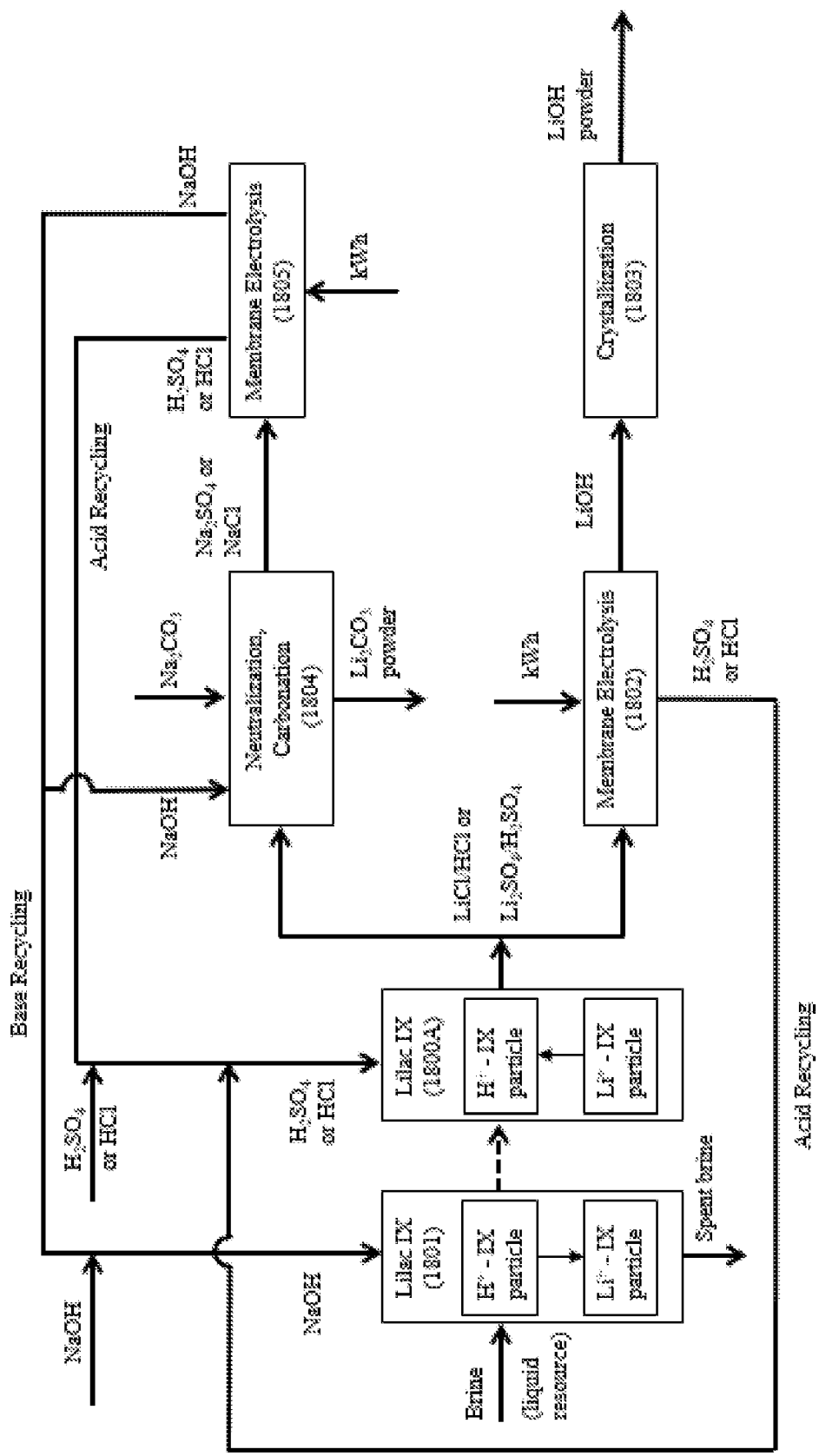
FIG. 18 illustrates an integrated system and/or process for producing lithium carbonate and/or lithium hydroxide with optional electrolysis regeneration and recycle of $H_2SO_4$ and/or HCl, and optional base regeneration and recycle. Units 1801 and 1800A show an ion exchange unit comprising ion exchange particles, where particles comprising hydrogen ions are treated with brine to exchange hydrogen ions with lithium ions to produce lithium-enriched ion exchange particles (1801), and lithium-enriched ion exchange particles are treated with an acid solution to regenerate particles comprising hydrogen ions and produce a lithium eluate (1800A).

An aspect of the invention described herein is an integrated process (FIG. 18) for producing a purified lithium salt from a liquid resource. In one example, after subjecting the liquid resource to an ion exchange process described herein (1801 and 1800A), a lithium eluate is produced. The lithium eluate is subjected to electrolysis (1802), which may result in an acidified solution and a lithium salt solution. The lithium salt solution may then be crystallized (1803) to produce the purified lithium salt, and the acidified solution may then be recycled back into the ion exchange process (1800A).

One aspect described herein is an integrated process (FIG. 18) for generating a purified lithium salt from a liquid resource, comprising: a) providing an ion exchange unit (1801 and 1800A), wherein said ion exchange unit comprises an ion exchange material; b) contacting said ion exchange material in said ion exchange unit with said liquid resource using pH modulation, wherein hydrogen ions from said ion exchange material are exchanged with lithium ions from said liquid resource to produce a lithium-enriched ion exchange material in said ion exchange unit (1801), and wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate (1800A); d) providing a electrochemical cell (1802) in fluid communication with said ion exchange unit, wherein said electrochemical cell comprises (i) a first electrode that is electrochemically reducing electrode, (ii) a second electrode that is electrochemically oxidizing, and (iii) an ion-conducting solution separating said first electrode from said second electrode; e) passing said lithium eluate to said electrochemical cell; f) subjecting said lithium eluate in said electrochemical cell to an electric current, wherein said electric current causes electrolysis of said lithium eluate to produce an acidified solution and a lithium salt solution; g) crystallization (1803) of said lithium salt solution to form said purified lithium salt; and h) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a reverse osmosis unit in fluid communication with said ion exchange unit and said electrochemical cell, and said reverse osmosis unit comprises a water-permeable membrane; e) passing said lithium eluate into said reverse osmosis unit contacting said water-permeable membrane, and wherein water molecules from said lithium eluate pass through said water-permeable membrane to produce water and a concentrated lithium eluate; f) providing a electrochemical cell in fluid communication with said reverse osmosis unit, wherein said electrochemical cell comprises (i) a first electrode that is electrochemically reducing electrode, (ii) a second electrode that is electrochemically oxidizing, and (iii) an ion-conducting solution separating said first electrode from said second electrode; g) passing said concentrated lithium eluate to said electrochemical cell; h) subjecting said concentrated lithium eluate in said electrochemical cell to an electric current, wherein said electric current causes electrolysis of said concentrated lithium eluate to produce an acidified solution and a lithium salt solution; i) crystallization of said lithium salt solution to form said purified lithium salt; and j) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a thermal evaporation unit in fluid communication with said ion exchange unit and said electrochemical cell, and said thermal evaporation unit comprises a heating element; e) passing said lithium eluate into said thermal evaporation unit to produce a concentrated lithium concentrate; f) providing a electrochemical cell in fluid communication with said thermal evaporation unit, wherein said electrochemical cell comprises (i) a first electrode that is electrochemically reducing electrode, (ii) a second electrode that is electrochemically oxidizing, and (iii) an ion-conducting solution separating said first electrode from said second electrode; g) passing said concentrated lithium eluate to said electrochemical cell; h) subjecting said concentrate lithium eluate in said electrochemical cell to an electric current, wherein said electric current causes electrolysis of said lithium eluate to produce an acidified solution and a lithium salt solution; i) crystallization of said lithium salt solution to form said purified lithium salt; and j) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect provided herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a purification unit in fluid communication with said ion exchange unit and said electrochemical cell; e) passing said lithium eluate into said purification unit to produce a purified lithium concentrate; f) providing a electrochemical cell in fluid communication with said ion exchange unit, wherein said electrochemical cell comprises (i) a first electrode that is an electrochemically reducing electrode, (ii) a second electrode that is electrochemically oxidizing, and (iii) an ion-conducting solution separating said first electrode from said second electrode; g) passing said purified lithium eluate to said electrochemical cell; h) subjecting said purified lithium eluate in said electrochemical cell to an electric current, wherein said electric current causes electrolysis of said lithium eluate to produce an acidified solution and a lithium salt solution; h) crystallization of said lithium salt solution to form said purified lithium salt; and i) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a electrochemical cell in fluid communication with said ion exchange unit, wherein said electrochemical cell comprises (i) a first electrode that is an electrochemically reducing electrode, (ii) a second electrode that is electrochemically oxidizing, and (iii) an ion-conducting solution separating said first electrode from said second electrode; e) passing said lithium eluate to said electrochemical cell; f) subjecting said lithium eluate in said electrochemical cell to an electric current, wherein said electric current causes electrolysis of said lithium eluate to produce an acidified solution and a lithium salt solution; g) providing a crystallizer in fluid communication with said ion exchange unit and said electrochemical cell; h) crystallization of said lithium salt solution into said crystallizer to form said purified lithium salt; and i) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource using pH modulation, wherein hydrogen ions from said ion exchange material are exchanged with lithium ions from said liquid resource to produce a lithium-enriched ion exchange material in said ion exchange unit, and wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a reverse osmosis unit in fluid communication with said ion exchange unit and said electrochemical cell, and said reverse osmosis unit comprises a water-permeable membrane; e) passing said lithium eluate into said reverse osmosis unit contacting said water-permeable membrane, and wherein water molecules from said lithium eluate pass through said water-permeable membrane to produce water and a concentrated lithium eluate; f) providing an electrochemical cell in fluid communication with said ion exchange unit, wherein said electrochemical cell comprises (i) a first electrode that is an electrochemically reducing electrode, (ii) a second electrode that is electrochemically oxidizing, and (iii) an ion-conducting solution separating said first electrode from said second electrode; g) passing said concentrated lithium eluate to said electrochemical cell; h) subjecting said concentrated lithium eluate in said electrochemical cell to an electric current, wherein said electric current causes electrolysis of said lithium eluate to produce an acidified solution and a lithium salt solution; i) crystallization of said lithium salt solution to form said purified lithium salt; and j) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource using pH modulation, wherein hydrogen ions from said ion exchange material are exchanged with lithium ions from said liquid resource to produce a lithium-enriched ion exchange material in said ion exchange unit, and wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a thermal evaporation unit in fluid communication with said ion exchange unit and said electrochemical cell, and said thermal evaporation unit comprises a heating element; e) passing said lithium eluate into said thermal evaporation unit to produce a concentrated lithium concentrate; f) providing an electrochemical cell in fluid communication with said ion exchange unit, wherein said electrochemical cell comprises (i) a first electrode that is an electrochemically reducing electrode, (ii) a second electrode that is electrochemically oxidizing, and (iii) an ion-conducting solution separating said first electrode from said second electrode; g) passing said concentrated lithium eluate to said electrochemical cell; h) subjecting said concentrated lithium eluate in said electrochemical cell to an electric current, wherein said electric current causes electrolysis of said lithium eluate to produce an acidified solution and a lithium salt solution; i) crystallization of said lithium salt solution to form said purified lithium salt; and j) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource using pH modulation, wherein hydrogen ions from said ion exchange material are exchanged with lithium ions from said liquid resource to produce a lithium-enriched ion exchange material in said ion exchange unit, and wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a purification unit in fluid communication with said ion exchange unit and said electrochemical cell; e) passing said lithium eluate into said purification unit to produce a purified lithium concentrate; f) providing an electrochemical cell in fluid communication with said ion exchange unit, wherein said electrochemical cell comprises (i) a first electrode that is an electrochemically reducing electrode, (ii) a second electrode that is electrochemically oxidizing, and (iii) an ion-conducting solution separating said first electrode from said second electrode; g) passing said purified lithium eluate to said electrochemical cell; h) subjecting said purified lithium eluate in said electrochemical cell to an electric current, wherein said electric current causes electrolysis of said lithium eluate to produce an acidified solution and a lithium salt solution; i) crystallization of said lithium salt solution to form said purified lithium salt; and j) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

One aspect described herein is an integrated process for generating a purified lithium salt from a liquid resource, comprising: a) providing an ion exchange unit, wherein said ion exchange unit comprises an ion exchange material; b) contacting said ion exchange material in said ion exchange unit with said liquid resource using pH modulation, wherein hydrogen ions from said ion exchange material are exchanged with lithium ions from said liquid resource to produce a lithium-enriched ion exchange material in said ion exchange unit and wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a electrochemical cell in fluid communication with said ion exchange unit, wherein said electrochemical cell comprises (i) a first electrode that is electrochemically reducing electrode, (ii) a second electrode that is electrochemically oxidizing, and (iii) an ion-conducting solution separating said first electrode from said second electrode; e) passing said lithium eluate to said electrochemical cell; f) subjecting said lithium eluate in said electrochemical cell to an electric current, wherein said electric current causes electrolysis of said lithium eluate to produce an acidified solution and a lithium salt solution; g) providing a crystallizer in fluid communication with said ion exchange unit and said electrochemical cell; h) crystallization of said lithium salt solution to form said purified lithium salt; and i) recycling said acidified solution from said electrochemical cell to said ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process (FIG. 18) for producing a purified lithium salt from a liquid resource. In one example, after subjecting the liquid resource to an ion exchange process described herein (1801 and 1800A), a lithium eluate is produced. The lithium eluate may then be treated to precipitate the lithium salt and a residual eluate. The residual eluate is then subjected to electrolysis (1805), which may result in an acidified solution and basified solution. These acidified and basified solutions may then be recycled back into the ion exchange process of the system (1800A and 1801, respectively).

An aspect of the invention described herein is an integrated process (FIG. 18) for producing a purified lithium salt from a liquid resource, comprising: a) providing an ion exchange unit (1801 and 1800A), wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit (1801); c) treating said lithium-enriched ion exchange material in said ion exchange unit with an acid solution, wherein said lithium ions from said lithium-enriched ion exchange material are exchanged with hydrogen ions from said acid solution to produce a lithium eluate (1800A); d) providing a crystallizer (1804) in fluid communication with said ion exchange unit, wherein said crystallizer is configured to add a precipitant to said lithium eluate; e) passing said lithium eluate to said crystallizer; f) treating said lithium eluate in said crystallizer with a precipitant to precipitate a lithium salt and a residual eluate; g) providing a electrochemical cell (1805) in fluid communication with said crystallizer, wherein said electrochemical cell comprises (i) a first electrochemically reducing electrode and (ii) a second electrochemically oxidizing electrode; h) passing said residual eluate to said electrochemical cell; i) subjecting said residual eluate in said electrochemical cell to an electric current, wherein said electric current causes electrolysis of said residual eluate to produce an acidified solution and a basified solution; and j) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource during pH modulation, wherein hydrogen ions from said ion exchange material are exchanged with lithium ions from said liquid resource to produce a lithium-enriched ion exchange material in said ion exchange unit, wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a crystallizer in fluid communication with said ion exchange unit, wherein said crystallizer is configured to add a precipitant to said lithium eluate; e) passing said lithium eluate to said crystallizer; f) treating said lithium eluate in said crystallizer with a precipitant to precipitate a lithium salt and a residual eluate; g) providing a electrochemical cell in fluid communication with said crystallizer, wherein said electrochemical cell comprises (i) a first electrochemically reducing electrode and (ii) a second electrochemically oxidizing electrode; h) passing said residual eluate to said electrochemical cell; i) subjecting said residual eluate in said electrochemical cell to an electric current, wherein said electric current causes electrolysis of said residual eluate to produce an acidified solution and a basified solution; and j) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a reverse osmosis unit in fluid communication with said ion exchange unit and said crystallizer, and said reverse osmosis unit comprises a water-permeable membrane; e) passing said lithium eluate into said reverse osmosis unit contacting said water-permeable membrane, and wherein water molecules from said lithium eluate pass through said water-permeable membrane to produce water and a concentrated lithium eluate; f) providing a crystallizer in fluid communication with said reverse osmosis unit, wherein said crystallizer is configured to add a precipitant to said lithium eluate; g) passing said concentrated lithium eluate to said crystallizer; h) treating said concentrated lithium eluate in said crystallizer with a precipitant to precipitate a lithium salt and a residual eluate; i) providing a electrochemical cell in fluid communication with said crystallizer, wherein said electrochemical cell comprises (i) a first electrochemically reducing electrode and (ii) a second electrochemically oxidizing electrode; j) passing said residual eluate to said electrochemical cell; k) subjecting said residual eluate in said electrochemical cell to an electric current, wherein said electric current causes electrolysis of said residual eluate to produce an acidified solution and a basified solution; and l) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a thermal evaporation unit in fluid communication with said ion exchange unit, wherein said thermal evaporation unit comprises a heating element; e) passing said lithium eluate into said thermal evaporation unit to produce a concentrated lithium eluate; f) providing a crystallizer in fluid communication with said ion exchange unit, wherein said crystallizer is configured to add a precipitant to said lithium eluate; g) passing said concentrated lithium eluate to said crystallizer; h) treating said concentrated lithium eluate in said crystallizer with a precipitant to precipitate a lithium salt and a residual eluate; i) providing a electrochemical cell in fluid communication with said crystallizer, wherein said electrochemical cell comprises (i) a first electrochemically reducing electrode and (ii) a second electrochemically oxidizing electrode; j) passing said residual eluate to said electrochemical cell; k) subjecting said residual eluate in said electrochemical cell to an electric current, wherein said electric current causes electrolysis of said residual eluate to produce an acidified solution and a basified solution; and l) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a purification unit in fluid communication with said ion exchange unit; e) passing said lithium eluate from said ion exchange unit to said purification unit to produce a purified lithium concentrate; f) providing a crystallizer in fluid communication with said ion exchange unit, wherein said crystallizer is configured to add a precipitant to said lithium eluate; g) passing said purified lithium eluate to said crystallizer; h) treating said purified lithium eluate in said crystallizer with a precipitant to precipitate a lithium salt and a residual eluate; i) providing a electrochemical cell in fluid communication with said crystallizer, wherein said electrochemical cell comprises (i) a first electrochemically reducing electrode and (ii) a second electrochemically oxidizing electrode; j) passing said residual eluate to said electrochemical cell; k) subjecting said residual eluate in said electrochemical cell to an electric current, wherein said electric current causes electrolysis of said residual eluate to produce an acidified solution and a basified solution; and l) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource during pH modulation, wherein hydrogen ions from said ion exchange material are exchanged with lithium ions from said liquid resource to produce a lithium-enriched ion exchange material in said ion exchange unit, wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a reverse osmosis unit in fluid communication with said ion exchange unit and said crystallizer, and said reverse osmosis unit comprises a water-permeable membrane; e) passing said lithium eluate into said reverse osmosis unit contacting said water-permeable membrane, and wherein water molecules from said lithium eluate pass through said water-permeable membrane to produce water and a concentrated lithium eluate; f) providing a crystallizer in fluid communication with said reverse osmosis unit, wherein said crystallizer is configured to add a precipitant to said lithium eluate; g) passing said concentrated lithium eluate to said crystallizer; h) treating said concentrated lithium eluate in said crystallizer with a precipitant to precipitate a lithium salt and a residual eluate; i) providing a electrochemical cell in fluid communication with said crystallizer, wherein said electrochemical cell comprises (i) a first electrochemically reducing electrode and (ii) a second electrochemically oxidizing electrode; j) passing said residual eluate to said electrochemical cell; k) subjecting said residual eluate in said electrochemical cell to an electric current, wherein said electric current causes electrolysis of said residual eluate to produce an acidified solution and a basified solution; and l) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource during pH modulation, wherein hydrogen ions from said ion exchange material are exchanged with lithium ions from said liquid resource to produce a lithium-enriched ion exchange material in said ion exchange unit, wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a thermal evaporation unit in fluid communication with said ion exchange unit, wherein said thermal evaporation unit comprises a heating element; e) passing said lithium eluate into said thermal evaporation unit to produce a concentrated lithium eluate; f) providing a crystallizer in fluid communication with said ion exchange unit, wherein said crystallizer is configured to add a precipitant to said lithium eluate; g) passing said concentrated lithium eluate to said crystallizer; h) treating said concentrated lithium eluate in said crystallizer with a precipitant to precipitate a lithium salt and a residual eluate; i) providing a electrochemical cell in fluid communication with said crystallizer, wherein said electrochemical cell comprises (i) a first electrochemically reducing electrode and (ii) a second electrochemically oxidizing electrode; j) passing said residual eluate to said electrochemical cell; k) subjecting said residual eluate in said electrochemical cell to an electric current, wherein said electric current causes electrolysis of said residual eluate to produce an acidified solution and a basified solution; and l) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource during pH modulation, wherein hydrogen ions from said ion exchange material are exchanged with lithium ions from said liquid resource to produce a lithium-enriched ion exchange material in said ion exchange unit, wherein said pH modulation maintains an equilibrium in favor of hydrogen ions from said hydrogen-rich ion exchange material being exchanged with lithium ions from said liquid resource; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a purification unit in fluid communication with said ion exchange unit; e) passing said lithium eluate from said ion exchange unit to said purification unit to produce a purified lithium concentrate; f) providing a crystallizer in fluid communication with said ion exchange unit, wherein said crystallizer is configured to add a precipitant to said lithium eluate; g) passing said purified lithium eluate to said crystallizer; h) treating said purified lithium eluate in said crystallizer with a precipitant to precipitate a lithium salt and a residual eluate; i) providing a electrochemical cell in fluid communication with said crystallizer, wherein said electrochemical cell comprises (i) a first electrochemically reducing electrode and (ii) a second electrochemically oxidizing electrode; j) passing said residual eluate to said electrochemical cell; k) subjecting said residual eluate in said electrochemical cell to an electric current, wherein said electric current causes electrolysis of said residual eluate to produce an acidified solution and a basified solution; and l) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is an integrated process for producing a purified lithium salt from a liquid resource. In one example, after subjecting the liquid resource to an ion exchange process described herein, a lithium eluate is produced. The lithium may then be concentrated at least once, and may be purified of other selected metal ions. The purified lithium concentrate may then be treated to precipitate a lithium salt and a residual eluate. The residual eluate may then be subjected to electrolysis to produce an acidified and basified solution, which may then be recycled back into the ion exchange process.

An aspect of the invention described herein is an integrated process for producing a purified lithium salt from a liquid resource, comprising: a) providing an ion exchange unit, wherein said ion exchange unit comprises an ion exchange material; b) contacting said ion exchange material in said ion exchange unit with said liquid resource, wherein hydrogen ions from said ion exchange material are exchanged with lithium ions from said liquid resource to produce a lithium-enriched ion exchange material in said ion exchange unit, and sodium hydroxide is added to the brine to neutralize protons from the ion exchange material; c) treating said lithium-enriched ion exchange material in said ion exchange unit with an acid solution, wherein said lithium ions from said lithium-enriched ion exchange material are exchanged with hydrogen ions from said acid solution to produce a lithium eluate; d) providing a reverse osmosis unit in fluid communication with said ion exchange unit, wherein said reverse osmosis unit comprises a water permeable membrane; e) passing said lithium eluate from said ion exchange unit to said reverse osmosis unit thereby contacting said lithium eluate with said water permeable membrane, wherein water molecules from said lithium eluate passes through said water-permeable membrane to produce water and a concentrated lithium eluate; f) providing a thermal evaporation unit in fluid communication with said reverse osmosis unit, wherein said thermal evaporation unit comprises a heating element; g) passing said concentrated lithium eluate from said reverse osmosis unit to said thermal evaporation unit, thereby producing a further concentrated lithium eluate; h) providing a purification unit in fluid communication with said thermal evaporation unit; i) passing said further concentrated lithium eluate from said thermal evaporation unit to said purification unit, thereby producing a purified lithium concentrate; j) providing a crystallizer in fluid communication with said purification unit, wherein said crystallizer is configured to add a precipitant to said purified lithium concentrate; k) treating said purified lithium concentrate with said precipitant to precipitate a lithium salt and a residual eluate; l) providing a electrochemical cell in fluid communication with said crystallizer, wherein said electrochemical cell comprises (i) a first electrochemically reducing electrode and (ii) a second electrochemically oxidizing electrode; m) passing said residual eluate to said electrochemical cell; n) subjecting said residual eluate in said electrochemical cell to an electric current, wherein said electric current causes electrolysis of said residual eluate to produce an acidified solution and a basified solution; and o) recycling said acidified solution and said basified solution from said electrochemical cell to any one of said ion exchange unit of a) to c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

An aspect of the invention described herein is a method for producing lithium carbonate, comprising: contacting an lithium-selective ion exchange media with a brine to absorb lithium and release protons while base is added to the brine to neutralize protons, contacting said lithium-selective ion exchange media with water to remove residual brine from the media, contacting said lithium-selective ion exchange media with acid to absorb protons while releasing lithium ions and producing a lithium solution, purifying and concentrating the lithium solution, precipitating the lithium as lithium carbonate by addition of sodium carbonate yielding a sodium solution, optionally recovering lithium from the sodium solution, converting the sodium solution into acid and base, reusing the acid to elute lithium from the lithium-selective ion exchange media, and reusing the base to neutralize protons released into the brine from the lithium-selective ion exchange media. In one embodiment, there is a system for concentration, neutralization, and purification of the lithium solution to produce a lithium concentrate, a system for precipitation of lithium from the lithium concentrate by addition of sodium carbonate, yielding a sodium solution, optionally a system for recovering lithium from the sodium solution, and a system for converting the sodium solution into acid and base.

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

In some embodiments, lithium is extracted from a brine using a lithium extraction system, wherein a lithium solution is eluted from ion exchange beads, particles, material, or other media in an ion exchange column, stirred tank reactor, or other reactor system, and the lithium solution is optionally concentrated, pH neutralized, and purified to remove species, such as Mg, Ca, Sr, Mn, Fe and/or B, and treated with sodium carbonate and/or sodium hydroxide to precipitate lithium carbonate while leaving a sodium solution with low levels of Mg, Ca, and other impurities. This sodium solution may be treated with a lithium extraction system to recover lithium from the sodium solution. The sodium solution may then be converted into acid and a base, which may be reused as reagents in a lithium extraction system.

In some embodiments, sulfuric or hydrochloric acid are used to elute lithium from the lithium extraction system producing lithium sulfate or lithium chloride. In some embodiments, lithium sulfate or lithium chloride is added as a reagent with sodium carbonate to yield lithium carbonate precipitates and a mother liquor comprising sodium sulfate or sodium chloride. In some embodiments, the sodium sulfate or sodium chloride mother liquor is converted into acid and base using electrodialysis, electrolysis, or other methods. In some embodiments, sodium hydroxide base is produced from the mother liquor. In some embodiments, sodium hydroxide base produced from the mother liquor is used to neutralize protons during lithium uptake from brine. In some embodiments, sodium hydroxide base produced from the mother liquor is used for pH correction, ion exchange, purification, or other purposes in an integrated lithium extraction system. In some embodiments, sulfuric or hydrochloric acid is produced from the mother liquor. In some embodiments, sulfuric or hydrochloric acid produced from the mother liquor is used in a lithium extraction system to elute lithium from ion exchange media. In some embodiments, the acid and/or base is used off-site or on-site for purposes related or unrelated to lithium extraction.

In some embodiments, a lithium solution is treated with sodium carbonate to precipitate lithium carbonate to yield a sodium solution containing residual carbonate species. In some embodiments, those carbonate species are converted to carbonate dioxide by passing the sodium solution through a lithium extraction system that drops the pH of the sodium solution, thereby converting carbonate anions into carbon dioxide. In some embodiments, lithium carbonate is precipitated through addition of sodium carbonate salt or solution, or other carbonate salts or solutions. In some embodiments, hydrochloric or sulfuric acid is added to the carbonate-containing lithium solution in advance of salt splitting. In some embodiments, carbonate is removed from the sodium solution following lithium carbonate precipitation and prior to salt splitting.

The process described herein may benefit from the electrolysis of the mother liquor. In one embodiment, the regenerated acid and base is used in the lithium extraction unit. This may allow the production of lithium carbonate while eliminating the need to supply large quantities of acid solution and base solution. This may also eliminate the need to dispose of the mother liquor. These may enable low-cost lithium production using the processes described herein.

In one aspect, the present disclosure provides an integrated process for producing lithium hydroxide powder from a liquid resource, comprising: a) providing an ion exchange unit, wherein the ion exchange unit comprises an ion exchange material; b) contacting the ion exchange material in the ion exchange unit with the liquid resource, wherein hydrogen ions from the ion exchange material are exchanged with lithium ions from the liquid resource to produce a lithium-enriched ion exchange material in the ion exchange unit; c) treating the lithium-enriched ion exchange material with an acid solution, wherein the lithium ions from the lithium-enriched ion exchange material are exchanged with hydrogen ions from the acid solution to produce a lithium eluate; d) providing a membrane cell in fluid communication with the ion exchange unit, wherein the membrane cell comprises (i) a first compartment containing an electrochemically reducing electrode, (ii) a second compartment containing an electrochemically oxidizing electrode, and (iii) an ion-conducting membrane separating the first compartment from the second compartment; e) passing the lithium eluate to the membrane cell; f) subjecting the lithium eluate in the membrane cell to an electric current, wherein the electric current causes electrolysis of the lithium eluate to produce an acidified solution and a lithium hydroxide solution; g) crystallization of the lithium hydroxide solution to form a lithium hydroxide powder; and h) recycling the acidified solution from the membrane cell to the ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

In one aspect, the present disclosure provides an integrated process for producing lithium hydroxide powder from a liquid resource, comprising: a) providing an ion exchange unit, wherein the ion exchange unit comprises an ion exchange material; b) contacting the ion exchange material in the ion exchange unit with the liquid resource, wherein hydrogen ions from the ion exchange material are exchanged with lithium ions from the liquid resource to produce a lithium-enriched ion exchange material in the ion exchange unit; c) treating the lithium-enriched ion exchange material with an acid solution, wherein the lithium ions from the lithium-enriched ion exchange material are exchanged with hydrogen ions from the acid solution to produce a lithium eluate; d) providing an electrolysis cell in fluid communication with the ion exchange unit, wherein the electrolysis cell comprises (i) a first electrochemically reducing electrode and (ii) a second electrochemically oxidizing electrode; e) passing the lithium eluate to the membrane cell; f) subjecting the lithium eluate in the membrane cell to an electric current, wherein the electric current causes electrolysis of said lithium eluate to produce an acidified solution and a lithium hydroxide solution; g) crystallization of the lithium hydroxide solution to form a lithium hydroxide powder; and h) recycling the acidified solution from the membrane cell to the ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

In one aspect, the present disclosure provides an integrated process for producing lithium carbonate powder from a liquid resource, comprising: a) providing an ion exchange unit, wherein the ion exchange unit comprises an ion exchange material; b) contacting the ion exchange material in the ion exchange unit with the liquid resource, wherein hydrogen ions from the ion exchange material are exchanged with lithium ions from the liquid resource to produce a lithium-enriched ion exchange material in the ion exchange unit and sodium hydroxide is added to the brine to neutralize protons from the ion exchange material; c) treating the lithium-enriched ion exchange material with an acid solution, wherein the lithium ions from the lithium-enriched ion exchange material are exchanged with hydrogen ions from the acid solution to produce a lithium eluate; d) removing water from the lithium eluate solution to produce a lithium concentrate solution; e) purifying the lithium concentrate solution to produce a purified lithium solution; f) reacting said purified lithium solution with a sodium carbonate solution to precipitate lithium carbonate product and produce a sodium byproduct solution; g) passing the sodium byproduct solution to an electrochemical cell; h) subjecting the sodium byproduct solution in the electrochemical cell to an electric current, wherein the electric current causes electrolysis of the sodium byproduct solution to produce an acidified solution and a sodium hydroxide solution; i) recycling the sodium hydroxide solution from the electrochemical cell to the ion exchange unit of b); and j) recycling the acidified solution from the electrochemical cell to the ion exchange unit of c).

In one embodiment, said system further comprises a carbonation unit for precipitating $Li_2CO_3$ by addition of $Na_2CO_3$ to said lithium eluate solution. In one embodiment, said system further comprises a bicarbonation unit for purifying $Li_2CO_3$ through addition of $CO_2$. In one embodiment, $Li_2CO_3$ is reacted with $CO_2$ gas to produce a lithium bicarbonate solution, which is purified prior to precipitation of purified $Li_2CO_3$. In one embodiment a lithium bicarbonate solution is purified using ion exchange media to remove impurities, including magnesium, calcium, strontium, barium, boron, iron, transition metals, other impurities, or combinations thereof. In one embodiment, $Li_2CO_3$ is purified in a continuous process. In one embodiment, a unit for purification of $Li_2CO_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

In one aspect, the present disclosure provides an integrated process for producing lithium phosphate powder from a liquid resource, comprising: a) providing an ion exchange unit, wherein the ion exchange unit comprises an ion exchange material; b) contacting the ion exchange material in the ion exchange unit with the liquid resource, wherein hydrogen ions from the ion exchange material are exchanged with lithium ions from the liquid resource to produce a lithium-enriched ion exchange material in the ion exchange unit, and sodium hydroxide is added to the brine to neutralize protons from the ion exchange material; c) treating the lithium-enriched ion exchange material with an acid solution, wherein the lithium ions from the lithium-enriched ion exchange material are exchanged with hydrogen ions from the acid solution to produce a lithium eluate; d) removing water from the lithium eluate solution to produce a lithium concentrate solution; e) purifying the lithium concentrate solution to produce a purified lithium solution; f) reacting said purified lithium solution with a phosphate solution to precipitate lithium phosphate product and produce a sodium byproduct solution; g) passing the sodium byproduct solution to an electrochemical cell; h) subjecting the sodium byproduct solution in the electrochemical cell to an electric current, wherein the electric current causes electrolysis of the sodium byproduct solution to produce an acidified solution and a sodium hydroxide solution; i) recycling the sodium hydroxide solution from the electrochemical cell to the ion exchange unit of b); and j) recycling the acidified solution from the electrochemical cell to the ion exchange unit of c).

In one embodiment, the ion exchange material in the ion exchange unit is selected from the group consisting of $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof; wherein x is from 0.1-10 and y is from 0.1-10. In one embodiment, the ion exchange material in the ion exchange unit is selected from the group consisting of $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, or $Li_2CuP_2O_7$.

In one embodiment, the ion exchange material in the ion exchange unit comprises coated ion exchange particles, uncoated ion exchange particles, or combinations thereof. In a further one aspect, a coating material comprises a polymer. In an embodiment, the coating material comprises a chloro-polymer, a fluoro-polymer, a chloro-fluoro-polymer, a hydrophilic polymer, a hydrophobic polymer, co-polymers thereof, mixtures thereof, or combinations thereof.

In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof.

In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof.

In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In one embodiment, the ion exchange material in the ion exchange unit comprises coated ion exchange particles. In one embodiment, the ion exchange material in the ion exchange unit is in a powder or slurry form.

In one embodiment, the acid solution of the process is a solution of hydrochloric acid, sulfuric acid, phosphoric acid, hydrobromic acid, chloric acid, perchloric acid, nitric acid, formic acid, acetic acid, or combinations thereof.

In some embodiments, lithium carbonate crystals are milled into a size range with an average particle size below about 100 microns, below about 50 microns, below about 20 microns, below about 10 microns, below about 5 microns, below about 2 microns, below about 1 micron, or larger than about 100 microns. In one embodiment, lithium hydroxide is processed into pellets.

Electrolysis

An aspect of the invention described herein is an integrated process for generating a purified lithium concentrate from a liquid resource, comprising: a) providing an ion exchange unit, wherein said ion exchange unit comprises an ion exchange material; b) contacting the ion exchange material in the ion exchange unit with the liquid resource, wherein hydrogen ions from the ion exchange material are exchanged with lithium ions from the liquid resource to produce a lithium-enriched ion exchange material in the ion exchange unit; c) treating the lithium-enriched ion exchange material with an acid solution, wherein the lithium ions from the lithium-enriched ion exchange material are exchanged with hydrogen ions from the acid solution to produce a lithium eluate; d) providing a membrane cell in fluid communication with the ion exchange unit, wherein the membrane cell comprises (i) a first compartment containing an electrochemically reducing electrode, (ii) a second compartment containing an electrochemically oxidizing electrode, and (iii) an ion-conducting membrane separating said at least first compartment from said second compartment; e) passing the lithium eluate to the membrane cell; f) subjecting the lithium eluate in the membrane cell to an electric current, wherein the electric current causes electrolysis of said lithium eluate to produce an acidified solution and the purified lithium concentrate; and g) recycling said acidified solution from the membrane cell to the ion exchange unit of c).

In one embodiment, the lithium-enriched ion exchange material is treated in the ion exchange unit. In one embodiment, the lithium eluate is produced in the ion exchange unit. In one embodiment, the lithium eluate is passed from the ion exchange unit to the membrane cell. In one embodiment, wherein prior to b), the ion exchange material in the ion exchange unit is treated with an acid solution to produce a hydrogen-enriched ion exchange material in the ion exchange unit. In one embodiment, wherein b) further comprises pH modulation, wherein the pH modulation maintains an equilibrium in favor of hydrogen ions from the hydrogen-rich ion exchange material being exchanged with lithium ions from the liquid resource. In one embodiment, the process further comprises treating the lithium-enriched ion exchange material with base in addition to the acid solution. In one embodiment the base is $Ca(OH)_2$ or NaOH.

In one embodiment, one of the processing systems is a membrane electrolysis system. In one embodiment, the membrane electrolysis system produces a lithium salt solution and an acid that is returned to the ion exchange system. In one embodiment, the membrane electrolysis system converts a lithium sulfate solution into a lithium hydroxide solution and a sulfuric acid solution that is returned to the ion exchange system. In one embodiment, the membrane electrolysis system converts a lithium chloride solution into a lithium hydroxide solution and hydrochloric acid that is returned to the ion exchange system. In one embodiment, the membrane electrolysis system converts a lithium chloride solution into a lithium hydroxide solution, hydrogen gas, and chlorine gas, and the hydrogen and chlorine gases are converted to hydrochloric acid, which is returned to the ion exchange system.

In one embodiment, one of the processing systems is an electrochemical cell system. In one embodiment, the electrochemical cell system produces a lithium salt solution and an acid that is returned to the ion exchange system. In one embodiment, the electrochemical cell system converts a lithium sulfate solution into a lithium hydroxide solution and a sulfuric acid solution that is returned to the ion exchange system. In one embodiment, the electrochemical cell system converts a lithium chloride solution into a lithium hydroxide solution and hydrochloric acid that is returned to the ion exchange system. In one embodiment, the electrochemical cell system converts a lithium chloride solution into a lithium hydroxide solution, hydrogen gas, and chlorine gas, and the hydrogen and chlorine gases are converted to hydrochloric acid, which is returned to the ion exchange system.

In one embodiment, one of the processing systems is an electrodialysis system. In one embodiment, the electrodialysis system produces a lithium salt solution and an acid that is returned to the ion exchange system. In one embodiment, the electrodialysis system converts a lithium sulfate solution into a lithium hydroxide solution and a sulfuric acid solution that is returned to the ion exchange system. In one embodiment, the electrodialysis system converts a lithium chloride solution into a lithium hydroxide solution and hydrochloric acid that is returned to the ion exchange system. In one embodiment, the electrodialysis system converts a lithium chloride solution into a lithium hydroxide solution, hydrogen gas, and chlorine gas, and the hydrogen and chlorine gases are converted to hydrochloric acid, which is returned to the ion exchange system.

In one embodiment of the integrated system, the integrated system includes one or more electrolysis systems. In one embodiment, an electrolysis system is comprised of one or more membrane electrolysis cells. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system, that has optionally been concentrated and/or purified. In one embodiment, acidified solution from an electrolysis system is returned to an ion exchange system to elute more lithium eluate solution.

In one embodiment of the integrated system, the integrated system includes one or more electrolysis systems. In one embodiment, an electrolysis system is comprised of one or more electrochemical cells. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment of the integrated system, the integrated system includes one or more electrolysis systems. In one embodiment, an electrolysis system is comprised of one or more electrodialysis cells. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment, a lithium salt solution contains unreacted acid from the ion exchange system. In one embodiment, unreacted acid in the lithium salt solution from an ion exchange system passes through an electrolysis system, and is further acidified to form an acidified solution. In one embodiment, a lithium salt solution derived from an ion exchange system is purified to remove impurities without neutralizing the unreacted acid in the lithium salt solution, and is then fed into an electrolysis system.

In one embodiment, an acidified solution produced by an electrolysis system contains lithium ions from the lithium salt solution fed into the electrolysis system. In one embodiment, an acidified solution containing lithium ions leaves the electrolysis system, and is fed back to an ion exchange system to elute lithium, to produce more lithium salt solution.

In one embodiment of an electrolysis system, the electrolysis cells are electrochemical cells. In one embodiment of a electrochemical cell, the membranes may be cation-conducting and/or anion-conducting membranes. In one embodiment, the electrochemical cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are electrodialysis cells. In one embodiment of a electrodialysis cell, the membranes may be cation-conducting and/or anion-conducting membranes. In one embodiment, the electrodialysis cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are membrane electrolysis cells. In one embodiment of a membrane electrolysis cell, the membranes may be cation-conducting and/or anion-conducting membranes. In one embodiment, the membrane electrolysis cell is a two-compartment cell with a cation-conducting membrane that allows for transfer of lithium ions between the chambers but prevents transfer of anion groups such as chloride, sulfate, and hydroxide groups.

In one embodiment, the membrane electrolysis cell is a three-compartment cell with a cation-conducting membrane that allows for transfer of lithium ions separating a compartment with an electrochemically reducing electrode from a central compartment, and with an anion-conducting membrane that allows for transfer of anions ions separating a compartment with an electrochemically oxidizing electrode from the central compartment. In one embodiment, the cation-conducting membrane prevents transfer of anions such as chloride, sulfate, or hydroxide. In one embodiment, the anion-conducting membrane prevents transfer of cations such as lithium, sodium, or protons.

In one embodiment of the membrane electrolysis cell, the membranes may be comprised of Nafion®, sulfonated tetrafluoroethylene, sulfonated fluoropolymer, sulfonated styrene-divinylbenzene polymer (MK-40™), co-polymers, other membrane materials, composites, or combinations thereof. In one embodiment of the membrane electrolysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the membrane electrolysis cell, the polymer structures of the cation exchange membrane are functionalized with sulfone groups, carboxylic acid groups, phosphate groups, other negatively charged functional groups, or combinations thereof.

In one embodiment of the electrochemical cell, the membranes may be comprised of Nafion®, sulfonated tetrafluoroethylene, sulfonated fluoropolymer, sulfonated styrene-divinylbenzene polymer (MK-40™), co-polymers, other membrane materials, composites, or combinations thereof. In one embodiment of the electrochemical cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrochemical cell, the polymer structures of the cation exchange membrane are functionalized with sulfone groups, carboxylic acid groups, phosphate groups, other negatively charged functional groups, or combinations thereof.

In one embodiment of the electrodialysis cell, the membranes may be comprised of Nafion®, sulfonated tetrafluoroethylene, sulfonated fluoropolymer, sulfonated styrene-divinylbenzene polymer (MK-40™), co-polymers, other membrane materials, composites, or combinations thereof. In one embodiment of the electrodialysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrodialysis cell, the polymer structures of the cation exchange membrane are functionalized with sulfone groups, carboxylic acid groups, phosphate groups, other negatively charged functional groups, or combinations thereof.

In one embodiment of the membrane electrolysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrochemical cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrodialysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the membrane electrolysis cell, the membrane may have a thickness of less than 10 µm, less than 50 µm, less than 200 µm, less than 400 µm, or less than 1,000 µm. In one embodiment of the membrane electrolysis cell, the membranes may have a thickness of greater than 1,000 µm. In one embodiment of the membrane electrolysis cell, the membrane may have a thickness of about 1 m to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrochemical cell, the membrane may have a thickness of less than 10 µm, less than 50 µm, less than 200 µm, less than 400 µm, or less than 1,000 µm. In one embodiment of the electrochemical cell, the membranes may have a thickness of greater than 1,000 µm. In one embodiment of the electrochemical cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrodialysis cell, the membrane may have a thickness of less than 10 µm, less than 50 µm, less than 200 µm, less than 400 µm, or less than 1,000 µm. In one embodiment of the electrodialysis cell, the membranes may have a thickness of greater than 1,000 µm. In one embodiment of the electrodialysis cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment, an electrolysis system contains electrolysis cells that may be two-compartment electrolysis cells or three-compartment electrolysis cells.

In one embodiment of a two-compartment electrolysis cell, the cell contains a first compartment that contains an electrochemically oxidizing electrode. A lithium salt solution enters the first compartment and is converted into an acidified solution. In one embodiment of a two-compartment electrolysis cell, the cell contains a second compartment containing an electrochemically reducing electrode. This second compartment takes as an input a water or dilute LiOH solution, and produces as an output a more concentrated LiOH solution. In one embodiment, the compartments are separated by a cation-conducting membrane that limits transport of anions.

In one embodiment of a three-compartment electrolysis cell, the cell contains a first compartment containing an electrochemically oxidizing electrode. The first compartment takes as an input water or a dilute salt solution, and produces as an output an acidified solution. In one embodiment of a three-compartment electrolysis cell, the cell contains a second compartment containing an electrochemically reducing electrode. This second compartment takes as an input a water or dilute LiOH solution, and produces as an output a more concentrated LiOH solution. In one embodiment of a three-compartment electrolysis cell, the cell contains a third compartment containing no electrode, which is located between the first and second compartment, and takes as an input a concentrated lithium salt solution, and produces as an output a dilute lithium salt solution. In one embodiment, the first and the third compartments are separated by an anion-conducting membrane that limits transport of cations. In one embodiment, the second and third compartments are separated by a cation-conducting membrane that limits transport of anions.

In one embodiment of the electrolysis cell, the electrodes may be comprised of titanium, niobium, zirconium, tantalum, magnesium, titanium dioxide, oxides thereof, or combinations thereof. In one embodiment of the electrolysis cell, the electrodes may be coated with platinum, $TiO_2$, $ZrO_2$, $Nb_2O_5$, $Ta_2O_5$, $SnO_2$, $IrO_2$, $RuO_2$, $PtO_x$, mixed metal oxides, graphene, derivatives thereof, or combinations thereof. In one embodiment of the electrolysis cell, the electrodes may be comprised of steel, stainless steel, nickel, nickel alloys, steel alloys, or graphite.

In one embodiment of the electrolysis system, the lithium salt solution is a LiCl solution optionally containing HCl. In one embodiment of the electrolysis system, the electrochemically oxidizing electrode oxides chloride ions to produce chlorine gas.

In one embodiment of the electrolysis system, the lithium salt solution is a $Li_2SO_4$ solution optionally containing $H_2SO_4$. In one embodiment of the electrolysis system, the electrochemically oxidizing electrode oxidizes water, hydroxide, or other species to produce oxygen gas.

In one embodiment of the electrolysis system, the electrochemically reducing electrode reduces hydrogen ions to produce hydrogen gas. In one embodiment of the electrolysis system, the chamber containing the electrochemically reducing electrode produces a LiOH solution or increases the LiOH concentration of a solution.

In one embodiment of the electrolysis system, chlorine and hydrogen gas are burned to produce HCl in an HCl burner. In one embodiment, the HCl burner is a column maintained at approximately 100-300 degrees Celsius. In one embodiment, HCl produced in the HCl burner is cooled through a heat exchange and absorbed into water in an absorption tower to produce aqueous HCl solution. In one embodiment, the HCl solution produced from the HCl burner is used to elute lithium from an ion exchange system.

In one embodiment, the concentration of lithium in the lithium salt solution that enters the electrolysis system may be greater than 1,000 mg/L, greater than 5,000 mg/L, greater than 20,000 mg/L, greater than 50,000 mg/L, or greater than 200,000 mg/L.

In one embodiment, the concentration of lithium in the LiOH solution leaving the electrolysis system may be greater than 1,000 mg/L, greater than 1,000 mg/L, greater than 5,000 mg/L, greater than 20,000 mg/L, greater than 50,000 mg/L, or greater than 200,000 mg/L.

In one embodiment, the pH of the acidified solution leaving the electrolysis cell may be less than 2, less than 1, or less than 0.

In some embodiments, the membrane electrolysis cell is an electrodialysis cell with multiple compartments. In some embodiments, the electrodialysis cell may have more than about two, more than about five, more than about 10, or more than about twenty compartments.

In some embodiments, the electrodialysis cell may convert $Li_2SO_4$ solution into LiOH and $H_2SO_4$ solutions, may convert $Na_2SO_4$ solution into NaOH and $H_2SO_4$ solutions In some embodiments, an electrochemical cell with one, two, three, or more compartments is used to split $Li_2SO_4$, LiCl, $Na_2SO_4$, NaCl, $K_2SO_4$, KCl, $Rb_2SO_4$, RbCl, $Cs_2SO_4$, CsCl, or combinations thereof into acid and base solutions.

In some embodiments, an electrochemical cell with one, two, three, or more compartments is used to split $Li_2SO_4$, LiCl, $Na_2SO_4$, NaCl, $K_2SO_4$, KCl, $Rb_2SO_4$, RbCl, $Cs_2SO_4$, CsCl, or combinations thereof into acid and base solutions where the acid is used to elute lithium from ion exchange material and the base is used to neutralize protons released from ion exchange material.

Chemical Precipitation

An aspect of the invention described herein is an integrated process for generating a purified lithium salt from a liquid resource, comprising: a) providing an ion exchange unit, wherein the ion exchange unit comprises an ion exchange material; b) contacting the ion exchange material in the ion exchange unit with the liquid resource, wherein hydrogen ions from the ion exchange material are exchanged with lithium ions from the liquid resource to produce a lithium-enriched ion exchange material in the ion exchange unit; c) treating the lithium-enriched ion exchange material with an acid solution, wherein the lithium ions from the lithium-enriched ion exchange material are exchanged with hydrogen ions from the acid solution to produce a lithium eluate; d) providing a chemical precipitation unit in fluid communication with the ion exchange unit, wherein the chemical precipitation unit is capable of facilitating the treatment of the lithium eluate to precipitate the purified lithium salt; e) passing the lithium eluate in said ion exchange unit to the chemical precipitation unit; and f) treating the lithium eluate in the chemical precipitation unit to produce the purified lithium salt.

In one embodiment, the purified lithium salt is LiCl. In one embodiment, the chemical precipitation unit distills off HCl and water. In one embodiment, the HCl is recycled into c). In one embodiment, the purified lithium salt is $Li_2SO_4$. In one embodiment, the purified lithium salt is treated with $Na_2CO_3$ in said chemical precipitation unit to produce $Na_2SO_4$ and $Li_2CO_3$. In one embodiment, the lithium-enriched ion exchange material is treated in said ion exchange unit.

In one embodiment, the lithium eluate is produced in the ion exchange unit. In one embodiment, the lithium eluate is passed from the ion exchange unit to the chemical precipitation unit. In one embodiment, wherein prior to b), the ion exchange material in the ion exchange unit is treated with an acid solution to produce a hydrogen-enriched ion exchange material in said ion exchange unit. In one embodiment, wherein b) further comprises pH modulation, wherein the pH modulation maintains an equilibrium in favor of hydrogen ions from the hydrogen-rich ion exchange material being exchanged with lithium ions from the liquid resource.

In one embodiment, one of the processing systems is for chemical conversion of the lithium salt solution into lithium carbonate. In one embodiment, sodium carbonate is added to the lithium salt solution to precipitation lithium carbonate. In one embodiment, $CO_2$ is added to a lithium hydroxide solution to precipitation lithium carbonate. In one embodiment, an aqueous solution of $Na_2CO_3$ is added to a lithium chloride solution to precipitate $Li_2CO_3$. In one embodiment, an aqueous solution of $Na_2CO_3$ is added to a lithium sulfate solution to precipitate $Li_2CO_3$. In one embodiment, an aqueous solution of $Na_2CO_3$ is added to a lithium sulfate solution to precipitate $Li_2CO_3$, and then water is removed from the remaining sulfate solution to precipitate $Na_2SO_4$. In one embodiment, lithium carbonate is purified by dissolving the lithium carbonate in the presence of carbon dioxide and then heating the solution to precipitate purified lithium carbonate. In one embodiment, of the processing systems is for chemical conversion of the lithium salt solution into lithium hydroxide. In one embodiment, a divalent hydroxide is added to a lithium sulfate solution to precipitate a divalent sulfate while leaving LiOH in solution.

In one embodiment, Ca(OH)$_2$ is added to a lithium sulfate solution to precipitation CaSO$_4$ while leaving LiOH in solution.

In one embodiment of an integrated system, the integrated system includes one or more chemical precipitation units to precipitate lithium ions from solution to form a solid lithium compound. In one embodiment, a chemical precipitation unit is used to precipitate Li$_2$CO$_3$, Li$_3$PO$_4$, or LiOH. In one embodiment, chemicals may be added as a solid, solution, or slurry to facilitate chemical precipitation, and these chemicals may be carbonates, hydroxides, bases, or other chemicals. In one embodiment, Na$_2$CO$_3$ may be added as an aqueous solution, as a solid, or as a slurry. In one embodiment, other precipitating agents such as Na$_3$PO$_4$ may be added as an aqueous solution, as a solid, or as a slurry.

In one embodiment, said system further comprises a carbonation unit for precipitating Li$_2$CO$_3$ by addition of Na$_2$CO$_3$ to said lithium eluate solution. In one embodiment, said system further comprises a bicarbonation unit for purifying Li$_2$CO$_3$ through addition of CO$_2$. In one embodiment, Li$_2$CO$_3$ is reacted with CO$_2$ gas to produce a lithium bicarbonate solution, which is purified prior to precipitation of purified Li$_2$CO$_3$. In one embodiment a lithium bicarbonate solution is purified using ion exchange media to remove impurities, including magnesium, calcium, strontium, barium, boron, iron, transition metals, other impurities, or combinations thereof. In one embodiment, Li$_2$CO$_3$ is purified in a continuous process. In one embodiment, a unit for purification of Li$_2$CO$_3$ may include a dissolver, a mixer, a disperser, a gas dispersion tube, a cooler, a stilling well to separate solids and gas, a crystal feeder, an inline filter, a heat exchanger, a heated gas sealed crystallizer, a pumps and lines for carbon dioxide or aqueous solution, a filter or other means of solid-liquid separation, a mother liquor bleed, a carbon dioxide source, a sieve tray, a Scheibel column, or combinations thereof.

In one embodiment of a chemical precipitation unit, a LiCl solution is treated with Na$_2$CO$_3$ to precipitate Li$_2$CO$_3$ while leaving NaCl in solution. In one embodiment of a chemical precipitation unit, a Li$_2$SO$_4$ solution is treated with Na$_2$CO$_3$ to precipitate Li$_2$CO$_3$. In one embodiment of a chemical precipitation unit, a Li$_2$SO$_4$ solution is treated with a solution of Na$_2$CO$_3$ to first precipitate Li$_2$CO$_3$ during which the amount of Na$_2$CO$_3$ is limited to avoid precipitation of Na$_2$SO$_4$, and then in a separate step water is removed to precipitate Na$_2$SO$_4$. In one embodiment, a lithium-containing sulfate solution may be repeated subject to cycles comprising addition of Na$_2$CO$_3$ solution to precipitate Li$_2$CO$_3$ and removal of water to precipitate Na$_2$SO$_4$. In one embodiment, Li$_2$CO$_3$ is precipitated at temperatures more than about 50 degrees Celsius, more than about 60 degrees Celsius, more than about 70 degrees Celsius, more than about 80 degrees Celsius, more than about 85 degrees Celsius, more than about 90 degrees Celsius, more than about 95 degrees Celsius, less than about 100 degrees Celsius, less than about 95 degrees Celsius, less than about 90 degrees Celsius, less than about 85 degrees Celsius, less than about 80 degrees Celsius, from about 50 degrees Celsius to about 100 degrees Celsius, from about 60 degrees Celsius to about 100 degrees Celsius, from about 70 degrees Celsius to about 100 degrees Celsius, from about 80 degrees Celsius to about 100 degrees Celsius, from about 85 degrees Celsius to about 100 degrees Celsius, from about 90 degrees Celsius to about 100 degrees Celsius, from about 95 degrees Celsius to about 100 degrees Celsius, from about 80 degrees Celsius to about 95 degrees Celsius, from about 85 degrees Celsius to about 95 degrees Celsius, from about 90 degrees Celsius to about 95 degrees Celsius, from about 80 degrees Celsius to about 90 degrees Celsius, from about 85 degrees Celsius to about 90 degrees Celsius. In one embodiment, Li$_2$CO$_3$ is precipitated under pressure to facilitate higher temperatures at elevated altitude. In some embodiments, Li$_2$CO$_3$ is precipitated at an altitude above about 0 meters, above about 1,000 meters, above about 2,000 meters, above about 3,000 meters, or above about 4,000 meters. In some embodiments, Li$_2$CO$_3$ is precipitated at a pressure below about 1.0 atm, below about 0.95 atm, below about 0.9 atm, below about 0.85 atm, or below about 0.8 atm.

In one embodiment, a series of precipitation tanks is used to process a Li$_2$SO$_4$ solution and precipitate Li$_2$CO$_3$ and Na$_2$SO$_4$ is separate tanks. In one embodiment, Na$_2$CO$_3$ may be added to a solution of Li$_2$SO$_4$ solution in an amount that maximizes Li$_2$CO$_3$ recovery while minimizing precipitation of Na$_2$SO$_4$. In one embodiment, seed crystals of Li$_2$CO$_3$, LiOH, or Li$_3$PO$_4$ may be during precipitation added to facilitate crystallization or those species or other species.

In one embodiment of a chemical precipitation unit, a lithium containing solution is treated with CO$_2$ and other chemical reagents to precipitate Li$_2$CO$_3$. In one embodiment of a chemical precipitation unit, a lithium containing solution is treated with CO$_2$ and NaOH to precipitate Li$_2$CO$_3$.

In one embodiment of a chemical precipitation unit, a lithium solution is treated with phosphate species to precipitate Li$_3$PO$_4$. In one embodiment of a chemical precipitation unit, a lithium chloride, lithium sulfate, or other lithium salt solution is treated with sodium phosphate, other phosphate compounds, or combinations thereof to precipitate Li$_3$PO$_4$.

In one embodiment, a lithium sulfate solution is treated with CaO, BaO, SrO, Ca(OH)$_2$, Ba(OH)$_2$, or Sr(OH)$_2$ to precipitate CaSO$_4$, BaSO$_4$, or SrSO$_4$ while converting the solution to a solution containing primarily LiOH. In one embodiment, the CaSO$_4$, BaSO$_4$, or SrSO$_4$ precipitates are roasted to regenerate oxides and/or hydroxides, and the resulting SO$_x$ gas is captured and re-processed to form sulfuric acid, which may be used to elute more lithium sulfate solution from an ion exchange system.

In one embodiment, the concentration of lithium in the Li-containing solution fed into the chemical precipitation unit may be greater than 1,000 mg/L, greater than 1,000 mg/L, greater than 5,000 mg/L, greater than 20,000 mg/L, greater than 50,000 mg/L, or greater than 200,000 mg/L.

In one embodiment, the purity of the compounds produced by chemical precipitation may be greater than 50%, greater than 90%, or greater than 99.9%.

Concentration and Purification

An aspect of the invention described herein is a process of which a component is a reverse osmosis unit. In one embodiment, the reverse osmosis unit is for removing water from the lithium salt solution. In one embodiment, one of the processing systems is evaporation for removing water from the lithium salt solution. In one embodiment, one of the processing systems is for removal of impurities through formation of basic precipitates using hydroxide, carbonate, or other chemical inputs. In one embodiment, the basic precipitates are recycled to the ion exchange system for pH adjustment. In one embodiment, one of the processing systems is for removal of impurities using a polymeric ion exchange resin. In one embodiment, the polymeric ion exchange resin absorbs Mg and Ca while releasing Na.

In one embodiment, the reverse osmosis unit is in fluid communication with an ion exchange unit. In one embodiment, the reverse osmosis unit is in fluid communication with a membrane cell. In one embodiment, the reverse osmosis unit is in fluid communication with a thermal evaporation unit. In one embodiment, the reverse osmosis unit is in fluid communication with a crystallizer. In one embodiment, the reverse osmosis unit is in fluid communication with at least one of an ion exchange unit, a membrane cell, a thermal evaporation unit, or a crystallizer.

In one embodiment, the method further comprises a reverse osmosis unit in fluid communication with the ion exchange unit and the membrane cell, and the reverse osmosis unit comprises a water-permeable membrane. In one embodiment, wherein prior to d), the lithium eluate is passed into the reverse osmosis unit contacting the water-permeable membrane, and wherein water molecules from the lithium eluate pass through the water-permeable membrane to produce water and a concentrated lithium eluate. In one embodiment, the concentrated lithium eluate is further subjected to d) to g). In one embodiment, the water-permeable membrane comprises polyamide, aromatic polyamide, polyvinylamine, polypyrrolidine, polyfuran, or other polymeric layer. In one embodiment, the water-permeable membrane comprises polyethersulfone, polysulfone, polypiperzine-amide, polybenzimidazoline, polyoxadiazole, acetylated cellulose, cellulose or other polymers with alternative functionalizations such as sulfonation, carboxylation, or phosphorylation, or other polymeric layer.

In one embodiment, the water-permeable membrane further comprises a fabric, polymeric, composite, or metal support. In one embodiment, the method further comprises a thermal evaporation unit in fluid communication with said ion exchange unit and said membrane cell, and said thermal evaporation unit comprises a heating element. In one embodiment, the method further comprises a purification unit in fluid communication with the ion exchange unit and the membrane cell. In one embodiment, wherein prior to d), the lithium eluate is passed into the purification unit to produce a purified lithium concentrate. In one embodiment, the purified lithium concentrate is further subjected to d) to g). In one embodiment, the method further comprises a crystallizer in fluid communication with the membrane cell. In one embodiment, the lithium eluate is passed into the crystallizer. In one embodiment, the lithium eluate is processed by the crystallizer to produce a lithium salt. In one embodiment, the lithium salt is lithium carbonate, lithium bicarbonate, lithium hydroxide, lithium chloride, lithium bromide, lithium sulfate, lithium bisulfate, lithium phosphate, lithium hydrogen phosphate, lithium dihydrogen phosphate, or lithium nitrate. In one embodiment, the lithium salt is in a solid, an aqueous solution, or slurry.

In one embodiment of an integrated system, a lithium eluate solution produced from an ion exchange system is concentrated to remove water. In one embodiment, water is removed with a reverse osmosis system or a thermal evaporation system. In one embodiment, lithium is concentrated in the retentate of a membrane system while a solution of mostly water is removed as a permeate to be recycled elsewhere in the integrated system.

In one embodiment, water is removed from a liquid solution using electro-deionization, reverse osmosis, thermal evaporation, solar evaporation, solar-thermal evaporation, concentrated solar evaporation, evaporation ponds, vacuum distillation, multi-stage flash distillation, multiple-effect distillation, vapor-compression distillation, freeze-thaw methods, electrodialysis, electrodialysis reversal, membrane distillation, a membrane dewatering system, chemical absorption, chemical coordination, or combinations thereof. In one embodiment, water is removed from a lithium solution, a sodium solution, an acid solution, a base solution, or another salt solution using electro-deionization, reverse osmosis, thermal evaporation, solar evaporation, solar-thermal evaporation, concentrated solar evaporation, evaporation ponds, vacuum distillation, multi-stage flash distillation, multiple-effect distillation, vapor-compression distillation, freeze-thaw methods, electrodialysis, electrodialysis reversal, membrane distillation, a membrane dewatering system, chemical absorption, chemical coordination, or combinations thereof. In one embodiment, salts are removed from a liquid solution using electro-deionization, reverse osmosis, thermal evaporation, solar evaporation, solar-thermal evaporation, concentrated solar evaporation, evaporation ponds, vacuum distillation, multi-stage flash distillation, multiple-effect distillation, vapor-compression distillation, freeze-thaw methods, electrodialysis, electrodialysis reversal, membrane distillation, a membrane dewatering system, ion exchange, chemical absorption, chemical coordination, or combinations thereof.

In one embodiment of an integrated system, a lithium salt solution produced from an ion exchange system is concentrated to remove water.

In one embodiment, a lithium salt solution is concentrated using evaporation. The lithium stream may be heated to a temperature less than its boiling point or to its boiling point to produce steam. The steam may be heated to a temperature higher than the boiling point of the stream and used for heat elsewhere in the integrated system. In one embodiment, steam or water vapor is condensed and used as a clean water stream elsewhere in the integrated process. In one embodiment, solar evaporation is used to remove water from the lithium stream. In one embodiment, a heat exchanger is used to heat the lithium stream where the heat is produced elsewhere in the plant. In one embodiment, the lithium stream is heated using a boiler. In one embodiment, water is removed from the lithium stream as a product of distillation. In one embodiment, the evaporation takes place at a pressure less than 1 bar or greater than 1 bar of absolute pressure.

In one embodiment, the lithium stream is concentrated and/or purified using a reverse osmosis or nanofiltration system. In one embodiment, membranes for reverse osmosis or nanofiltration may include a polyamide, aromatic polyamide, polyvinylamine, polypyrrolidine, polyfuran, or other polymeric layer. The membranes may include a polyethersulfone, polysulfone, polypiperzine-amide, polybenzimidazoline, polyoxadiazole, acetylated cellulose, cellulose, or other polymers with alternative functionalizations, such as sulfonation, carboxylation, or phosphorylation, or other polymeric layer. The membranes may include a fabric, polymeric, composite, or metal support. The membranes may contain functionalized polymers. In one embodiment, a nano-composite membrane is used in a reverse osmosis or nanofiltration unit. In one embodiment the membranes be comprised of other materials such as zeolites, metals, composites, ceramics, or other inorganic media. In one embodiment, the membranes are isotropic or anisotropic. In one embodiment the membranes are microporous or contain varying porosities throughout the membrane.

In one embodiment, units to concentrate lithium are used in parallel. In one embodiment, units to concentrate lithium are used in series. In one embodiment, a network of units to concentrate lithium is used in parallel and in series. In one embodiment, the lithium-rich permeate of a nanofiltration unit is concentrated compared to the feed due to rejection of water in the retentate stream. In one embodiment, the membranes may be configured in a plate-and-frame, tubular, wound, or hollow fiber configuration. In one embodiment, the membranes may be operated with backwashes or cross-flows to minimize cake buildup and maintain high flux. In one embodiment, the membranes may be operated at less than 1 bar, less than 5 bar, less than 20 bar, or greater than 20 bar of absolute pressure. In one embodiment, anti-scaling agents, disinfectants, and other anti-scaling agents are periodically flushed through the membranes to reverse fouling of the membranes.

In one embodiment, a lithium eluate solution is purified using nanofiltration membranes or other membranes. In one embodiment, a lithium eluate solution is purified using nanofiltration membranes to separate impurities into a retentate while separating lithium into a permeate. In one embodiment, multivalent ions may be retained by the nanofiltration membrane while monovalent ions pass through the membrane. In one embodiment, the high concentration of multivalent ions in the retentate creates an osmotic pressure of monovalent ions through the membrane, leading to concentration of monovalent ions in the permeate. In one embodiment, organic material or heavy metals are retained in the retentate of a nanofiltration system.

In one embodiment of an integrated system, a lithium eluate solution produced from an ion exchange system is purified to remove impurities using chemical precipitation. In one embodiment, impurities are removed through chemical precipitation using hydroxide-containing, carbonate-containing, bicarbonate-containing, oxalate-containing, or other chemical reagents. In one embodiment, impurities are removed through chemical precipitation using NaOH, KOH, RbOH, $Mg(OH)_2$, $Ca(OH)_2$, $Sr(OH)_2$, $Ba(OH)_2$, $MgCO_3$, $CaCO_3$, $SrCO_3$, $CO_2$, or oxalate compounds. In one embodiment, impurities are removed through oxidation using $O_2$, $KMnO_4$, $H_2O_2$, $Cl_2$, NaOCl, or other oxidizing agents. In one embodiment, impurities are removed using the recycled mother liquor from a downstream crystallization unit. In one embodiment, flocculants, such as aluminium, hydroxide, or other agents, are used to remove contaminants from the lithium eluate. In one embodiment, flotation is used to remove contaminants or flocced contaminants from the lithium eluate. In one embodiment, electrochemically generated hydroxyl groups are used to precipitate contaminants.

In one embodiment of chemical precipitation to remove impurities, one or a series of sedimentation tanks are used to settle precipitate sludge and remove it from the acid eluate. In one embodiment, baffles and weirs are used to control mixing in a sedimentation tank. In one embodiment, a candle filter, ultrafiltration, microfiltration, nanofiltration, or reverse osmosis units are used to remove precipitates from the acid eluate. In one embodiment, centrifugal force is used to remove the precipitates. In one embodiment, pressure or other forces are used to remove trapped lithium eluate from the pores of the precipitated contaminants or floccs. In one embodiment, electrochemical techniques, such as electrowinning, are used to remove contaminants. In one embodiment, electrochemical oxidation reactions are used to mineralize dissolved organics from the lithium eluate.

In one embodiment of the integrated system, the precipitated sludge is used as an alkaline pH correction agent in the ion exchange reactor system to maintain high pH. In one embodiment, the sludge is calcined before re-use.

In one embodiment of the integrated system, a solution of lithium and sodium is processed to precipitate $Na_2SO_4 \cdot 10H_2O$ ("glauber's salt"), $Na_2SO_4$, hydrated $Na_2SO_4$, or combinations thereof. In one embodiment, a solution is chilled to precipitate glauber's salt, $Na_2SO_4$, hydrated $Na_2SO_4$, or combinations thereof. In one embodiment, a solution is chilled to precipitate solids of glauber's salt, $Na_2SO_4$, hydrated $Na_2SO_4$, or combinations thereof, and the resulting solution contains cations that are primarily lithium. In one embodiment, a solution is processed to remove glauber's salt, $Na_2SO_4$, hydrated $Na_2SO_4$, or combinations thereof to remove sodium from the solution so that the solution can be further processed into lithium hydroxide with low sodium content. In one embodiment, a solution is chilled to precipitate glauber's salt, $Na_2SO_4$, hydrated $Na_2SO_4$, or combinations thereof at a temperature of less than about 40° C., less than about 20° C., less than about 10° C., less than about 0° C., or less than about $-10$° C. In some embodiments, the glauber's salt, $Na_2SO_4$, hydrated $Na_2SO_4$, or combinations thereof are reprocessed into acid and base. In some embodiments, the glauber's salt, $Na_2SO_4$, hydrated $Na_2SO_4$, or combinations thereof are redissolved into an aqueous solution and processed into acid and base. In some embodiments, the glauber's salt, $Na_2SO_4$, hydrated $Na_2SO_4$, or combinations thereof are redissolved into an aqueous solution and processed into acid and base using electrochemical cell units. In some embodiments, water is removed from a solution to precipitate glauber's salt, $Na_2SO_4$, hydrated $Na_2SO_4$, or combinations thereof.

In one embodiment of an integrated system, a lithium eluate solution produced from an ion exchange system is purified to remove impurities. In one embodiment, impurities are removed through chemical precipitation using hydroxide, carbonate, bicarbonate, or oxalate salts or other chemical reagents. In one embodiment, impurities that are precipitated include $Mg(OH)_2$, $Ca(OH)_2$, $Sr(OH)_2$, $Ca(OH)_2$, $MgCO_3$, $CaCO_3$, $SrCO_3$, $BaCO_3$, $Al(OH)_3$, $Fe(OH)_x$, $Mn(OH)_x$, other hydroxide species, other carbonate species, other bicarbonate species, or other oxalate species. In one embodiment, impurities are removed through chemical precipitation using an alkali or alkali earth hydroxide, carbonate, bicarbonate, oxalate, or combination thereof. In one embodiment, impurities are removed through chemical precipitation using $NH_3$. In one embodiment, impurities are removed through chemical precipitation using NaOH, KOH, RbOH, $Mg(OH)_2$, $Ca(OH)_2$, $Sr(OH)_2$, $Ba(OH)_2$, $MgCO_3$, $CaCO_3$, or $SrCO_3$. In one embodiment, impurities are removed through chemical precipitation using LiOH, NaOH, KOH, $Ca(OH)_2$, $Li_2CO_3$, $Na_2CO_3$, $K_2CO_3$, or combination thereof. In one embodiment, impurities are removed through chemical precipitation using LiOH or $Li_2CO_3$. In one embodiment, impurities are removed by adding LiOH or $Li_2CO_3$ to obtain a high-purity lithium solution. In one embodiment, $Na_2CO_3$ is added to precipitate carbonate salts. In one embodiment, $Na_2CO_3$ is added to precipitate $MgCO_3$, $CaCO_3$, $SrCO_3$, $BaCO_3$, $FeCO_3$, $MnCO_3$, or other carbonate salts. In one embodiment, $Ca(OH)_2$ is added to precipitate $Mg(OH)_2$ or other hydroxide salts.

In one embodiment, a lithium eluate solution is purified using solvent extraction with an organic liquid phase to preferentially bind lithium or to preferentially bind impurities. In one embodiment, a lithium eluate solution is purified using solvent extraction with an organic liquid phase to preferentially bind monovalent ions or to preferentially bind divalent ions or to preferentially bind multivalent ions. In one embodiment, the solvent extraction is performed using neodecanoic acid or di-(2-ethylhexyl)phosphoric acid. In one embodiment, a flow of lithium salt solution or lithium acid eluate solution is pumped through a series of one or more columns/tanks counter-current to a flow of other liquid phase, which may be kerosene or other solvent containing neodecanoic acid, di-(2-ethylhexyl)phosphoric acid, or other extractant which may be dissolved in the non-brine solvent phase or may be the non-brine solvent phase itself. In one embodiment, Mg and Ca are stripped from the solvent using concentrated HCl or another acid in a separate stripping column.

In one embodiment, a lithium eluate solution is purified using cation-exchange resins to preferentially absorb impurities. In one embodiment, a lithium eluate solution is purified using cation-exchange resins to preferentially absorb multivalent ions while releasing sodium. In one embodiment, a lithium eluate solution is purified using cation-exchange resins to preferentially absorb multivalent ions while releasing hydrogen. In one embodiment, a lithium eluate solution is purified using cation-exchange resins to preferentially absorb multivalent ions while releasing lithium. In one embodiment, the cation-exchange resin may be a sulfonated polymer or a carboxylated polymer. In one embodiment, the cation-exchange resin may be a sulfonated polystyrene polymer, a sulfonated polystyrene-butadiene polymer, or a carboxylated polyacrylic polymer. In one embodiment, the cation-exchange resin may be loaded with Na so that Na is released as Mg, Ca, and other multi-valent ions are absorbed. In one embodiment, the cation-exchange resin may be loaded with Li so that Li is released as Mg, Ca, and other multi-valent ions are absorbed.

In one embodiment, a lithium eluate solution is purified using anion-exchange resins to preferentially absorb impurities.

In one embodiment, a lithium eluate solution produced from an ion exchange system is purified to remove impurities while maintaining a low pH, so that acidic protons can be later reused to elute lithium from an ion exchange system.

In one embodiment, a lithium eluate solution produced from an ion exchange system with an inorganic ion exchange material to preferentially absorb lithium is purified by using another ion exchange system with an inorganic ion exchange material to preferentially absorb lithium.

In one embodiment, a lithium salt solution is purified by cooling or heating the solution to aid precipitation.

In one embodiment, a lithium salt solution is purified by adding $BaCl_2$ to precipitate out sulfate as $BaSO_4$.

In one embodiment, a lithium salt solution is purified by removing water to precipitate out impurities such as $Na_2SO_4$.

Crystallization

An aspect of the invention described herein is a process of which a component is a crystallizer. In one embodiment, the crystallizer is in fluid communication with an ion exchange unit. In one embodiment, the crystallizer is in fluid communication with a membrane cell. In one embodiment, the crystallizer is in fluid communication with a thermal evaporation unit. In one embodiment, the crystallizer is in fluid communication with a reverse osmosis unit. In one embodiment, the crystallizer is in fluid communication with at least one of an ion exchange unit, a membrane cell, a thermal evaporation unit, or a reverse osmosis unit.

In one embodiment, a LiOH solution is crystallized to form LiOH solids by removal of water. In one embodiment, a LiCl solution is crystallized to form LiCl solids by removal of water. In one embodiment, one or more polyanionic compounds are roasted to produce one or more basic oxides and one or more gases. In one embodiment, one or more gases include $SO_x$ that is converted in sulfuric acid. In one embodiment, one or more gases include $CO_2$ that is used to precipitate or purify $Li_2CO_3$. In one embodiment, $CaCO_3$ is roasted to produce CaO and $CO_2$. In one embodiment, $CaSO_4$ is roasted to produce CaO and $H_2SO_4$.

In one embodiment of an integrated system, a crystallizer is used to convert a lithium salt solution into a solid lithium salt. In one embodiment of a crystallizer, a lithium hydroxide solution is crystallized to form solid lithium hydroxide. In one embodiment of a crystallizer, precipitation is controlled to selectively precipitate lithium or other compounds. In one embodiment of a crystallizer, precipitation is controlled to selectively precipitate lithium hydroxide while leaving sodium hydroxide in solution. In one embodiment, sodium carbonate is added to a solution containing lithium to precipitate lithium carbonate. In one embodiment, a sodium carbonate solution is added to a solution containing lithium to precipitate lithium carbonate. In one embodiment, a sodium carbonate slurry is added to a solution containing lithium to precipitate lithium carbonate. In one embodiment, sodium carbonate is added to a solution containing lithium in the presence of lithium carbonate seed crystals to precipitate lithium carbonate. In one embodiment, lithium carbonate crystals are separated from water using a centrifuge, a peeler centrifuge, a pendulum centrifuge, a solid bowl centrifuge, a pusher centrifuge, a conical plate centrifuge, a tubular centrifuge, an inverting filter centrifuge, a sliding discharge centrifuge, a screen scroll centrifuge, a decanter centrifuge, or a combination thereof. In one embodiment, lithium carbonate crystals are separated using a mesh, a filter, a solid-liquid separator, or combinations thereof. In one embodiment, lithium carbonate crystals are dried using a dryer. In one embodiment, lithium carbonate crystals are dried using an evaporator, a crystallizer, a dryer, a continuous dryer, a vacuum dryer, or combinations thereof. In one embodiment, lithium carbonate crystals are milled using a grinder, a mill, a jet mill, an air mill, a classifying mill, an air classifying mill, a classifier, or combinations thereof. In one embodiment, lithium carbonate crystals are milled into a size range with an average particle size below about 100 microns, below about 50 microns, below about 20 microns, below about 10 microns, below about 5 microns, below about 2 microns, below about 1 micron, or larger than about 100 microns. In one embodiment, lithium carbonate is processed into pellets.

In one embodiment of an integrated system, a lithium salt solution is first crystallized and then dissolved and then recrystallized to remove impurities. In one embodiment, $Li_2CO_3$ mixed with water and $CO_2$ to form a dissolution $LiHCO_3$ solution. In one embodiment, impurities are removed from a $LiHCO_3$ solution. In one embodiment, impurities are removed from a $LiHCO_3$ solution using a polymeric ion exchange resin. The $LiHCO_3$ solution is then heated to recrystallize $Li_2CO_3$ with minimal impurities. In one embodiment, the $CO_2$ is release from the $LiHCO_3$ solution and recaptured for reuse. In one embodiment, the $Li_2CO_3$ is then dried and micronized to make a fine powder.

In one embodiment of a crystallizer, lithium remaining in the liquid phase is returned to an ion exchange system or to a purification system before the lithium is returned to the crystallizer.

In one embodiment of a crystallizer, water is removed using heat and convection. In one embodiment, the crystallizer is a flash cooling crystallizer, a tubular falling film evaporator, a scraped surface crystallizer, an oslo crystallizer, a tubular forced circulation evaporator, a plate forced circulation evaporator, a forced circulation crystallizer, a surface-cooled crystallizer, a draft tube baffle crystallizer, a plate falling film evaporator, or a batch vacuum crystallizer.

In one embodiment of an integrated system, the crystallizer is preceded by a thickener, a clarifier, a press filter, a centrifuge, or an evaporator.

In one embodiment of a crystallizer, the temperature of the solution in the crystallizer is controlled to manage the impurities in a resulting solid lithium compound. In one embodiment, lithium hydroxide solids, lithium hydroxide crystals, lithium hydroxide monohydrate, lithium hydroxide slurry, or other forms of lithium hydroxide are dissolved and recrystallized to remove impurities. In one embodiment, lithium hydroxide solids, lithium hydroxide crystals, lithium hydroxide monohydrate, lithium hydroxide slurry, or other forms of lithium hydroxide are dissolved, purified, and recrystallized to remove impurities. In one embodiment, lithium hydroxide solids, lithium hydroxide crystals, lithium hydroxide monohydrate, lithium hydroxide slurry, or other forms of lithium hydroxide are dissolved, purified using ion exchange to absorb impurities, and recrystallized to produce a higher purity lithium hydroxide material. In one embodiment, lithium hydroxide crystals are dried using an evaporator, a crystallizer, a dryer, a continuous dryer, a vacuum dryer, or combinations thereof. In one embodiment, lithium carbonate crystals are milled into a size range with an average particle size below about 100 microns, below about 50 microns, below about 20 microns, below about 10 microns, below about 5 microns, below about 2 microns, below about 1 micron, or larger than about 100 microns. In one embodiment, lithium hydroxide is processed into pellets.

LiOH—$Li_2CO_3$ Conversion

In one embodiment, $Li_2CO_3$ is converted to LiOH by generating an aqueous solution or slurry of $Li_2CO_3$ and adding $Ca(OH)_2$, $Sr(OH)_2$, or $Ba(OH)_2$ such that Ca, Sr, or Ba forms an insoluble $CaCO_3$, $SrCO_3$, or $BaCO_3$ precipitate, leaving a solution of mainly LiOH.

In one embodiment, $Li_2SO_4$ is converted to LiOH by adding $Ca(OH)_2$, $Sr(OH)_2$, or $Ba(OH)_2$ such that Ca, Sr, or Ba forms an insoluble $CaCO_3$, $SrCO_3$, or $BaCO_3$ precipitate, leaving a solution of mainly LiOH.

In one embodiment, LiOH is converted to $Li_2CO_3$ by generating an aqueous solution or slurry of LiOH, and sparging the solution or slurry with $CO_2$ to precipitate $Li_2CO_3$. In one embodiment of an integrated system, LiOH is converted to $Li_2CO_3$ by generating an aqueous solution or slurry of LiOH, and adding $Na_2CO_3$ or another carbonate compound to precipitate $Li_2CO_3$. In one embodiment, LiOH is converted to $Li_2CO_3$ by spray drying a solution of LiOH in the presence of $CO_2$.

In one embodiment, the lithium salt is lithium carbonate, lithium bicarbonate, lithium hydroxide, lithium chloride, lithium bromide, lithium sulfate, lithium bisulfate, lithium phosphate, lithium hydrogen phosphate, lithium dihydrogen phosphate, or lithium nitrate. In one embodiment, the lithium salt is lithium carbonate, lithium bicarbonate, lithium hydroxide, lithium chloride, lithium bromide, lithium sulfate, lithium bisulfate, lithium phosphate, lithium hydrogen phosphate, or lithium nitrate. In one embodiment, the lithium salt is lithium carbonate, lithium bicarbonate, lithium hydroxide, lithium chloride, lithium bromide, lithium sulfate, lithium bisulfate, lithium phosphate, or lithium nitrate. In one embodiment, the lithium salt is lithium carbonate, lithium bicarbonate, lithium hydroxide, lithium chloride, lithium bromide, lithium sulfate, lithium bisulfate, lithium phosphate, or lithium nitrate. In one embodiment, the lithium salt is lithium carbonate, lithium hydroxide, lithium chloride, lithium bromide, lithium sulfate, lithium bisulfate, lithium phosphate, or lithium nitrate. In one embodiment, the lithium salt is lithium carbonate, lithium hydroxide, lithium chloride, lithium bromide, lithium sulfate, lithium bisulfate, or lithium phosphate. In one embodiment, the lithium salt is lithium carbonate, lithium hydroxide, lithium chloride, lithium bromide, lithium sulfate, or lithium bisulfate. In one embodiment, the lithium salt is lithium carbonate, lithium hydroxide, lithium chloride, lithium bromide, or lithium sulfate. In one embodiment, the lithium salt is lithium carbonate, lithium hydroxide, lithium chloride, or lithium bromide. In one embodiment, the lithium salt is lithium carbonate, lithium hydroxide, or lithium chloride. In one embodiment, the lithium salt is lithium carbonate or lithium hydroxide. In one embodiment, the lithium salt is lithium carbonate. In one embodiment, the lithium salt is lithium hydroxide.

In one embodiment, said purified lithium salt is $Li_2CO_3$. In one embodiment, said purified lithium salt is $Li_3PO_4$. In some embodiments, said lithium salt is $Li_2CO_3$ or $Li_3PO_4$, and is precipitated by addition of sodium carbonate, sodium phosphate, other carbonate salts, or other phosphate salts. In some embodiments, said purified lithium salt is an inorganic salt. In some embodiments, said purified lithium salt is an organic salt. In some embodiments, said lithium eluate may be lithium chloride solution, lithium sulfate solution, or other lithium salt solution, and may be purified or may contain impurities.

In one embodiment, lithium carbonate crystals are milled into a size range with an average particle size below about 100 microns, below about 50 microns, below about 20 microns, below about 10 microns, below about 5 microns, below about 2 microns, below about 1 micron, or larger than about 100 microns. In one embodiment, lithium hydroxide is processed into pellets.

Unit Operations

In one embodiment of an integrated system, a LiOH solution is generated and concentrated using reverse osmosis prior to LiOH crystallization.

In one embodiment of an integrated system, a chlor-alkali setup is used to generate HCl and NaOH from an aqueous NaCl solution. In one embodiment, the HCl is used to elute lithium from an ion exchange system for selective lithium uptake to produce a lithium eluate solution. In one embodiment, the NaOH from the chor-alkali setup is used to control the pH of the brine in the ion exchange system for selective lithium uptake. In one embodiment, the NaOH is used to precipitate impurities from a lithium eluate solution. In one embodiment, said alkaline or alkaline earth hydroxide, carbonate, or bicarbonate is selected from LiOH, NaOH, KOH, $Ca(OH)_2$, $Li_2CO_3$, $Na_2CO_3$, $K_2CO_3$, $CaCO_3$, and combination thereof. In one embodiment, said basic precipitates are recycled to b) for pH modulation.

In one embodiment of an integrated system, basic solutions and compounds are generated in purification, chemical precipitation, conversion, or membrane electrolysis steps are used or recycled for other steps in the integrated process, such as pH control in the ion exchange system or precipitation of impurities. In one embodiment, a slurry of $Mg(OH)_2$, resulting from purification of the lithium eluate solution, is reused for pH control in the ion exchange process. In one embodiment, a solution of LiOH and NaOH impurities is produced as a byproduct of the LiOH crystallization process, and this solution is reused for purification of the lithium eluate solution by precipitation of $Mg(OH)_2$ and/or other impurities. In one embodiment, a solution or slurry of LiOH, NaOH, $Li_2CO_3$, and/or $Na_2CO_3$ produced during the conversion of LiOH to $Li_2CO_3$ is reused for purification of the lithium eluate solution by precipitation of $Mg(OH)_2$, $Ca(OH)_2$, and/or other impurities.

In one embodiment of an integrated system, chemical reagents may be added to tanks, processes, and reactors as solids, liquids, or slurries.

In one embodiment of an integrated system, $CaCO_3$, produced during conversion of $Li_2CO_3$ to LiOH through addition of $Ca(OH)_2$, is roasted to produce CaO and/or $Ca(OH)_2$ for reuse for that conversion process, for pH control in an ion exchange system, or in other processes. In one embodiment of an ion exchange system, $CaCO_3$, produced during purification of a lithium eluate solution, is roasted to produce CaO, and optionally slaked, to produce $Ca(OH)_2$ for reuse for that purification process, for pH control in an ion exchange system, or in other processes.

In one embodiment of an integrated system, $CaSO_4$, $BaSO_4$, and/or $SrSO_4$ are roasted to generate CaO, BaO, and/or SrO, and the resulting $SO_x$ gaseous species are captured to produce $H_2SO_4$. In one embodiment of an ion exchange system, $CaSO_4$, $BaSO_4$, and/or $SrSO_4$ are roasted at low pressure to generate $SO_x$ gaseous species, which are converted to $SO_3$ using a packed catalyst reactor bed containing $V_2O_5$ or other catalyst. In one embodiment, the $SO_3$ gas is passed through a heat exchange for cooling, and then reacted with $H_2SO_4$ and $H_2O$ to make $H_2SO_4$.

In one embodiment of an integrated system, $CaCO_3$, $BaCO_3$, $SrCO_3$, or other carbonates are roasted to produce CaO, BaO, SrO, or other oxides. In one embodiment, the $CO_2$ produced by roasting $CaCO_3$, $BaCO_3$, $SrCO_3$, or other carbonate is used to form $Li_2CO_3$ from LiOH, to convert $Li_2CO_3$ into $LiHCO_3$ for purification, or to precipitate impurities from a solution as carbonate precipitates. In one embodiment, the oxides produced by roasting $CaCO_3$, $BaCO_3$, $SrCO_3$, or other carbonates is used to control pH in the ion exchange system for lithium uptake; to precipitate impurities from an aqueous solution; to convert a solution of $Li_2SO_4$ to a solution of LiOH with precipitation of $CaSO_4$, $BaSO_4$, $SrSO_4$, or other sulfate species; to convert $Li_2CO_3$ to LiOH with precipitation of $CaCO_3$, $BaCO_3$, $SrCO_3$, or other carbonate species; or to convert $Li_3PO_4$ to LiOH with precipitation of $Ca_3P_2O_8$, $Mg_2P_2O_8$ $Sr_2P_2O_8$, or other phosphate species. In one embodiment, $CO_2$ from the atmosphere or from combustion of carbon or hydrocarbons is used to produce or purify $Li_2CO_3$, or to precipitate $CaCO_3$ or other impurities.

In one embodiment of an integrated system, a lithium eluate solution, generated from an ion exchange system, comprised mainly of LiCl and HCl, is concentrated and distilled to recover the water and HCl. In one embodiment, the recovered HCl is reused in the ion exchange system to produce more lithium eluate solution. In one embodiment, the HCl is distilled through vacuum distillation or membrane distillation. In one embodiment, a reverse osmosis system is used to remove water from the lithium eluate solution, and the permeate contains dilute HCl, which can be reused for lithium elution optionally in combination with other acid streams. In one embodiment, HCl and water are removed from the lithium eluate solution using a combination of reverse osmosis and evaporation.

In one embodiment of an integrated system, a lithium eluate solution generated from an ion exchange system, comprised mainly of LiCl and HCl, is passed through a distillation unit to recover the HCl in a more concentrated form. In one embodiment, the concentration of the HCl produced may be less than about 0.5N HCl, less than about 1N HCl, less than about 5N HCl, or greater than about 5N HCl. In one embodiment, the HCl produced may contain no LiCl, less than about 0.5N LiCl, or greater than about 0.5N LiCl. In one embodiment, the recovered HCl is directly reused in the ion exchange system to produce more lithium eluate solution. In one embodiment, the recovered HCl is condensed with water vapor, or contacted with water or LiCl solution, to create a liquid HCl stream. In one embodiment, the HCl stream may be reused in the ion exchange system. In one embodiment, HCl vapor is sent directly to the ion exchange reactor, where it is absorbed into an acid or LiCl solution directly with no intermediate liquid acid stream.

In one embodiment of the distillation unit, a stream of LiCl aqueous solution is produced that contains LiCl at a concentration that may be similar to before distillation, less than about 2× more concentrated, less than about 5× more concentrated, less than about 20× more concentrated, or less than about 100× more concentrated relative to the pre-distillation stream. In one embodiment of the distillation unit, a stream of liquid water may be produced that contains less than about 0.1N HCl, less than about 1N HCl, or greater than 1N HCl. In one embodiment of the distillation unit, a stream of steam may be produced.

In one embodiment of the distillation unit, one or more distillation columns may be used. In one embodiment, the distillation columns may be operated at a pressure which may be less than about 0.25 bar, less than about 1 bar, less than about 4 bar, or greater than about 4 bar of absolute pressure. In one embodiment, the columns may be operated at the same pressures. In one embodiment, the columns may be operated at different pressures. In one embodiment, the distillation columns may be operated at the same temperature. In one embodiment, the distillation columns may be operated at different temperatures.

In one embodiment of the distillation unit, dissolved species may increase the vapor pressure of HCl to aid vapor-liquid separation of HCl. In one embodiment, the dissolved species may be part of the LiCl and HCl solution entering the distillation unit. In one embodiment, the dissolved species may be added to the LiCl and HCl solution and removed from the solution after distillation. In one embodiment, the species may be regenerated and re-used in the distillation unit after removal from the LiCl solution. In one embodiment, the species may be converted to another form and used elsewhere in the integrated system for lithium extraction. In one embodiment, the dissolved species are chloride salts, such as $MgCl_2$, $CaCl_2$), LiCl, NaCl, or KCl.

In one embodiment, the distillation unit contains membranes to add vapor-liquid separation of HCl or water. In one embodiment, the distillation unit may contain one or more flash distillation unit drums. In one embodiment, the acid eluate stream is fed to a distillation column or flash distillation drum, where temperature is increased and/or pressure is decreased to evaporate HCl from the solution, which is then fed to an absorption tower where it is absorbed into water or dilute HCl to make a more concentrated HCl solution.

In one embodiment of an integrated system, the integrated system is comprised of chemical facilities at one site or at multiple sites. In one embodiment of an integrated system, the integrated system is comprised of chemical facilities at multiple sites and reagents, chemicals, solutions, and/or materials may be transported from one site to another site, such as lithium eluate solution, concentrated lithium eluate solution, purified lithium eluate solution, purified concentrated lithium eluate solution, lithium carbonate, lithium hydroxide, or lithium phosphate. In one embodiment, lithium carbonate, lithium hydroxide, lithium phosphate or other compounds may be transported as a solution, a slurry, a wet powder, or a dry powder.

In one embodiment of an integrated system, the product may be a solution, slurry, wet powder, or dry powder with minimal processing. In one embodiment of an integrated system, the product may have impurities less than 20 wt %, less than 2 wt %, less than 0.2 wt %, or less than 0.02 wt %. In one embodiment of an integrated system, the product may have impurities greater than 20 wt %.

In one embodiment of an integrated system, LiCl solution is crystallized through evaporation to produce LiCl powder. In one embodiment of an integrated system, $Li_2SO_4$ solution is crystallized through evaporation to produce $Li_2SO_4$ powder. In one embodiment of an integrated system, $Li_2SO_4$, LiCl, $Li_3PO_4$, or other lithium-containing powder may be shipped to another location for further processing into $Li_2CO_3$, LiOH, Li metal, or other lithium-containing powders.

In one embodiment, lithium carbonate crystals are milled into a size range with an average particle size below about 100 microns, below about 50 microns, below about 20 microns, below about 10 microns, below about 5 microns, below about 2 microns, below about 1 micron, or larger than about 100 microns. In one embodiment, lithium hydroxide is processed into pellets.

In one embodiment of an integrated system, LiCl powder is processed to form Li metal through a molten salt electrolysis cell. In one embodiment of a molten salt electrolysis cell, LiCl is mixed with KCl to form an electrolyte. In one embodiment of a molten salt electrolysis cell, electrical current is passed through a Li-containing electrolyte to generate lithium metal at the electrochemically reducing cathode. In one embodiment of a molten salt electrolysis cell, electrical current is passed through a Li-containing electrolyte to generate chlorine gas at the electrochemically oxidizing anode. In one embodiment of a molten salt electrolysis cell, the cell is maintained at a temperature of approximately 400-500 degrees Celsius.

In one embodiment of the integrated system, lithium-containing powder is washed with water to remove impurities. In one embodiment, $Li_2CO_3$ is washed with water at 95 degrees Celsius to remove impurities with minimal dissolution of the $Li_2CO_3$. In one embodiment, the water used to wash a lithium-containing powder contains trace amounts of lithium carbonate, lithium hydroxide, or other lithium salts. In one embodiment, water used to wash a lithium-containing powder is reused for other processes, such as purifying the lithium eluate solution.

In one embodiment, the purity of the lithium compounds produced by the integrated system may be greater than about 50%, greater than about 90%, greater than about 99.9%, or greater than about 99.99%.

System of Modulating pH for the Extraction of Lithium

In one embodiment of the integrated system, the integrated system includes an ion exchange reactor for lithium extraction with a form that allows for pH control during lithium uptake from a brine or other lithium ion-containing liquid resource. This reactor functions to neutralize hydrogen that is released during lithium uptake, while solving the problems associated with precipitation from base addition.

In one embodiment of the integrated system, the integrated system includes an ion exchange system for the extraction of lithium ions from a liquid resource, comprising: a) an ion exchange material; and b) a pH modulating setup for increasing pH of the liquid resource in the system. The ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 5 to 7, a preferred pH range is optionally 4 to 8, and an acceptable pH range is optionally 1 to 9. In an embodiment, the pH modulating setup comprises measuring the pH of the system and wherein the pH of the system is less than 6, less than 4, or less than 2, the pH of the system is adjusted to a pH of 1 to 9, a pH of 4 to 8, or a pH of 5 to 7.

Recirculating Batch System

In an embodiment of the ion exchange system, the ion exchange material is loaded in a column. In an embodiment of the system, the pH modulating setup is connected to the column loaded with the ion exchange material. In an embodiment of the system, the pH modulating setup comprises one or more tanks.

In one embodiment of the ion exchange system, one or more ion exchange columns are loaded with a fixed or fluidized bed of ion exchange material. In one embodiment of the system, the ion exchange column is a cylindrical construct with entry and exit ports. In a further embodiment, the ion exchange column is optionally a non-cylindrical construct with entry and exit ports. In a further embodiment, the ion exchange column is a tank. In a further embodiment, the ion exchange column optionally has entry and exit ports for brine pumping, and additional doors or hatches for loading and unloading ion exchange material to and from the column. In a further embodiment, the ion exchange column is optionally equipped with one or more security devices to decrease the risk of loss, spilling, or theft of the ion exchange material. The material can reversibly absorb lithium from brine and release lithium in acid. In one embodiment, the ion exchange material is comprised of particles that are optionally protected with coating material, such as $SiO_2$, $ZrO_2$, or $TiO_2$, to limit dissolution or degradation of the ion exchange material. In one embodiment, the ion exchange material may be in the form of a powder. In one embodiment, the material may be in the form of beads. In one embodiment, the beads contain a structural component, such as an acid-resistant polymer, that binds the ion exchange materials. In one embodiment, the beads contain pores that facilitate penetration of brine, acid, aqueous, and other solutions into the beads to deliver lithium and hydrogen to and from the bead or to wash the bead. In one embodiment, the bead pores are structured to form a connected network of pores with a distribution of pore sizes, and are structured by incorporating filler materials during bead formation and later removing that filler material in a liquid or gas.

In one embodiment of the ion exchange system, the system is a recirculating batch system, which comprises an ion exchange column that is connected to one or more tanks for mixing base into the brine, settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the material. In one embodiment, base is added to the brine in such a way that pH is maintained at an adequate level for lithium uptake, and in such a way that the amount of base-related precipitates in the ion exchange column is minimized.

In one embodiment, as the brine is pumped through the recirculating batch system, the brine pH drops in the ion exchange column due to hydrogen release from the ion exchange material during lithium uptake, and the brine pH is adjusted upward by the addition of base as a solid, aqueous solution, or other form. In one embodiment, the ion exchange system drives the ion exchange reaction to near completion, and the pH of the brine leaving the ion exchange column approaches the pH of the brine entering the ion exchange column. In one embodiment, the amount of base added is optionally controlled to neutralize the hydrogen released by the ion exchange material in such a way that no basic precipitates form. In one embodiment, an excess of base or a transient excess of base is optionally added in such a way that basic precipitates form. In one embodiment, the basic precipitates form transiently, and then are redissolved partially or fully by the hydrogen that is released from the ion exchange column. In one embodiment of the system, base is optionally added to the brine flow prior to the ion exchange column, after the ion exchange column, prior to one or more tanks, or after one or more tanks.

In one embodiment of the recirculating batch system, the tanks include a mixing tank where the base is mixed with the brine. In one embodiment, the tanks include a settling tank, where precipitates, such as $Mg(OH)_2$, optionally settle to the bottom of the settling tank to avoid injection of the precipitates into the ion exchange column. In one embodiment, the tanks include a storage tank where the brine is stored prior to reinjection into the ion exchange column, mixing tank, settling tank, or other tanks. In one embodiment, the tanks include an acid recirculation tank. In one embodiment, some tanks in the recirculating batch reactor optionally serve a combination of purposes including base mixing tank, settling tank, acid recirculation tank, or storage tank. In any embodiment, a tank optionally does not fulfil two functions at the same time. For example, a tank is not a base mixing tank and a settling tank.

In one embodiment of the recirculating batch system, base is added to a mixing tank, which is optionally a continuous stirred tank system, a confluence of acidified brine flow and base flow followed by a static mixer, a confluence of acidified brine flow and base flow followed by a paddle mixer, a confluence of acidified brine flow and base flow followed by a turbine impeller mixer, or a continuous stirred tank system in the shape of a vertical column which is well mixed at the bottom and settled near the top. In one embodiment, the base is optionally added as a solid or as an aqueous solution. In one embodiment, the base is optionally added continuously at a constant or variable rate. In one embodiment, the base is optionally added discretely in constant or variable aliquots or batches. In one embodiment, the base is optionally added according to one or more pH meters, which optionally samples brine downstream of the ion exchange column or elsewhere in the recirculating batch system. In one embodiment, filters are optionally used to prevent precipitates from leaving the mixing tank. In one embodiment, the filters are optionally plastic mesh screens, small packed columns containing granular media, such as sand, silica, or alumina, small packed columns containing porous media filter, or a membrane.

In one embodiment of the recirculating batch system, the settling tank is optionally a settling tank with influent at bottom and effluent at top, or a settling tank with influent on one end and effluent on another end. In one embodiment, chambered weirs are used to fully settle precipitates before brine is recirculated into reactor. In one embodiment, solid base precipitates are collected at the bottom of the settling tank and recirculated into the mixer. In one embodiment, precipitates, such as $Mg(OH)_2$, optionally settle near the bottom of the tank. In one embodiment, brine is removed from the top of the settling tank, where the amount of suspended precipitates is minimal. In one embodiment, the precipitates optionally settle under forces, such as gravity, centrifugal action, or other forces. In one embodiment, filters are optionally used to prevent precipitates from leaving the settling tank. In one embodiment, the filters are optionally plastic mesh screens, small packed columns containing granular media, such as sand, silica, or alumina, small packed columns containing porous media filter, or a membrane. In one embodiment, baffles are optionally used to ensure settling of the precipitate and to prevent the precipitate from exiting the settling tank and entering the column.

In one embodiment of the recirculating batch system, basic precipitates are optionally collected from the settling tank and reinjected into the brine in a mixing tank or elsewhere to adjust the pH of the brine.

In one embodiment of the recirculating batch system, one or more ion exchange columns are optionally connected to one or more tanks or set of tanks. In one embodiment of the recirculating batch system, there are optionally multiple ion exchange columns recirculating brine through a shared set of mixing, settling, and storage tanks. In one embodiment of the recirculating batch system, there is optionally one ion exchange column recirculating brine through multiple sets of mixing, settling, and storage tanks.

Column Interchange System

In one embodiment of the integrated system, the integrated system includes an ion exchange system wherein the ion exchange material is loaded in a plurality of columns. In an embodiment, the pH modulating setup comprises a plurality of tanks connected to the plurality of columns, wherein each of the plurality of tanks is immediately connected to one of the plurality of columns. In an embodiment, two or more of the plurality of tanks connected to the plurality of columns forms at least one circuit. In an embodiment, three or more of the plurality of tanks connected to the plurality of columns forms at least two circuits. In an embodiment, three or more of the plurality of tanks connected to the plurality of columns forms at least three circuits. In an embodiment, at least one circuit is a liquid resource circuit. In an embodiment, at least one circuit is a water washing circuit. In an embodiment, at least one circuit is an acid solution circuit. In an embodiment, at least two circuits are water washing circuits.

In one embodiment of the ion exchange system, the system is a column interchange system where a series of ion exchange columns are connected to form a brine circuit, an acid circuit, a water washing circuit, and optionally other circuits. In one embodiment of the brine circuit, brine flows through a first column in the brine circuit, then into a next column in the brine circuit, and so on, such that lithium is removed from the brine as the brine flows through one or more columns. In one embodiment of the brine circuit, base is added to the brine before or after each ion exchange column or certain ion exchange columns in the brine circuit to maintain the pH of the brine in a suitable range for lithium uptake by the ion exchange material. In one embodiment of the acid circuit, acid flows through a first column in the acid circuit, then into the next column in the acid circuit, and so on, such that lithium is eluted from the columns with acid to produce a lithium eluate. In one embodiment of the acid circuit, acid flows through a first column in the acid circuit, then optionally into a next column in the acid circuit, and so on, such that lithium is eluted from the columns with acid to produce a lithium eluate. In one embodiment of the water washing circuit, water flows through a first column in the water washing circuit, then optionally into a next column in the water washing circuit, and so on, such that brine in the void space, pore space, or head space of the columns in the water washing circuit is washed out.

In one embodiment of the column interchange system, ion exchange columns are interchanged between the brine circuit, the water washing circuit, and the acid circuit. In one embodiment, the first column in the brine circuit is loaded with lithium, and then interchanged into the water washing circuit to remove brine from the void space, pore space, or head space of the column. In one embodiment, the first column in the water washing circuit is washed to remove brine, and then interchanged to the acid circuit, where lithium is eluted with acid to form a lithium eluate. In one embodiment, the first column in the acid circuit is eluted with acid, and then interchanged into the brine circuit to absorb lithium from the brine. In one embodiment of the column interchange system, two water washing circuits are used to wash the columns after both the brine circuit and the acid circuit. In one embodiment of the column interchange system, only one water washing circuit is used to wash the columns after the brine circuit, whereas excess acid is neutralized with base or washed out of the columns in the brine circuit.

In one embodiment of the column interchange system, the first column in the brine circuit is interchanged to become the last column in the water washing circuit. In one embodiment of the column interchange system, the first column in the water washing circuit is interchanged to become the last column in the acid circuit. In one embodiment of the column interchange system, the first column in the acid circuit is interchanged to become the last column in the brine circuit.

In one embodiment of the column interchange system, each column in the brine circuit contains one or more tanks or junctions for mixing base into the brine and optionally settling any basic precipitates that form following base addition. In one embodiment of the column interchange system, each column in the brine circuit has associated one or more tanks or junctions for removing basic precipitates or other particles via settling or filtration. In one embodiment of the column interchange system, each column or various clusters of columns have associated one or more settling tanks or filters or other means of solid-liquid separation that capture ion exchange material, including particles that detach from ion exchange material or beads.

In one embodiment of the column interchange system, the number of the columns in the brine circuit is optionally less than about 3, less than about 10, less than about 30, or less than about 100. In one embodiment of the column interchange system, the number of the columns in the acid circuit is optionally less than about 3, less than about 10, less than about 30, or less than about 100. In one embodiment of the column interchange system, the number of the columns in the water washing circuit is optionally less than about 3, less than about 10, less than about 30, or less than about 100. In certain embodiments, the number of columns in the brine circuit is 1 to 10. In some embodiments, the number of columns in the acid circuit is 1 to 10. In some embodiments, the number of columns in washing circuit is 1 to 10.

In one embodiment of the column interchange system, there is optionally one or more brine circuits, one or more acid circuits, and one or more water washing circuits. In one embodiment of the column interchange system, ion exchange columns are optionally supplied with fresh ion exchange material without interruption to operating columns. In one embodiment of the column interchange system, ion exchange columns with material that have been depleted in capacity is optionally replaced with ion exchange columns with fresh ion exchange material without interruption to operating columns.

In one embodiment of the ion exchange system, ion exchange material is loaded into ion exchange columns, and, following lithium uptake from brine, lithium is eluted from the ion exchange columns using an acid recirculation loop. In one embodiment of the acid recirculation loop, acid is flowed through an ion exchange column, into a tank, and then recirculated through the ion exchange column to optimize lithium elution. In one embodiment of the ion exchange system, ion exchange material is loaded into ion exchange columns, and, following lithium uptake from brine, lithium is eluted from each ion exchange column using a once-through flow of acid. In one embodiment of the ion exchange system, ion exchange materials is loaded into an ion exchange column, and, following lithium uptake from brine, lithium is eluted from the ion exchange column using a column interchange circuit.

In one embodiment of the ion exchange system, ion exchange columns are loaded with lithium by flowing brine through the columns using a recirculating batch system, and then lithium is eluted from the columns using a column interchange system. In one embodiment of the ion exchange system, ion exchange columns are loaded with lithium by flowing brine through the columns using a column interchange system, and then lithium is eluted from the columns using a recirculating batch system. In one embodiment of the ion exchange system, ion exchange columns are loaded with lithium by flowing brine through the columns using a recirculating batch system, and then lithium is eluted from the columns using a recirculating batch system. In one embodiment of the ion exchange system, ion exchange columns are loaded with lithium by flowing brine through the columns using a column interchange system, and then lithium is eluted from the columns using a column interchange system.

Stirred Tank system

In one embodiment of the integrated system, the integrated system includes an ion exchange system wherein the pH modulating setup is a tank comprising: a) one or more compartments; and b) a means for moving the liquid resource through the one or more compartments. In an embodiment, the ion exchange material is loaded in at least one compartment. In an embodiment, the means for moving the liquid resource through the one or more compartments is a pipe and suitably configured pump. In an embodiment, the tank further comprises a means for circulating the liquid resource throughout the tank. In an embodiment, the means for circulating the liquid resource throughout the tank is a mixing device. In an embodiment, the tank further comprises an injection port.

In one embodiment of the ion exchange system, the system is a stirred tank system comprised of a tank of brine containing permeable bead compartments, such as permeable pallets, cases, boxes, or other containers, that are loaded with ion exchange beads, and the brine is stirred through the tank in a batch process. In one embodiment of the stirred tank system, the base is optionally added directly to the tank gradually or all at once as a solid or in an aqueous solution. In one embodiment of the stirred tank system, after a brine uptake stage is complete, the permeable bead containers are optionally moved to another tank for acid elution. In one embodiment of the stirred tank system, the permeable bead compartments are located at the bottom of the stirred tank during the brine stage and after the brine stage is completed, then brine is removed, and the bottom of the stirred tank is filled with acid to elute lithium in such a way that the permeable bead compartments are covered with an optimal volume of acid.

In one embodiment of the stirred tank system, the ion exchange beads are suspended using plastic structural supports in a tank with an internal mixing device. In one embodiment of the stirred tank system, a stream of brine is removed from the tank and passed through a column where hydrogen ions in the brine produced by ion exchange are neutralized using sacrificial base in solution or added as solid, or by an ion exchange resin. This pH-corrected stream is sent back into the system where the lithium can continue to be removed. In one embodiment of the stirred tank system, brine that has passed through the bead compartment is returned to the opposite end of the tank through a pipe that is optionally internal or external to the tank. In one embodiment of the stirred tank system, base is optionally added to the brine inside the tank or in a base addition tank outside the tank.

In one embodiment of the stirred tank system, fresh brine is fed to the system so as to operate in continuous stirred tank system mode instead of batch mode. In one embodiment of the recirculating batch system, fresh brine is fed to the system so as to operate in continuous stirred tank system mode instead of batch mode.

Other Types of Systems

In one embodiment of the integrated system, the integrated system includes an ion exchange system, wherein the column further comprises a plurality of injection ports, wherein the plurality of injection ports are used to increase the pH of the liquid resource in the system.

In one embodiment of the ion exchange system, the system is a mixed base system comprising an ion exchange column and a mixing chamber, where base is mixed into the brine immediately prior to injection of the brine into the column.

In one embodiment of the ion exchange system, the system is a ported ion exchange column system with multiple ports for injection of aqueous base spaced at intervals along the direction of brine flow through the column. As brine flows through the column, there is a region of the column where the beads experience the greatest rate of lithium absorption, and this region moves through the column in the direction of brine flow. In the ported ion exchange column system, base is injected near that region to neutralize protons released by the ion exchange reaction. In regions of the columns where the beads have been saturated with lithium and the rate of release of protons has slowed, base injected is decreased or terminated to avoid formation of basic precipitates.

In one embodiment of the ion exchange system, the system has a moving bed of beads that moves in a direction opposite to the flow of brine, and base is injected at one or more fixed points in the column in a region near where the ion exchange reaction occurs at a maximum rate in the column to neutralize the protons released from the ion exchange reaction. In one embodiment of the ion exchange system, the base added to the brine is optionally NaOH, KOH, $Mg(OH)_2$, $Ca(OH)_2$, CaO, $NH_3$, $Na_2SO_4$, $K_2SO_4$, $NaHSO_4$, $KHSO_4$, NaOCl, KOCl, $NaClO_4$, $KClO_4$, $NaH_2BO_4$, $Na_2HBO_4$, $Na_3BO_4$, $KH_2BO_4$, $K_2HBO_4$, $K_3BO_4$, $MgHBO_4$, $CaHBO_4$, $NaHCO_3$, $KHCO_3$, $NaCO_3$, $KCO_3$, $MgCO_3$, $CaCO_3$, $Na_2O$, $K_2O$, $Na_2CO_3$, $K_2CO_3$, $Na_3PO_4$, $Na_2HPO_4$, $NaH_2PO_4$, $K_3PO_4$, $K_2HPO_4$, $KH_2PO_4$, $CaHPO_4$, $MgHPO_4$, sodium acetate, potassium acetate, magnesium acetate, poly(vinylpyridine), poly(vinylamine), polyacrylonitrile, other bases, or combinations thereof. In one embodiment, the base is optionally added to the brine in a solid form, as an aqueous solution, or as an aqueous solution. In one embodiment, the base is optionally added in a gaseous state, such as gaseous $NH_3$. In one embodiment, the base is optionally added to the brine in a steady stream, a variable stream, in steady aliquots, or in variable aliquots. In one embodiment, the base is optionally created in the brine by using an electrochemical cell to remove $H_2$ and $Cl_2$ gas, which is optionally combined in a separate system to create HCl acid to be used for eluting lithium from the system or for other purposes.

In one embodiment of the ion exchange system, the brine flows through a pH control column containing solid sacrificial base particles, such as NaOH, CaO, or $Ca(OH)_2$, which dissolve into the brine and raise the pH of the brine. In one embodiment of the ion exchange system, the brine flows through a pH control column containing immobilized regeneratable OH-containing ion exchange resins, which react with hydrogen ions, or regeneratable base species, such as immobilized polypyridine, which conjugate HCl, thereby neutralizing the acidified brine. When the ion exchange resin has been depleted of its OH groups or is saturated with HCl, it is optionally regenerated with a base such as NaOH.

In one embodiment of the ion exchange system, pH meters are optionally installed in tanks, pipes, column, and other components of the system to monitor pH and control the rates and amounts of base addition at various locations throughout the system.

In one embodiment of the ion exchange system, the columns, tanks, pipes, and other components of the system are optionally constructed using plastic, metal with a plastic lining, or other materials that are resistant to corrosion by brine or acid.

In one embodiment of the ion exchange system, the ion exchange columns are optionally washed with water that is mildly acidic, optionally including a buffer, to remove any basic precipitates from the column prior to acid elution.

After the ion exchange column is saturated or nearly saturated with lithium, the lithium is flushed out of the ion exchange column using acid. The acid is optionally flowed through the column one or more times to elute the lithium. In one embodiment, the acid is optionally flowed through the ion exchange column using a recirculating batch system comprised of the ion exchange column connected to a tank. In one embodiment, the tank used for acid flows is optionally the same tank used for the brine flows. In a further embodiment, the tank used for acid flows is optionally a different tank than the one used for brine flows. In a further embodiment, the acid is distributed at the top of the ion exchange column, and allowed to percolate through, and immediately recirculated into the column with no extra tank. In an embodiment, acid addition optionally occurs without a tank used for acid flows.

In one embodiment, lithium is eluted from the ion exchange material using a combination of water and one or more acid solutions. In one embodiment, lithium is eluted from the ion exchange material using an initial volume of water or acid followed by a later addition of acid that may be discrete or continuous. The initial volume of acid may be of a lower concentration, such as less than 0.2 M, less than 0.5 M, less than 1.0 M, less than 2.0 M, or less than 5.0 M.

The later addition of acid may be of a higher concentration that is greater than 0.2 M, greater than 0.5 M, greater than 1.0 M, greater than 2.0 M, or greater than 5.0 M. For example, the initial acid concentration may be 0.5 M and the additional acid may be 6.0 M. In one embodiment, this acid elution with different combinations of water and acids may optionally be performed in a stirred tank reactor or an ion exchange column, of which either may optionally be part of a larger ion exchange system with multiple reactors or columns connected in a network.

In one embodiment of the ion exchange system, the column is optionally washed with water after the brine and/or acid steps, and the effluent water from washing is optionally treated using pH neutralization and reverse osmosis to yield process water.

In one embodiment of the ion exchange system, the ion exchange column is optionally shaped like a cylinder, a rectangle, or another shape. In one embodiment, the ion exchange column optionally has a cylinder shape with a height that is greater or less than its diameter. In one embodiment, the ion exchange column optionally has a cylinder shape with a height that is less than 10 cm, less than 1 meter, or less than 10 meters. In one embodiment, the ion exchange column optionally has a cylinder shape with a diameter that is less than 10 cm, less than 1 meter, or less than 10 meters.

In one embodiment of the ion exchange system, the system is optionally resupplied with fresh ion exchange material by swapping out an ion exchange column with a new column loaded with fresh ion exchange material. In one embodiment of the ion exchange system, the system is optionally resupplied with fresh ion exchange material by removing the beads from the column and loading new material into the column. In one embodiment of the ion exchange system, new material is optionally supplied to all columns in the system simultaneously. In one embodiment of the ion exchange system, new material is optionally supplied to one or more columns at a time. In one embodiment of the ion exchange system, new material is optionally supplied to one or more columns without interruption to other columns that optionally continue operating.

In one embodiment of the ion exchange system, brine pumping optionally continues until the ion exchange material approaches a point of lithium saturation over a period of time that is optionally less than about 30 minutes, about 1 hours, less than about 2 hours, less than about 4 hours, less than about 8 hours, less than about 24 hours, less than about 48 hours, or less than about one week. In one embodiment of the ion exchange system, brine pumping optionally continues until the ion exchange material approaches a point of lithium saturation over a period of time that is optionally greater than about one week. In certain embodiments of the ion exchange system, brine pumping optionally continues until the ion exchange material approaches a point of lithium saturation over a period of time that is optionally between 30 minutes and 24 hours. In one embodiment of the ion exchange system, acid pumping optionally continues until the ion exchange material approaches a point of hydrogen saturation over a period of time that is optionally less than about 5 minutes, 15 minutes, 30 minutes 1 hours, less than about 2 hours, less than about 4 hours, less than about 8 hours, less than about 24 hours, or less than about 48 hours. In one embodiment of the ion exchange system, brine pumping optionally continues until the ion exchange material approaches a point of hydrogen saturation over a period of time that is optionally greater than about one 48 hours. In certain embodiments of the ion exchange system, brine pumping optionally continues until the ion exchange material approaches a point of hydrogen saturation over a period of time that is optionally between 2 minutes and 2 hours.

Ion Exchange Material

In one embodiment of the integrated system, the integrated system includes an ion exchange system wherein the ion exchange material comprises a plurality of ion exchange particles. In an embodiment, the plurality of ion exchange particles in the ion exchange material is selected from uncoated ion exchange particles, coated ion exchange particles, and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads.

In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In one embodiment, the liquid resource is produced by leaching ores, clays, sediments, waste, scrap, post-consumer products, slurries, or other materials using hydrochloric acid, sulfuric acid, nitric acid, other acids, or combinations thereof. In one embodiment, the liquid resources is produced by leaching materials using acid with a concentration of greater than about 0.1 N, greater than about 1.0 N, greater than about 10 N, or greater than about 20 N. In one embodiment, the liquid resource is produced by leaching materials that have been heated, calcined, oxidized, reduced, or chemically altered. In one embodiment, the liquid resource is produced by leaching material with water, solvent, or other liquid only.

In one embodiment, said liquid resource is a brine that is processed to remove lithium from a spent brine that is depleted or partially depleted of lithium. In one embodiment, the spent brine is disposed of by injection underground, injection into a geologic formation, injection into a deeper geologic formation than from where the brine was extracted, injection into a salar, injection into a geologic formation in a different geologic formation than from where the brine was extracted, injection into a reservoir, pumping into a body of water, pumping into a lake, flooding into an evaporation pond, flooding onto a salt flat, permeating into the ground, or combinations thereof.

In one embodiment, brine is produced from one well field and disposed of in another well field. In one embodiment, brine is produced from one or more production wells and the raw brine is processed to recover lithium. In one embodiment, spent brine is disposed in one or more disposal wells after the brine is processed to recover lithium. In one embodiment, production wells are near the center of a geologic formation and disposal wells are near the periphery of a geologic formation. In one embodiment, production wells are near the periphery of a geologic formation and disposal wells are near the center of a geologic formation. In one embodiment, production wells are near the top of a geologic formation and disposal wells are near the bottom of a geologic formation. In one embodiment, production wells are near the bottom of a geologic formation and disposal wells are near the top of a geologic formation. In one embodiment, other waste streams may be combined with the spent brine for disposed or injection. In one embodiment, water, potassium, boron, sodium, magnesium, or other species may be recovered from the raw brine or spent brine before or after lithium recovery and before or after pumping from a production well or disposal well. In one embodiment, a well may be a pump drawing water from above or below ground. Ion exchange materials are typically small particles, which together constitute a fine powder. In some embodiments small particle size minimizes the diffusion distance that lithium must travel into the core of the ion exchange particles. In some cases, these particles are optionally coated with protective surface coatings to minimize dissolution of the ion exchange materials while allowing efficient transfer of lithium and hydrogen to and from the particles.

In an embodiment, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof, and the coating material comprises $TiO_2$, $ZrO_2$, $SiO_2$, $MoO_2$, $Li_2TiO_3$, $Li_2ZrO_3$, $LiNbO_3$, $AlF_3$, SiC, $Si_3N_4$, graphitic carbon, amorphous carbon, diamond-like carbon, or combinations thereof. The coated ion exchange particles have an average diameter less than about 1 micron, less than about 10 microns, less than about 100 microns, or less than about 1,000 microns, and the coating thickness is less than about 5 nm, less than about 100 nm, less than about 2,000 nm, or less than about 40,000 nm. The particles are created by first synthesizing the ion exchange material using a method, such as hydrothermal, solid state, or microwave. The coating material is then deposited on the surface of the ion exchange material using a method, such as chemical vapor deposition, hydrothermal, solvothermal, sol-gel, precipitation, or microwave. The coated ion exchange particles are treated with an acid solution prepared with hydrochloric acid, sulfuric acid, nitric acid, or combinations thereof, wherein the concentration of the acid solution is greater than about 0.1 M, greater than about 1.0 M, greater than about 5 M, greater than about 10 M, or combinations thereof. During acid treatment, the particles absorb hydrogen while releasing lithium. The ion exchange material is converted to a protonated state with a hydrogen-enriched composition. The coating material allows diffusion of hydrogen and lithium, respectively, to and from the ion exchange material while providing a protective barrier that limits dissolution of the ion exchange material. After treatment in acid, the protonated coated ion exchange particles are treated with a liquid resource, wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. The coated ion exchange particles absorb lithium while releasing hydrogen. The lithium salt solution is then collected. The coated ion exchange particles capable then perform the ion exchange reaction repeatedly over a number of cycles greater than about 10 cycles, greater than about 30 cycles, greater than about 100 cycles, greater than about 300 cycles, or greater than about 1,000 cycles.

In a further one aspect, a coating material comprises a polymer. In an embodiment, the coating material comprises a chloro-polymer, a fluoro-polymer, a chloro-fluoro-polymer, a hydrophilic polymer, a hydrophobic polymer, co-polymers thereof, mixtures thereof, or combinations thereof.

In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof.

In a further aspect, a coating material comprises polyethylene, low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly (chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof.

In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising n-methyl-2-pyrrolidone, dimethyl sulfoxide, tetrahydrofuran, dimethylformamide, dimethylacetamide, methyl ethyl ketone, ethanol, acetone, other solvents, or combinations thereof.

One major challenge for lithium extraction using inorganic ion exchange particles in a fixed bed is the loading of the particles into the fixed bed in such a way that brine and acid are optionally pumped efficiently through the column with minimal clogging. The materials are optionally formed into beads, and the beads are optionally loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

Figure 14:
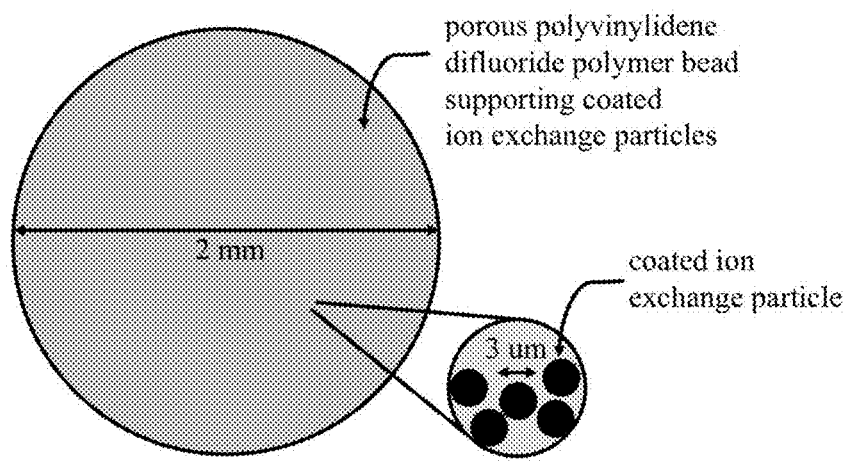
FIG. 14 illustrates a porous ion exchange bead.

In some embodiments, the ion exchange beads are porous ion exchange beads with networks of pores that facilitate the transport into the beads of solutions that are pumped through an ion exchange column. Pore networks are optionally strategically controlled to provide fast and distributed access for the brine and acid solutions to penetrate into the bead and deliver lithium and hydrogen to the ion exchange particles. One example of a porous ion exchange bead is shown in FIG. 14.

In some embodiments, the ion exchange beads are formed by mixing ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method optionally involves multiple ion exchange materials, multiple polymer materials, and multiple filler materials.

Figure 13:
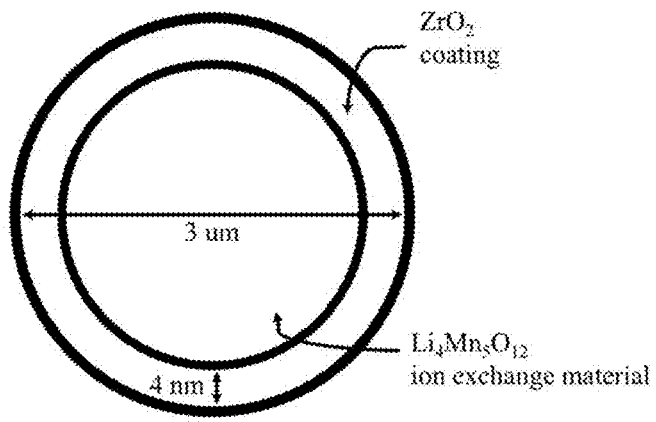
FIG. 13 illustrates a coated ion exchange particle.

Another major challenge for lithium extraction using inorganic ion exchange materials is dissolution and degradation of the materials, especially during lithium elution in acid, but also during lithium uptake in liquid resources. To yield a lithium eluate solution with a high concentration of lithium ions from the ion exchange process, acid is used to elute the lithium, and often it is desirable to use a concentrated acid solution to elute the lithium. However, acid solutions and especially concentrated acid solutions dissolve and degrade inorganic ion exchange materials, which decrease the performance and lifespan of the materials. Therefore, the ion exchange materials are optionally coated to form coated ion exchange particles for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle improves the lifespan of the ion exchange material in the ion exchange process, and enables use of stronger acids to yield lithium eluate solutions with high concentrations of lithium ions. One example of a coated ion exchange particle is shown in FIG. 13. Coated ion exchange particles may be used for lithium uptake in the form of a powder or in the form of a bead.

In this invention, the ion exchange material is selected for high lithium absorption capacity, high selectivity for lithium in a liquid resource relative to other ions, such as sodium and magnesium, strong lithium uptake in liquid resources, including those with low concentrations of lithium, facile elution of lithium with a small excess of acid, and fast ionic diffusion. A coating material is optionally selected to protect the particle from dissolution and chemical degradation during lithium recovery in acid, and also during lithium uptake in various liquid resources. A coating material optionally is also selected to facilitate diffusion of lithium and hydrogen between the particles and the liquid resources, to enable adherence of the particles to a structural support, and to suppress structural and mechanical degradation of the particles.

When the ion exchange material is used in an ion exchange system, the liquid resource containing lithium is pumped through the ion exchange system so that the ion exchange material absorbs lithium from the liquid resource while releasing hydrogen. After the material has absorbed lithium, an acid solution is pumped through the column so that the material releases lithium into the acid solution while absorbing hydrogen. The column is optionally operated in co-flow mode with the liquid resource and acid solution alternately flowing through the column in the same direction; or the column is optionally operated in counter-flow mode with a liquid resource and acid solution alternately flowing through the column in opposite directions.

Between flows of the liquid resource and the acid solution, the column is optionally treated or washed with water or other solutions for purposes, such as adjusting pH in the column or removing potential contaminants. The material optionally forms a fixed or moving bed, and the moving bed optionally moves in counter-current to the brine and acid flows. The material optionally may be suspended in a stirred tank reactor through stirring, spinning, pumping, or combinations thereof. The material is optionally moved between multiple columns with moving beds, where different columns are used for brine, acid, water, or other flows. Before or after the liquid resource flows through the column, the pH of the liquid is optionally adjusted with $Ca(OH)_2$, NaOH, or other chemicals in a solid, liquid, or slurry form to facilitate the ion exchange reaction as well as handling or disposal of the spent liquid resource. Before or after the liquid resource flows through the column, the liquid resource is optionally subjected to other processes, including other ion exchange processes, solvent extraction, evaporation, chemical treatment, or precipitation to remove lithium, to remove other chemical species, or to otherwise treat the brine.

When the ion exchange material is treated with acid, a lithium solution is produced. This lithium solution is optionally further processed to produce lithium chemicals. These lithium chemicals are optionally supplied for an industrial application. In some embodiments, an ion exchange material is selected from the following list: an oxide, a phosphate, an oxyfluoride, a fluorophosphate, or combinations thereof. In some embodiments, an ion exchange material is selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, or combinations thereof. In a further aspect, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In a further aspect described herein, the coating material allows diffusion to and from the ion exchange material. In particular, the coating material facilitates diffusion of lithium and hydrogen between the particles and the liquid resources, enabling adherence of the particles to a structural support, and suppressing structural and mechanical degradation of the particles. In a further aspect described herein, the coating material comprises a carbide, a nitride, an oxide, a phosphate, a fluoride, a polymer, carbon, a carbonaceous material, or combinations thereof. In a further aspect, the coating material comprises polyvinylidene difluoride, polyvinyl chloride, a fluoro-polymer, a chloro-polymer, or a fluoro-chloro-polymer. In a further aspect, a coating material comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $Mo_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In a further aspect, a coating material comprises $TiO_2$, $ZrO_2$, $SiO_2$, $Li_2TiO_3$, $Li_2ZrO_3$, $Li_2MnO_3$, $ZrSiO_4$, or $LiNbO_3$.

In a further aspect described herein, the coated ion exchange particles have an average diameter less than about 0.1 microns, less than about 1 micron, less than about 10 microns, less than about 100 microns, or less than about 1,000 microns. In a further aspect, the coated ion exchange particles have an average size less than about 50 microns, less than about 100 microns, or less than about 200 microns. In a further aspect, the coated ion exchange particles are optionally secondary particles comprised of smaller primary particles that have an average diameter less than about 10 nm, less than about 100 nm, less than about 1,000 nm, less than about 10,000 nm, or less than about 100,000 nm. In a further aspect, the coating optionally coats the primary ion exchange particles. In a further aspect, the coating optionally coats the secondary ion exchange particles. In a further aspect, the coating optionally coats the secondary ion exchange particles. In a further aspect, the coating optionally coats both the primary ion exchange particles and the secondary ion exchange particles. In a further aspect, the primary ion exchange particles optionally have a first coating and the secondary ion exchange particles optionally have a second coating that is optionally identical, similar, or different in composition to the first coating.

In some embodiments described herein, the coating material has a thickness less than about 1 nm, less than about 10 nm, less than about 100 nm, less than about 1,000 nm, less than about 10,000 nm, or less than about 100,000 nm. In further embodiments, the coating material has a thickness less than about 1 micron or less than about 10 microns. In some embodiments, the ion exchange particles have a coating material with a thickness selected from the following list: less than 10 nm, less than 100 nm, less than 1,000 nm, or less than 10,000 nm. In some embodiments, the coating material has a thickness selected from the following list: less than 0.1 microns, less than 1 micron, or less than 10 microns. In certain embodiments, the coating material has a thickness between about 0.1 microns to 10 microns. In some embodiments, the coating material has a thickness between about 1 micron and 10 microns.

In a further aspect described herein, the ion exchange material and the coating material form one or more concentration gradients where the chemical composition of the particle ranges between two or more compositions. In a further aspect, the chemical composition optionally varies between the ion exchange materials and the coating in a manner that is continuous, discontinuous, or continuous and discontinuous in different regions of the particle. In a further aspect, the ion exchange materials and the coating materials form a concentration gradient that extends over a thickness less than about 1 nm, less than about 10 nm, less than about 100 nm, less than about 1,000 nm, less than about 10,000 nm, or less than about 100,000 nm. In a further aspect, the ion exchange materials and the coating materials form a concentration gradient that extends over a thickness of about 1 nm to about 1,000 nm. In a further aspect, the ion exchange material may partially react with the coating material to form an interphase layer between the ion exchange material and the coating material.

In a further aspect described herein, the ion exchange material is synthesized by a method, such as hydrothermal, solvothermal, sol-gel, solid state, molten salt flux, ion exchange, microwave, ball milling, chemical precipitation, co-precipitation, vapor deposition, or combinations thereof. In a further aspect, the ion exchange material is synthesized by a method, such as chemical precipitation, hydrothermal, solid state, or combinations thereof.

In a further aspect described herein, the coating material is deposited by a method, such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, powder mixing, blending, pyrolysis, or combinations thereof. In a further aspect, the coating material is deposited by a method such as sol-gel, chemical precipitation, or combinations thereof. In a further aspect, the coating materials is deposited in a reactor that is optionally a batch tank reactor, a continuous tank reactor, a batch furnace, a continuous furnace, a tube furnace, a rotary tube furnace, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings are optionally deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene fluoride, polyvinyl chloride, polyvinylidene chloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In one embodiment, a coating material comprises a chloro-polymer, a fluoro-polymer, a chloro-fluoro-polymer, a hydrophilic polymer, a hydrophobic polymer, co-polymers thereof, mixtures thereof, or combinations thereof. In one embodiment, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In one embodiment, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly (4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluorosulfonic acid (Nafion), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In one embodiment, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In a further aspect, a coating material comprises polyvinylidene fluoride (PVDF), polyvinyl chloride (PVC), ethylene chlorotrifluoro ethylene (Halar), poly (4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof.

In one embodiment, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In one embodiment, a coating is deposited using a solvent comprising n-methyl-2-pyrrolidone, dimethyl sulfoxide, tetrahydrofuran, dimethylformamide, dimethylacetamide, methyl ethyl ketone, ethanol, acetone, other solvents, or combinations thereof.

In some embodiments, the porous bead is formed by mixing the ion exchange particles, the matrix material, and the filler material together at once. In some embodiments, the porous bead is formed by first mixing the ion exchange particles and the matrix material, and then mixing with the filler material. In some embodiments, the porous bead is formed by first mixing the ion exchange particles and the filler material, and then mixing with the matrix material. In some embodiments, the porous bead is formed by first mixing the matrix material and the filler material, and then mixing with the ion exchange particles.

In some embodiments, the porous bead is formed by mixing the ion exchange particles, the matrix material, and/or the filler material with a solvent that dissolves once or more of the components. In some embodiments, the porous bead is formed by mixing the ion exchange particles, the matrix material, and/or the filler material as dry powders in a mixer or ball mill. In some embodiments, the porous bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry is optionally formed using a solvent of n-methyl-2-pyrrolidone, dimethyl sulfoxide, tetrahydrofuran, dimethylformamide, dimethylacetamide, methyl ethyl ketone, or combinations thereof. The different liquid solution is optionally formed using water, ethanol, iso-propyl alcohol, acetone, or combinations thereof.

In some embodiments, the porous ion exchange bead is approximately spherical with an average diameter selected from the following list: less than 10 m, less than 100 m, less than 1 mm, less than 1 cm, or less than 10 cm. In some embodiments, the porous ion exchange bead is approximately spherical, with an average diameter selected from the following list: less than 200 m, less than 2 mm, or less than 20 mm. In certain embodiments, the porous ion exchange bead is approximately spherical, with an average diameter between 10 m and 2 mm.

In some embodiments, the porous ion exchange bead is tablet-shaped with a diameter of less than 1 mm, less than 2 mm, less than 4 mm, less than 8 mm, or less than 20 mm, and with a height of less than 1 mm, less than 2 mm, less than 4 mm, less than 8 mm, or less than 20 mm. In certain embodiments, the porous ion exchange bead is tablet-shaped with a diameter between 500 μm and 10 mm.

In some embodiments, the porous ion exchange bead is embedded in a support structure, which is optionally a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource optionally enters the ion exchange reactor without any pre-treatment following from its source.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

Methods of Modulating pH for the Extraction of Lithium

An aspect of the invention described herein is a method of extracting lithium ions from a liquid resource, comprising: flowing the liquid resource through an ion exchange system for selective lithium uptake to produce a lithium eluate solution; purifying, concentrating, and/or recovering acid from the lithium eluate solution to form a lithium salt solution; and converting the lithium salt solution into a refined lithium-containing compound or solution.

An aspect of the invention described herein is a method of extracting lithium ions from a liquid resource, comprising: flowing the liquid resource through an ion exchange system for selective lithium uptake to produce a lithium eluate solution; purifying, concentrating, and/or recovering acid from the lithium eluate solution to form a lithium salt solution; and converting the lithium salt solution into a LiOH solution using a membrane electrolysis system.

An aspect of the invention described herein is a method of extracting lithium ions from a liquid resource, comprising: flowing the liquid resource through an ion exchange system for selective lithium uptake to produce a lithium eluate solution; purifying, concentrating, and/or recovering acid from the lithium eluate solution to form a lithium salt solution; and converting the lithium salt solution into a solid lithium compound using chemical precipitation.

An aspect of the invention described herein is a method of extracting lithium ions from a liquid resource, comprising: flowing the liquid resource through an ion exchange system for selective lithium uptake to produce a lithium eluate solution; and removing acid and water from the eluate solution to form a concentrated lithium salt solution or solid lithium compound.

In one embodiment, lithium-enriched ion exchange material is produced after treated of the ion exchange material in an ion exchange unit described herein. In one embodiment, a lithium eluate is produced in an ion exchange unit described herein. In one embodiment, the lithium eluate is passed from an ion exchange unit described herein to a membrane cell. In one embodiment, the ion exchange material in the ion exchange unit is treated with an acid solution to produce a hydrogen-enriched ion exchange material in the ion exchange unit. In one embodiment, the processes described herein comprise pH modulation. The pH modulation may maintain equilibrium in favor of hydrogen ions from the hydrogen-rich ion exchange material being exchanged with lithium ions from a liquid resource.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource is optionally entered the ion exchange reactor without any pre-treatment following from its source.

In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the ion exchange reactor is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In an embodiment, the acid solution comprises hydrochloric acid, sulfuric acid, phosphoric acid, hydrobromic acid, chloric acid, perchloric acid, nitric acid, formic acid, acetic acid, or combinations thereof.

In some embodiments, the acid used for recovering lithium from the ion exchange system has a concentration selected from the following list: less than 0.1 M, less than 1.0 M, less than 5 M, less than 10 M, or combinations thereof. In some embodiments, the acid used for recovering lithium from the porous ion exchange beads has a concentration greater than 10 M.

In some embodiments, the ion exchange beads perform the ion exchange reaction repeatedly while maintaining adequate lithium uptake capacity over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles. In some embodiments, adequate lithium uptake capacity is optionally defined as a percentage of initial uptake capacity selected from the following list: greater than 95%, greater than 90%, greater than 80%, greater than 60%, or greater than 20%. In some embodiments, adequate lithium uptake capacity is optionally defined as a percentage of initial uptake capacity, such as less than 20%.

In some embodiments, the lithium eluate solution that is yielded from the ion exchange reactor is further processed into lithium raw materials using methods selected from the following list: solvent extraction, ion exchange, chemical precipitation, electrodialysis, electrowinning, electrolysis, evaporation with direct solar energy, evaporation with concentrated solar energy, evaporation with a heat transfer medium heated by concentrated solar energy, evaporation with heat from a geothermal brine, evaporation with heat from combustion, pH neutralization, or combinations thereof. In some embodiments, the lithium eluate solution that is yielded from the ion exchange reactor is concentrated using reverse osmosis or membrane technologies.

In some embodiments, the lithium eluate solution that is yielded from the ion exchange reactor is further processed into lithium chemicals selected from the following list:

lithium chloride, lithium carbonate, lithium hydroxide, lithium metal, lithium metal oxide, lithium metal phosphate, lithium sulfide, or combinations thereof. In some embodiments, the lithium eluate solution that is yielded from the porous ion exchange beads is further processed into lithium chemicals that are solid, liquid, hydrated, or anhydrous.

In some embodiments, the lithium chemicals produced using the ion exchange reactor are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a protonated state with a sublattice fully or partly occupied by hydrogen.

In some embodiments, the ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 5 to 7, a preferred pH range is optionally 4 to 8, and an acceptable pH range is optionally 2 to 9. In an embodiment, the pH modulating setup comprises measuring the pH of the system, and wherein the pH of the system is less than about 5, less than about 4, or less than about 2, the pH of the system is adjusted to a pH of 2 to 9, a pH of 4 to 8, or a pH of 5 to 7.

Process of Modulating pH for the Extraction of Lithium

An aspect of the invention described herein is a process for the extraction of lithium ions from a liquid resource, comprising: a) contacting an ion exchange material with the liquid resource; b) increasing the pH of the liquid resource before contact with the ion exchange material, during contact with the ion exchange material, after contact with the ion exchange material, or combinations thereof; c) eluting lithium from the ion exchange material using acid to produce a lithium eluate solution; d) recovering unused acid from the lithium eluate solution to be reused for elution; and e) concentrating, purifying, and converting the lithium eluate solution into a refined solution, compound, or combinations thereof.

An aspect of the invention described herein is a process, wherein the ion exchange material is loaded into an ion exchange system. In an embodiment, the process further comprises: a) flowing a liquid resource into one or more ion exchange systems producing a lithium-containing solution; b) connecting the ion exchange systems to one or more units for concentration and/or purification of a lithium-containing solution; and c) passing a lithium-containing solution from the one or more units for concentration and/or purification into a membrane electrolysis unit to convert the lithium-containing solution into a lithium hydroxide solution. In an embodiment, the process further comprises recovering and/or regenerating acid from a lithium-containing solution to be reused for lithium elution.

An aspect of the invention described herein is a process, wherein the ion exchange material is loaded into an ion exchange system. In an embodiment, the process further comprises: a) flowing a liquid resource into one or more ion exchange systems producing a lithium-containing solution; b) connecting the ion exchange systems to one or more units for concentration and/or purification of a lithium-containing solution; and c) passing a lithium-containing solution from the one or more units for concentration and/or purification into a chemical precipitation unit to convert the lithium-containing solution into a solid lithium compound. In an embodiment, the process further comprises recovering and/or regenerating acid from a lithium-containing solution to be reused for lithium elution.

An aspect of the invention described herein is a process, wherein the ion exchange material is loaded into a reactor. In an embodiment, the process further comprises: a) loading a liquid resource into one or more liquid resource tanks; b) connecting the reactor to the one or more liquid resource tanks; and c) passing the liquid resource from the one or more liquid resource tanks through the reactor, wherein the passing of the liquid resource occurs at least once. In an embodiment, the process further comprises increasing the pH of the liquid resource in one or more pH increasing tanks. In an embodiment, the process further comprises settling precipitates in one or more settling tanks. In an embodiment, the process further comprises storing the liquid resource in one or more storing tanks prior to or after circulating the liquid resource through the column.

An aspect of the invention described herein is a process, wherein the process further comprises: a) loading the liquid resource into one or more liquid resource tanks; b) connecting the column to the one or more liquid resource tanks; c) passing the liquid resource from the one or more liquid resource tanks through the column, wherein the passing of the liquid resource occurs at least once; d) increasing the pH of the liquid resulting from c) in one or more pH increasing tanks; e) settling precipitates of the liquid resulting from d) in one or more settling tanks; and f) storing the liquid resulting from e) in one or more storing tanks.

An aspect of the invention described herein is a process, wherein the ion exchange material is loaded in a plurality of columns. In an embodiment, a plurality of tanks is connected to the plurality of columns, wherein each of the plurality of tanks is immediately connected to one of the plurality of columns. In an embodiment, two or more of the plurality of columns forms at least one circuit. In an embodiment, at least one circuit is selected from a liquid resource circuit, a water washing circuit, and an acid solution circuit. In an embodiment, the pH of the liquid resource is increased in the plurality of tanks connected to the plurality of columns in the liquid resource circuit. In an embodiment, the liquid resource circuit includes a plurality of columns connected to a plurality of tanks, wherein each of the plurality of tanks is immediately connected to one of the plurality of columns.

An aspect of the invention described herein is a process, wherein the process further comprises: a) passing the liquid resource through a plurality of columns in the liquid resource circuit; b) passing an acid solution through a plurality of columns in the acid solution circuit one or more times; and c) passing water through a plurality of columns in the water washing circuit.

In an embodiment, the process further comprises interchanging a plurality of columns between the liquid resource circuit, the water washing circuit, and the acid solution circuit, such that: a) at least one of the plurality of columns in the liquid resource circuit becomes at least one of the plurality of columns in the water washing circuit and/or at least one of the plurality of columns in the acid solution circuit; b) at least one of the plurality of columns in the water washing circuit becomes at least one of the plurality of columns in the acid solution circuit and/or at least one of the plurality of columns in the liquid resource circuit; and/or c) at least one of the plurality of columns in the acid solution circuit becomes at least one of the plurality of columns in the liquid resource circuit and/or at least one of the plurality of columns in the water washing circuit.

An aspect of the invention described herein is a process, wherein the ion exchange material is loaded into one or more compartments in a tank. In an embodiment, the process further comprises moving the liquid resource through the one or more compartments in the tank. In an embodiment, the tank comprises injection ports. In an embodiment, the process further comprises using the injection ports to increase the pH of the liquid resource before contact with the ion exchange material, during contact with the ion exchange material, after contact with the ion exchange material, and combinations thereof.

An aspect of the invention described herein is a process, wherein the column further comprises a plurality of injection ports. In an embodiment, the process further comprises using the plurality of injection ports to increase the pH of the liquid resource before contact with the ion exchange material, during contact with the ion exchange material, after contact with the ion exchange material, and combinations thereof.

In an embodiment, the ion exchange material comprises a plurality of ion exchange particles. In an embodiment, the plurality of ion exchange particles in the ion exchange material is selected from uncoated ion exchange particles, coated ion exchange particles, and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads.

In an embodiment, the ion exchange material extracts lithium ions from a liquid resource. During the extraction of lithium ions from a liquid resource by the ion exchange material, the pH of the liquid resource optionally decreases. Increasing the pH of the liquid resource in the system maintains the pH in a range that is suitable for lithium ion uptake by the ion exchange material. In an embodiment, increasing the pH comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, increasing the pH comprises measuring the pH of the system and wherein the pH of the system is less than 6, less than 4, or less than 2, the pH of the system is adjusted to a pH of 2 to 9, a pH of 4 to 8, or a pH of 5 to 7.

In one embodiment, a pre-treatment system is used to remove dissolved species from the brine before lithium ion exchange. This may limit absorption of such species by the lithium ion exchange material. The pre-treatment system may be used to remove transition metals, other metals, metal-organic complexes, or other species. In one embodiment, the pre-treatment is an adsorptive or absorptive technique to remove certain species, such as activated carbon. In one embodiment, the pre-treatment is an electrolytic technique to oxidize or reduce certain species. In one embodiment, the pre-treatment involves the addition of chemical reagents to change pH or oxidation-reduction potential (ORP). In one embodiment, the species are removed through precipitation of solids. In one embodiment, the species are removed as a gas or liquid.

In one embodiment, a pre-treatment system is used to remove iron, manganese, nickel, vanadium, and other transition metals from a brine before lithium ion exchange. In one embodiment, pH adjustment is used to precipitate transition metals from the brine using a base which could be NaOH, $Na_2CO_3$, $Ca(OH)_2$, KOH, other bases, or combinations thereof. In one embodiment, the base is added sequentially to selectively separate transition metals for recovery and use elsewhere. In one embodiment, acid is added to the brine after removal of the transition metals to lower the pH.

In one embodiment, transition metals are removed from the brine using oxidative processes, including chlorine gas, ozone gas, sodium metabisulfite, sodium hypochlorite, hydrogen peroxide, air, combinations thereof, or other oxidants. In one embodiment, the oxidative process is used in conjunction with pH correction. In one embodiment, as oxidants are added, the ORP of the brine is monitored, and to control the extent of the oxidation.

In one embodiment, oxidizing gas is contacted with the brine to precipitate transition metals in a stirred tank reactor. In one embodiment, oxidizing gas is contacted with the brine in a column. In one embodiment, oxidation is done in batches, while in another embodiment, the oxidation is done continuously. In one embodiment, oxidizing gas is recaptured at the effluent of the oxidation reactor and re-contacted with the brine. In one embodiment, a column with baffles, plates, or bio-balls is used to distribute oxidizing gas evenly in the brine and to control bubble size. In one embodiment, oxidizing gas exiting an oxidation reactor is re-used in an oxidation reactor with fresh brine, thus deploying it in a counter-current fashion. In some embodiments, the oxidizing gas may be ozone, chlorine, oxygen, sulfur oxides, nitrogen oxides, combinations thereof, or another oxidizing gas.

In one embodiment of the eluate purification system, NaOH, $Ca(OH)_2$, $Mg(OH)_2$, KOH, $Na_2CO_3$, $CaCO_3$, $MgCO_3$, or $K_2CO_3$ is used to raise the pH of the eluate. In one embodiment of the purification system, NaOH, $Ca(OH)_2$, $Mg(OH)_2$, KOH, $Na_2CO_3$, $CaCO_3$, $MgCO_3$, or $K_2CO_3$ are used to precipitate multivalent ions, such as Mg, Ca, Sr, Mn, Fe, and V. In one embodiment, combinations of bases are used to raise pH and precipitate multivalent ions simultaneously. In one embodiment, the temperature of the solution is raised to accelerate the rate of precipitation of the multivalent ions. In one embodiment, water is added to accelerate the rate of precipitation of the multivalent ions. In one embodiment, the concentration of Li in the eluate post-purification is about 10,000 to about 25,000 mg/L. In one embodiment, the concentration of Li in the eluate is less than about 10,000 mg/L. In one embodiment, the concentration of Li in the eluate is greater than about 25,000 mg/L.

Another aspect described herein is a method of extracting lithium ions from a liquid resource, comprising: a) flowing the liquid resource into a system comprising a tank to produce a lithiated ion exchange material, wherein the tank further comprises (i) one or more compartments, (ii) an ion exchange material, (iii) a mixing device, and (iv) a pH modulating setup for changing the pH of the liquid resource in the system; and b) treating the lithiated ion exchange material from a) with an acid solution to produce a hydrogen-rich ion exchange material and a salt solution comprising lithium ions.

In some embodiments, the method further comprises, prior to b), washing the lithiated ion exchange material with an aqueous solution. In some embodiments, the method further comprises, subsequent to b), washing the hydrogen-rich ion exchange material with an aqueous solution. In some embodiments, the aqueous solution is water.

In some embodiments, the method further comprises, prior to b), flowing the lithiated ion exchange material into a washing system. In some embodiments, the method further comprises, prior to b), transferring a suspension comprising the lithiated ion exchange material. In some embodiments, the method further comprises, prior to b), flowing the lithiated ion exchange material into a washing system, and washing the lithiated ion exchange material with a solution.

In some embodiments, the method further comprises, prior to b), flowing the lithiated ion exchange material into a washing system and washing the lithiated ion exchange material with a solution comprising water. In some embodiments, the method further comprises, prior to b), flowing the lithiated ion exchange material into a washing system and washing the lithiated ion exchange material with an aqueous solution. In some embodiments, the lithiated ion exchange material is washed with an aqueous solution.

In some embodiments, the method further comprises, prior to b), flowing the lithiated ion exchange material into a stripping system. In some embodiments, the method further comprises, prior to b), flowing the lithiated ion exchange material into a stripping system and stripping the lithiated ion exchange material. In some embodiments, the method further comprises, prior to b), flowing the lithiated ion exchange material into a stripping system and stripping volatile components from the lithiated ion exchange material. In some embodiments, the method further comprises, prior to b), flowing the lithiated ion exchange material into a stripping system and stripping volatile components comprising water from the lithiated ion exchange material.

In some embodiments, the pH modulating setup comprises a pH measuring device and an inlet for adding base to the tank. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the measured change in pH triggers adding a base to maintain lithium uptake. In some embodiments, a change in pH to below a pH value of about 2 to about 9 triggers the addition of a base to maintain lithium uptake. In some embodiments, a change in pH to below a pH value of about 2, of about 3, of about 4, of about 5, of about 6, of about 7, of about 8, or of about 9 triggers the addition of a base to maintain lithium uptake. In some embodiments, a change in pH to below a pH of about 2 to about 4, of about 3 to about 5, of about 4 to about 6, of about 5 to about 7, of about 6 to about 8, or of about 7 to about 9 triggers the addition of a base to maintain lithium uptake. In some embodiments, base is added to the liquid resource to maintain the pH of the liquid resource in a range of about 2 to about 3, of about 3 to about 4, of about 4 to about 5, of about 5 to about 6, of about 6 to about 7, of about 7 to about 8, or of about 8 to about 9. In some embodiments, base is added to the liquid resource to maintain the pH of the liquid resource in a range of about 4 to about 5, of about 5 to about 6, of about 6 to about 7, or of about 7 to about 8. In some embodiments, the pH of a liquid resource is maintained in a target range that is high enough to facilitate lithium uptake and low enough to avoid precipitation of metals from the liquid resource. In some embodiments, the pH of a liquid resource is maintained below a pH of about 8 to avoid precipitation of Mg. In some embodiments, the pH of a liquid resource is maintained below a pH of about 2, below a pH of about 3, below a pH of about 4, below a pH of about 5, below a pH of about 6, below a pH of about 7, below a pH of about 8, or below a pH of about 9 to avoid precipitation of metals. In some embodiments, the pH of the liquid resource may drop out of a target pH range due to release of protons from an ion exchange material and a pH modulating setup may adjust the pH of the liquid resource back to a target pH range. In some embodiments, the pH of the liquid resource may be adjusted above a target pH range prior to the liquid resource entering the system and then protons released from the ion exchange material may decrease the pH of the system into the target range. In some embodiments, the pH of the liquid resource may be controlled in a certain range and the range may be changed over time. In some embodiments, the pH of the liquid resource may be controlled in a certain range and then the pH of the liquid resource may be allowed to drop. In some embodiments, the pH of the liquid resource may be controlled in a certain range and then the pH of the liquid resource may be allowed to drop to solubilize colloids or solids. In some embodiments, base may be added to a liquid resource to neutralize protons without measuring pH. In some embodiments, base may be added to a liquid resource to neutralize protons with monitoring of volumes or quantities of the base. In some embodiments, the pH of the liquid resource may be measured to monitor lithium uptake by an ion exchange material. In some embodiments, the pH of the liquid resource may be monitored to determine when to separate a liquid resource from an ion exchange material. In some embodiments, the rate of change of the pH of the liquid resource may be measured to monitor the rate of lithium uptake. In some embodiments, the rate of change of the pH of the liquid resource may be measured to determine when to separate a liquid resource from an ion exchange material.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition has multiple layers of mesh, membrane, or other porous structures. In some embodiments, the porous partition has one or more coarse meshes that provide structural support and one or more fine meshes or membranes that provide filtration. In some embodiments, the porous partition comprises a polyetheretherketone mesh, a polypropylene mesh, a polyethylene mesh, a polysulfone mesh, a polyester mesh, a polyamide, a polytetrafluoroethylene mesh, an ethylene tetrafluoroethylene polymer mesh, a stainless steel mesh, a stainless steel mesh coated in polymer, a stainless steel mesh coated in ceramic, or a combination thereof.

In some embodiments, the method further comprises, after a), draining the liquid resource through the porous partition after the production of the lithiated ion exchange material.

In some embodiments, the method further comprises, after b), draining the salt solution comprising lithium ions through the porous partition after the production of the hydrogen-rich ion exchange material.

In some embodiments, the method further comprises, subsequent to a), flowing the lithiated ion exchange material into another system comprising a tank to produce the hydrogen-rich ion exchange material and the salt solution comprising lithium ions, wherein the tank of the other system further comprises (i) one or more compartments, and (ii) a mixing device.

In some embodiments, the system comprises a plurality of tanks and each of the plurality of tanks further comprises (i) one or more compartments, (ii) an ion exchange material, (iii) a mixing device, and (iv) a pH modulating setup for changing the pH of the system.

An aspect described herein is a method of extracting lithium ions from a liquid resource, comprising: a) flowing the liquid resource into a first system comprising a tank, wherein the tank of the first system further comprises (i) one or more compartments, (ii) an ion exchange material, (iii) a mixing device, and (iv) a pH modulating setup for changing the pH of the liquid resource in the first system, to produce a lithiated ion exchange material; b) flowing the lithiated ion exchange material of a) into a second system comprising a tank, wherein the tank of the second system further comprises (i) one or more compartments, and (ii) a mixing device; and c) treating the lithiated ion exchange from b) with an acid solution to produce a hydrogen-rich ion exchange material and a salt solution comprising lithium ions.

In some embodiments, the method further comprises, subsequent to a), washing the lithiated ion exchange material with an aqueous solution.

In some embodiments, the method further comprises, prior to b), adding an aqueous solution to the lithiated ion exchange material to form a fluidized lithiated ion exchange material.

In some embodiments, the method further comprises, subsequent to c), washing the hydrogen-rich ion exchange material with an aqueous solution. In some embodiments, the aqueous solution is water.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a plurality of tanks to produce a lithiated ion exchange material, wherein each of the plurality of tanks in the first system is in fluid communication with every other one of the plurality of tanks in the first system, and each of the plurality of tanks in the first system further comprises (i) one or more compartments, (ii) an ion exchange material, (iii) a mixing device, and (iv) a pH modulating setup for changing the pH of each of the plurality of tanks in the first system; b) flowing the lithiated ion exchange material into a second system comprising a plurality of tanks, wherein each of the plurality of tanks in the second system is in fluid communication with every other one of the plurality of tanks in the second system and, each of the plurality of tanks in the second system further comprises (i) one or more compartments, and (ii) a mixing device; and c) treating the lithiated ion exchange material from b) with an acid solution in at least one of the plurality of tanks in the second system to produce a hydrogen-rich ion exchange material and a salt solution comprising lithium ions.

In some embodiments, the method further comprises, subsequent to c), washing the hydrogen-rich ion exchange material with an aqueous solution in at least one of the plurality of tanks in the second system.

In some embodiments, the method is operated in a batch mode. In some embodiments, the method is operated in a continuous mode. In some embodiments, the method is operated in continuous and batch mode. In some embodiments, the method is operated in continuous mode, a batch mode, a semi-continuous mode, or combinations thereof.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a tank to produce a lithiated ion exchange material, wherein the tank further comprises (i) one or more compartments, (ii) ion exchange material, and (iii) a mixing device; b) flowing the lithiated ion exchange material from a) into a second system comprising a tank, wherein the tank further comprises (i) one or more compartments, (ii) an acid solution, and (iii) a mixing device; and c) stripping the lithiated ion exchange material to produce hydrogen-rich ion exchange material and a salt solution comprising lithium ions.

In some embodiments, prior to b), the lithiated ion exchange material is washed. In some embodiments, the lithiated ion exchange material is washed with an aqueous solution.

An aspect described herein is a method of extracting lithium ions from a liquid resource, comprising: a) providing a system comprising an ion exchange material, a tank comprising one or more compartments; and a mixing device, wherein (i) the ion exchange material is oxide-based and exchanges hydrogen ions with lithium ions, and (ii) the mixing device is capable of moving the liquid resource around the tank comprising one or more compartments; b) flowing the liquid resource into the system of a), thereby contacting the liquid resource with the ion exchange material, wherein the ion exchange material exchanges hydrogen ions with lithium ions in the liquid resource to produce lithiated ion exchange material; c) removing the liquid resource from the system of b); d) flowing an acid solution into the system of c), thereby contacting the acid solution with the lithiated ion exchange material, wherein the lithiated ion exchange material exchanges lithium ions with the hydrogen ions in the acid solution to produce the ion exchange material and a salt solution comprising lithium ions from the lithiated ion exchange material; and e) collecting the salt solution comprising the lithium ions for further processing.

In some embodiments, the salt solution comprising lithium ions undergoes crystallization.

EXAMPLES

Example 1: Lithium Extraction Using Coated Ion Exchange Particles

Lithium is extracted from a brine using coated ion exchange particles. The brine is an aqueous solution containing 50,000 ppm Na and 1,000 ppm Li. The coated ion exchange particles are comprised of an ion exchange material and a coating material. The ion exchange material is $Li_4Mn_5O_{12}$ and the coating material is $ZrO_2$. The particles are comprised of 98 wt. % active material and 2 wt. % of the coating. The particles have a mean diameter of 1.0 microns, and the coating thickness is approximately 2 nm.

The particles are created by first synthesizing $Li_4Mn_5O_{12}$ and then depositing the coating on the surface of the $Li_4Mn_5O_{12}$. The particles are treated with HCl acid to yield LiCl in solution. During acid treatment, the particles absorb hydrogen while releasing lithium. The $Li_4Mn_5O_{12}$ active material is converted to a protonated state with a hydrogen-enriched composition. The $ZrO_2$ coating allows diffusion of hydrogen and lithium respectively to and from the active material while providing a protective barrier that limits dissolution of manganese and oxygen from the active material. The solution is collected for elemental analysis to measure lithium yield.

After treatment in acid, the protonated particles are treated with brine wherein the particles absorb lithium while releasing hydrogen. The particles are converted from a protonated state to a lithiated state with a lithium-enriched composition. The solution is collected for elemental analysis to measure lithium uptake.

The lithiated material is then treated again with acid to yield lithium in solution as described previously. The cycle of protonation and lithiation is repeated to extract lithium from the brine and yield a LiCl solution. Dissolution and degradation of the active material in acid is limited due to the coating providing a protective barrier. Dissolution of the active material is measured by through elemental analysis of the acid solution following stirring.

Example 2: Lithium Extraction Using an Ion Exchange Column Loaded with Beads Comprising Coated Ion Exchange Particles Lithium is extracted from a brine using an ion exchange column loaded with beads containing coated ion exchange particles. The brine is natural brine containing approximately 500 ppm Li, 50,000 ppm Na, and other chemical species including K, Mg, Ca, and sulfate. The beads are comprised of 10 wt. % polyvinylidene fluoride (PVDF) matrix and 90 wt. % coated ion exchange particles. The coated ion exchange particles are comprised of an active material and a protective surface coating. The active material is $Li_4Mn_5O_{12}$ and the coating is $ZrO_2$. The particles are comprised of 98 wt. % active material constitutes and 2 wt. % of the coating. The particles have a mean diameter of 1.0 microns, and the coating thickness is approximately 2 nm.

The particles are created by first synthesizing $Li_4Mn_5O_{12}$ and then depositing the coating on the surface of the $Li_4Mn_5O_{12}$. The beads are created by dissolving PVDF in N-methyl-2-pyrrolidone (NMP) to form a solution. This solution is then mixed with the coated ion exchange particles to form a slurry. The slurry is dripped into deionized water to form beads. The beads have an average diameter of 2 mm and a porosity of 35%.

The ion exchange column is 2 meters in length and 50 cm in diameter. The column is loaded with the beads. 1 M HCl is pumped into the bottom of the column to elute a LiCl solution out the top of the column. The particles absorb hydrogen while releasing lithium to yield LiCl. The $Li_4Mn_5O_{12}$ active material is converted to a protonated state with a hydrogen-enriched composition $Li_{4-x}H_xMn_5O_{12}$. Lithium recovery from the column is monitored using pH measurements and elemental analysis. After lithium recovery, the column is flushed with water.

After acid treatment, brine is pumped down through the column. The particles absorb lithium while releasing hydrogen. The protonated material is converted to a lithiated state with a lithium-enriched composition $Li_{4-x}H_xMn_5O_{12}$. Lithium uptake by the ion exchange beads in the column is monitored using pH measurements and elemental analysis. The brine exiting the column is adjusted to a neutral pH using NaOH and then reinjected into a brine reservoir. After lithium uptake, the column is flushed with water.

The column is operated by repeating the previously described steps of acid and brine pumping in alternation. This column operation functions to extract lithium from the brine and produce a LiCl eluate solution. During column operation, the ion exchange particles are protected from dissolution and degradation due to the surface coating, which provides a protective barrier.

The LiCl solution that is yielded from column operation is processed into lithium raw materials including $Li_2CO_3$, LiOH, and Li metal. These lithium raw materials are sold for use in batteries, alloys, and other products.

Example 3: Lithium Extraction Using Recirculating Batch System with Mixing Tank, Settling Tank, and Recirculation Tanks Lithium is extracted from a brine using a recirculating batch system (FIG. 1) comprising an ion exchange column (101), a mixing tank for base (102), a settling tank for basic precipitates (103), a brine recirculation tank (104), and an acid recirculation tank (105). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads (FIG. 14). The porous ion exchange beads are comprised of ion exchange particles and a polymer matrix. The ion exchange particles are coated ion exchange particles comprised of a $Li_4Mn_5O_{12}$ core with a $ZrO_2$ coating (FIG. 13). The particles are approximately spherical with a mean diameter of 3.0 microns, and the coating thickness is approximately 4.0 nm. The polymer matrix is comprised of polyvinylidene difluoride. The porous beads contain porous networks with a controlled distribution of pore sizes providing diffusion channels from the bead surface into the bead interior and to the ion exchange particles. The beads have a distribution of shapes with a 2.0 mm average diameter.

The ion exchange column is 50 cm tall and 1.3 cm in diameter. 200 mL of 1.0 M HCl acid is loaded into the acid recirculation tank. The acid is pumped through the ion exchange column at a flow rate of 10 mL per minute. The acid solution flows through the ion exchange column, where the protons from the acid enter the ion exchange beads and are exchanged for lithium. Lithium is thereby released from the beads and enters the acid solution. The acid solution flows back into the acid recirculation tank and is recirculated through the column for a period of 6 hours. After this 6-hour time period, the acid solution has been converted to a lithium chloride solution with some HCl remaining. The lithium chloride solution with some HCl remaining is removed from the system and further processed to produce lithium carbonate powder.

500 mL of water is loaded into the acid recirculation tank. The water is pumped through the ion exchange column at a flow rate of 20 mL per minute to wash residual acid from the column. The water flows through the ion exchange column, then back into the acid recirculation tank, and is then recirculated through the ion exchange column. After 2 hours of water washing, the water is removed from the acid recirculation tank, the pH of the water is neutralized, and the water is discarded.

10 liters of brine is loaded into the brine recirculation tank. The brine is pumped through the ion exchange column at a flow rate of 40 mL per minute. As the brine flows through the column, the ion exchange beads absorb lithium from the brine while releasing protons. The acidified brine flows out of the ion exchange column and into a mixing tank, where aqueous NaOH base is injected from an aqueous base tank (106) to adjust the pH of the brine to approximately 7.5. The mixing tank mixes the base into the brine. The brine flows from the mixing tank into the settling tank, where $Mg(OH)_2$ precipitates optionally settle to the bottom. The $Mg(OH)_2$ precipitates, which form an aqueous slurry, are pumped from the bottom of the settling tank and reinjected into the mixing tank. The pH of the brine entering and leaving the mixing tank is monitored to control rates of base injection into the mixing tank. The brine leaves the settling tank and enters into the brine recirculation tank. The brine is then recirculated back into the ion exchange column. After 36 hours, the rate of lithium uptake by the ion exchange beads slows, pumping through the system is terminated, and the spent brine is drained from the system and discarded. Then, the system is again washed with 500 mL of water as described previously. Then, the system is eluted with acid as described previously to recover a lithium eluate.

These system operations are repeated to extract lithium from brine and yield a lithium chloride eluate for production of lithium carbonate or other lithium chemicals.

Figure 2:
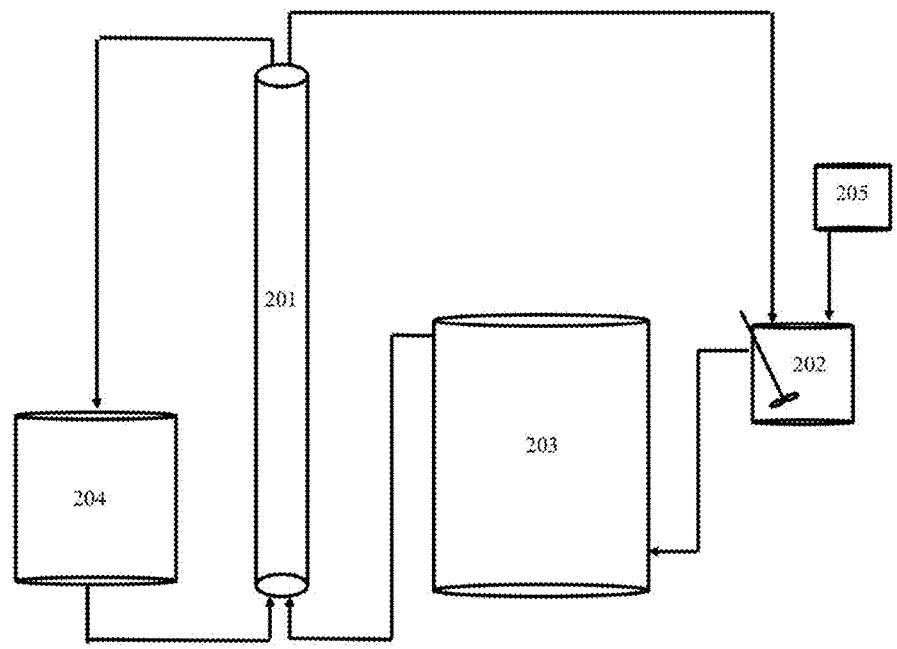
FIG. 2 illustrates a recirculating batch system comprising an ion exchange column, a mixing tank, and a recirculation tank.

Example 4: Lithium Extraction Using Recirculating Batch System with Mixing Tank and Recirculation Tanks Lithium is extracted from a brine using a recirculating batch system (FIG. 2) comprising an ion exchange column (201), a mixing tank for base (202), a brine recirculation tank (203), and an acid recirculation tank (204). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

The ion exchange column is 50 cm tall and 1.3 cm in diameter. 200 mL of 1.0 M HCl acid is loaded into the acid recirculation tank. The acid is pumped through the ion exchange column at a flow rate of 10 mL per minute. The acid solution flows through the ion exchange column, where the protons from the acid enter the ion exchange beads and are exchanged for lithium. Lithium is thereby released from the beads and enters the acid solution. The acid solution is flowed back into the acid recirculation tank and is recirculated through the column for a period of 6 hours. After this 6-hour time period, the acid solution has been converted to a lithium chloride solution with some HCl remaining. The lithium chloride solution with some HCl remaining is removed from the system and further processed to produce lithium carbonate powder.

500 mL of water is loaded into the acid recirculation tank. The water is pumped through the ion exchange column at a flow rate of 20 mL per minute to water residual acid from the column. The water flows through the ion exchange column, then back into the acid recirculation tank, and is then recirculated through the ion exchange column. After 2 hours of water washing, the water is removed from the acid recirculation tank, the pH of the water is neutralized, and the water is discarded.

10 liters of brine is loaded into the brine recirculation tank. The water is pumped through the ion exchange column at a flow rate of 40 mL per minute. As the brine flows through the column, the ion exchange beads absorb lithium from the brine while releasing protons. The acidified brine flows out of the ion exchange column and into a mixing tank, where aqueous NaOH base is injected from an aqueous base tank (205) to adjust the pH of the brine to approximately 7.0 while limiting formation of any basic precipitates. The mixing tank mixes the base into the brine. The pH of the brine entering and leaving the mixing tank is monitored to control rates of base injection into the mixing tank. The brine leaves the mixing tank and enters into the brine recirculation tank. The brine is then recirculated back into the ion exchange column. After 36 hours, the rate of lithium uptake by the ion exchange beads slows, pumping through the system is terminated, and the spent brine is drained from the system and discarded. Then, the system is again washed with 500 mL of water as described previously. Then, the system is eluted with acid as described previously to recover a lithium eluate.

These system operations are repeated to extract lithium from brine and yield a lithium chloride eluate for production of lithium carbonate or other lithium chemicals.

Figure 3:
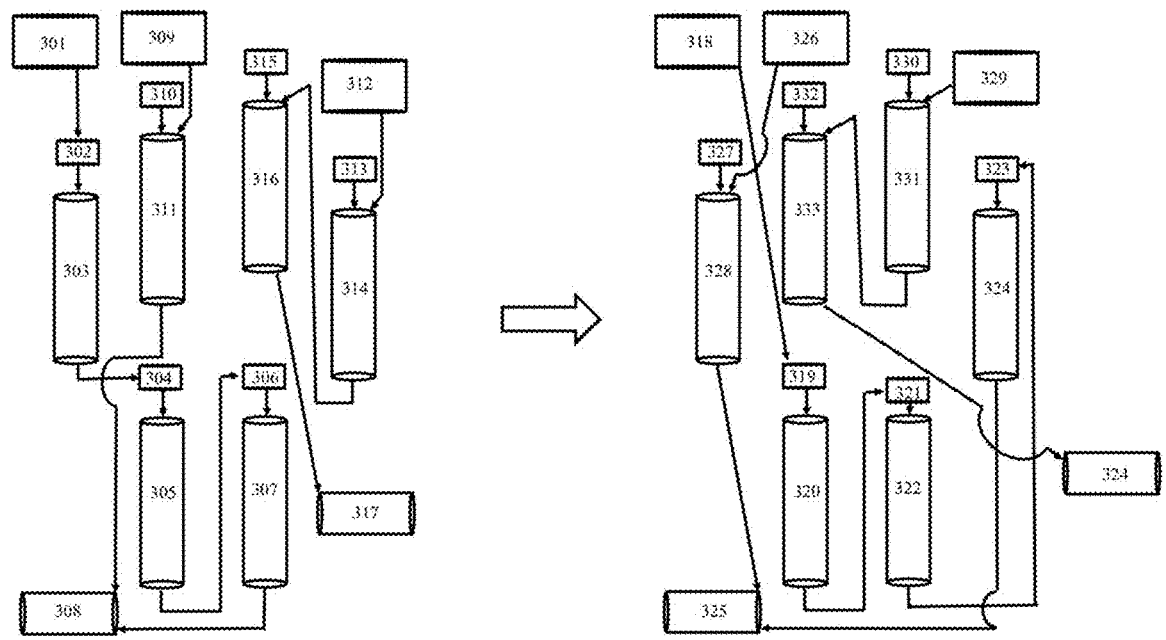
FIG. 3 illustrates a column interchange system comprising a brine circuit, a water washing circuit, and an acid circuit.

Example 5: Lithium Extraction Using Column Interchange System with Brine Circuit, Acid Circuit, and Water Washing Circuit Lithium is extracted from a brine using a column interchange system (FIG. 3) comprising six ion exchange columns, which are divided into a brine circuit, a water washing circuit, and an acid circuit. The brine is a natural aqueous chloride solution containing approximately 50 ppm Li, 40,000 ppm Na, 30,000 ppm Ca, and 3,000 ppm Mg. The ion exchange columns are loaded with packed beds of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

Each of the six ion exchange columns is 150 cm tall and 75 cm in diameter (303, 305, 307, 311, 314, 316). Each ion exchange column has an associated mixing tank for mixing base into brine before the brine is injected into the column (302, 304, 306, 310, 313, 315). Three of the columns (303, 305, 307) along with the associated mixing tanks (302, 304,

306) are linked to form a brine circuit. Brine flows from a brine pipe (301) through a first mixing tank (302), a first ion exchange column (303), a second mixing tank (304), a second ion exchange column (305), a third mixing tank (306), a third ion exchange column (307), and then into a disposal pipe (308). For the mixing tanks in the brine circuit (303, 305, 307), an aqueous base solution of NaOH is added to increase the pH of the brine to 7.5. The pH of the brine is monitored before and after each mixing tank in the brine circuit to control the rate of addition of aqueous base solution. In the first mixing tank (302) in the brine circuit, the brine enters the mixing tank from the brine pipe at a pH of 6.5 and a relatively small amount of base is added. In the other mixing tanks in the brine circuit (304, 306), the brine enters the mixing tank from the outlet of prior ion exchange columns at a pH of 3.5, and a relatively larger amount of base is added to neutralize the protons that are released by the prior ion exchange columns.

The water washing circuit involves pumping water from a water pipe (309), through an ion exchange column that is saturated with lithium (311), and then the water is pumped into a disposal pipe. This water washing circuit removes residual brine from the column to prepare for acid elution with minimal impurities.

The acid circuit comprises two ion exchange columns, which are eluted with 1.0 M sulfuric acid to yield a lithium sulfate eluate. Acid solution flows from an acid storage tank (312), into a first ion exchange column in the acid circuit (314) and then into a second ion exchange column in the acid circuit (316). The mixing tanks associated with the acid circuit are idle (313, 315). While the acid flows through the acid circuit, the ion exchange beads absorb protons while releasing lithium to form a lithium sulfate solution. The resulting lithium sulfate eluate flows into a lithium eluate pipe (317), and is then moved to a conversion plant for processing into battery-grade lithium hydroxide.

The flow rates of the brine circuit, water washing circuit, and acid circuit are coordinated for an interchange event, which is marked by the switching of values to redirect flows through the system. During the interchange event, the first column in the brine circuit is interchanged to the water washing circuit, the column in the water washing circuit is interchanged to the acid circuit, and the first column in the acid circuit is interchanged to the brine circuit.

As the brine flows through the brine circuit, lithium is absorbed into the ion exchange beads in the ion exchange columns. The first ion exchange column in the brine circuit becomes saturated with lithium first, and then this first column is interchanged to the water washing circuit. As acid solution flows through the acid circuit, lithium is released from the ion exchange beads in the ion exchange columns. The first ion exchange column in the acid circuit becomes saturated with protons first, and then this first column is interchanged to the end of the brine circuit. Residual acid in the ion exchange column at the end of the brine circuit is washed out by the brine and is pH neutralized prior to disposal.

After the interchange event, the brine circuit is comprised of three ion exchange columns (320, 322, 324) and three mixing tanks for base addition (319, 321, 323). The acid circuit is comprised of two ion exchange columns (331, 333). The mixing tanks associated with the acid circuit are idle (330, 332). The water washing circuit is comprised of one ion exchange column (328). After the interchange event, the brine pipe (318), water pipe (326), acid tank (329), disposal pipe (325), and lithium eluate pipe (324) are interchanged to the new circuits using valves.

In alternative versions of this example, the brine circuit is optionally comprised of fifty or more ion exchange columns with associated base mixing tanks for each column. This large number of ion exchange columns and mixing tanks enables high lithium recoveries from brines with concentrations of lithium above 50 ppm, while maintaining the pH of the brine in the range of 4-8. Such a large number of ion exchange columns is difficult to illustrate, and so a brine circuit with only three columns is used in this example to facilitate the description and illustration.

Figure 4:
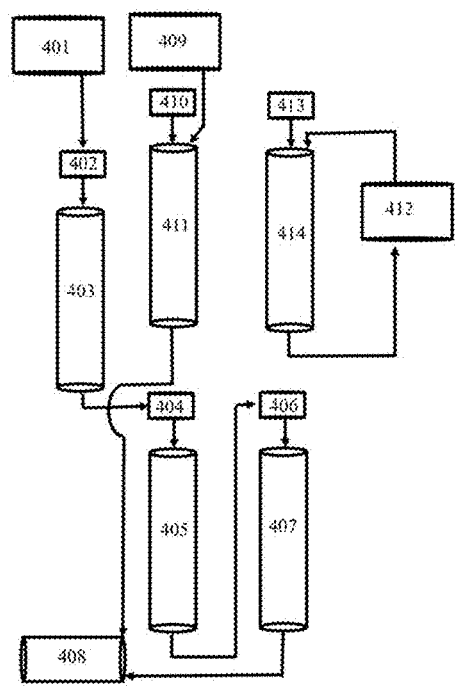
FIG. 4 illustrates a column interchange system comprising a brine circuit, a water washing circuit, and an acid recirculation loop.

Example 6: Lithium Extraction Using Column Interchange System with Brine Circuit, Acid Recirculating Loop, and Water Washing Circuit Lithium is extracted from a brine using a column interchange system (FIG. 4) comprising five ion exchange columns, which are divided into a brine circuit, a water washing circuit, and an acid recirculating loop. The brine is a natural aqueous chloride solution containing approximately 50 ppm Li, 40,000 ppm Na, 30,000 ppm Ca, and 3,000 ppm Mg. The ion exchange columns are loaded with packed beds of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

Each of the five ion exchange columns is 150 cm tall and 75 cm in diameter (403, 405, 407, 411, 414). Each ion exchange column has an associated mixing tank for mixing base into brine before the brine is injected into the column (402, 404, 406, 410, 413). Three of the columns (403, 405, 407) along with the associated mixing tanks (402, 404, 406) are linked to form a brine circuit. Brine flows from a brine pipe (401) through a first mixing tank (402), a first ion exchange column (403), a second mixing tank (404), a second ion exchange column (405), a third mixing tank (406), a third ion exchange column (407), and then into a disposal pipe (408). For the mixing tanks in the brine circuit (403, 405, 407), an aqueous base solution of NaOH is added to increase the pH of the brine to 7.5. The pH of the brine is monitored before and after each mixing tank in the brine circuit to control the rate of addition of aqueous base solution. In the first mixing tank (402) in the brine circuit, the brine enters the mixing tank from the brine pipe at a pH of 6.5 and a relatively small amount of base is added. In the other mixing tanks in the brine circuit (404, 406), the brine enters the mixing tank from the outlet of prior ion exchange columns at a pH of 3.5, and a relatively larger amount of base is added to neutralize the protons that are released by the prior ion exchange columns.

The water washing circuit involves pumping water from a water pipe (409), through an ion exchange column that is saturated with lithium (411), and then the water is pumped into a disposal pipe. This water washing circuit removes residual brine from the column to prepare for acid elution with minimal impurities.

The acid recirculating loops comprises one ion exchange column (414) and an acid recirculation tank (412). The tank is loaded with 1.0 M HCl acid, which is pumped into the ion exchange column, then back into the tank, then recirculated through the column. As the acid solution flows through the column, the ion exchange beads absorb protons while releasing lithium. Over time, the acid solution is converted into a lithium chloride eluate. The mixing tanks associated with the ion exchange column are idle (413). The resulting lithium chloride eluate is then pH neutralized, concentrated through reverse osmosis, polished to remove trace amounts of divalent ions, and processed through carbonation to yield a battery-grade lithium carbonate powder.

The flow rates of the brine circuit, water washing circuit, and acid recirculation loop are coordinated for an interchange event, which is marked by the switching of values to redirect flows through the system. During the interchange event, the first column in the brine circuit is interchanged to the water washing circuit, the column in the water washing circuit is interchanged to the acid recirculation loop, and the column in the acid circulation loop is interchanged to the brine circuit.

As the brine flows through the brine circuit, lithium is absorbed into the ion exchange beads in the ion exchange columns. The first ion exchange column in the brine circuit becomes saturated with lithium first, and then this first column is interchanged to the water washing circuit. The ion exchange column in the acid recirculation loop becomes saturated with protons, and then this column is interchanged to the end of the brine circuit. Residual acid in the ion exchange column at the end of the brine circuit is washed out by the brine and is pH neutralized prior to disposal.

After the interchange event, the brine pipe (401), water pipe (409), acid tank (412), and disposal pipe (408) are interchanged to the new circuits using valves.

In alternative versions of this example, the brine circuit is optionally comprised of fifty or more ion exchange columns with associated base mixing tanks for each column. This large number of ion exchange columns and mixing tanks enables high lithium recoveries from brines with concentrations of lithium above 50 ppm, while maintaining the pH of the brine in the range of 4-8. Such a large number of ion exchange columns is difficult to illustrate, and so a brine circuit with only three columns is used in this example to facilitate the description and illustration.

Example 7: Lithium Extraction Using Stirred Tank System

Figure 5:
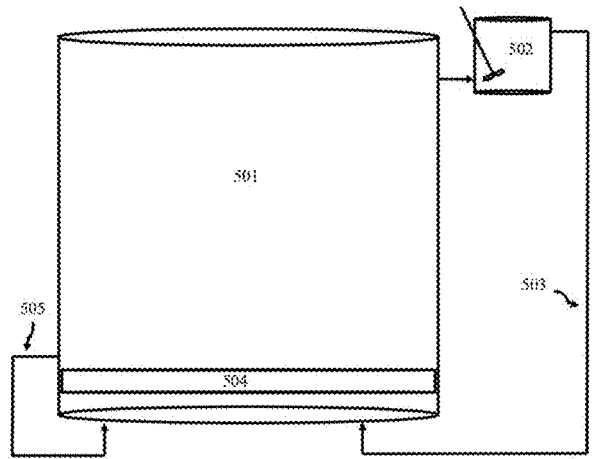
FIG. 5 illustrates a stirred tank system comprising a tank, a base mixing tank, and a permeable compartment for holding ion exchange beads.

Lithium is extracted from a brine using a stirred tank system (FIG. 5) comprising a tank (501), a mixing tank for addition of base (502), a brine recirculation pipe (503), a permeable compartment for supporting ion exchange beads inside the tank (504), and an acid recirculation pipe (505). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

The tank is 3.5 meters tall and 2.5 meters in diameter (501). The permeable compartment for supporting ion exchange beads is mounted inside the tank near the bottom of the tank. The compartment is mounted low enough in the tank so that the compartment will be submerged by the minimum volume of acid needed to elute the lithium from the beads. The compartment containing beads is loaded into the tank with the beads in a lithiated state. 1.0 M HCl acid is then loaded into the tank and recirculated through the acid circulation pipe (505). This acid solution delivers protons to the beads while absorbing lithium from the beads. The acid solution is pumped out of the tank at a point above the compartment, through the acid circulation pipe, and is then reinjected into the bottom of the tank. The acid solution then percolates through the compartment where it contacts the ion exchange beads, eluting lithium from the beads. Once lithium elution has slowed, the resulting lithium concentrate is removed from the system and processed into a battery-grade lithium carbonate product by neutralization, concentration using reverse osmosis, carbonation, and recrystallization.

Water is loaded into the tank and recirculated through the acid circulation pipe to wash out residual acid.

Brine is loaded into the tank and pumped out of the top of the tank, into the base mixing tank (502). The brine then flows through the brine circulation pipe and is reinjected into the bottom of the tank below the compartment. The brine flows upward through the tank, percolating through the compartment. The brine contacts the ion exchange beads, and the beads absorb lithium out of the brine while release protons. The acidified brine flows upward above the compartment, and is then pumped into the base mixing tank. In the base mixing tank, an aqueous base NaOH solution is added to neutralize the protons released by the beads and maintain the pH of the brine in the range of 6-8. The neutralized brine then flows through the brine recirculation pipe and is recirculated back into the tank for additional lithium uptake. After lithium uptake slows, the spent brine is removed from the tank. The tank is then washed again with water as described previously. Then, the acid step is repeated to yield a lithium chloride eluate. This cycle is repeated to yield lithium eluate, which is processed into battery-grade lithium carbonate.

Example 8: Lithium Extraction Using Ported Ion Exchange Column System

Figure 6:
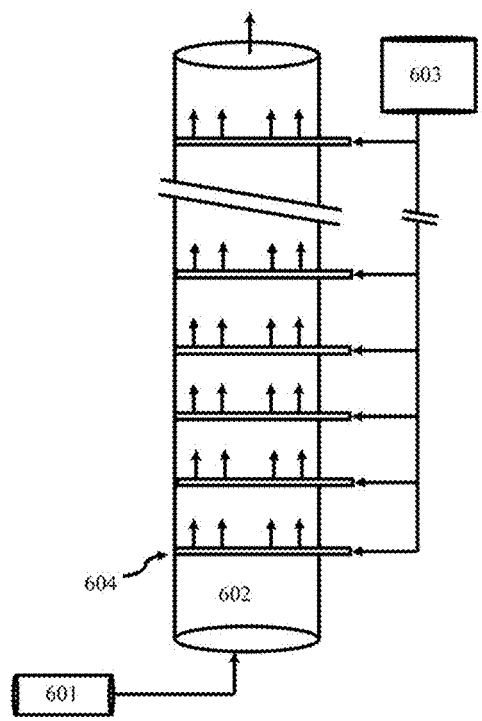
FIG. 6 illustrates a ported ion exchange column system comprising an ion exchange column with multiple ports along the length of the column for injection of base.

Lithium is extracted from a brine using a ported ion exchange column system (FIG. 6) comprising a column (602) with multiple base injection ports (604). The brine is a natural aqueous chloride solution containing approximately 100 ppm Li, 40,000 ppm Na, 30,000 ppm Ca, and 3,000 ppm Mg. The ion exchange column is loaded with a packed bed of porous ion exchange beads. The porous ion exchange beads are comprised of ion exchange particles and a polymer matrix. The ion exchange particles are coated ion exchange particles comprised of a $Li_4Mn_5O_{12}$ core with a $ZrO_2$ coating. The particles are approximately spherical with a mean diameter of 3.0 microns, and the coating thickness is approximately 4.0 nm. The polymer matrix is comprised of polyvinylidene fluoride. The porous beads contain porous networks with a controlled distribution of pore sizes providing diffusion channels from the bead surface into the bead interior and to the ion exchange particles. The beads have a distribution of shapes with a 2.0 mm average diameter.

Ion exchange beads are loaded into the ported ion exchange column system. 1.0 M HCl acid is flowed through the system to elute a lithium chloride eluate. Then, the system is washed with acid to remove residual acid. Brine is flowed into the bottom of the system from a brine pipe (601). As the brine flows through the column, the beads absorb lithium out of the brine and release protons into the brine, acidifying the brine. To maintain the pH of the brine in a pH range of 4-8, an aqueous base solution of NaOH is injected into the base injection ports. As brine first enters the column and contacts fresh beads near the bottom of the column, the ion exchange reaction is fastest near the bottom of the column, and so initially base is injected through the ports at the bottom of the column at a higher rate. As the beads near the bottom of the column saturate, the region of the column with the greatest rate of ion exchange moves upward in the column. To neutralize the protons being release in the brine higher up in the column, base is then injected higher up in the column and base injection near the bottom of the column is slowed and eventually terminated. Base injection at the bottom of the column is terminated to avoid the precipitation of $Mg(OH)_2$ and other basic precipitates in the column in regions where protons are no longer being released at sufficient rates to neutralize the base. As the brine moves upward through the column, pH is maintained in a range of 4-8 while the beads absorb lithium and release protons and while formation of basic precipitations is limited. Once the beads throughout the column are saturated or nearly saturated with lithium, the column is washed with water, and the lithium is eluted with sulfuric acid to form a lithium sulfate eluate. The lithium eluate is then processed into a lithium hydroxide product.

Figure 7:
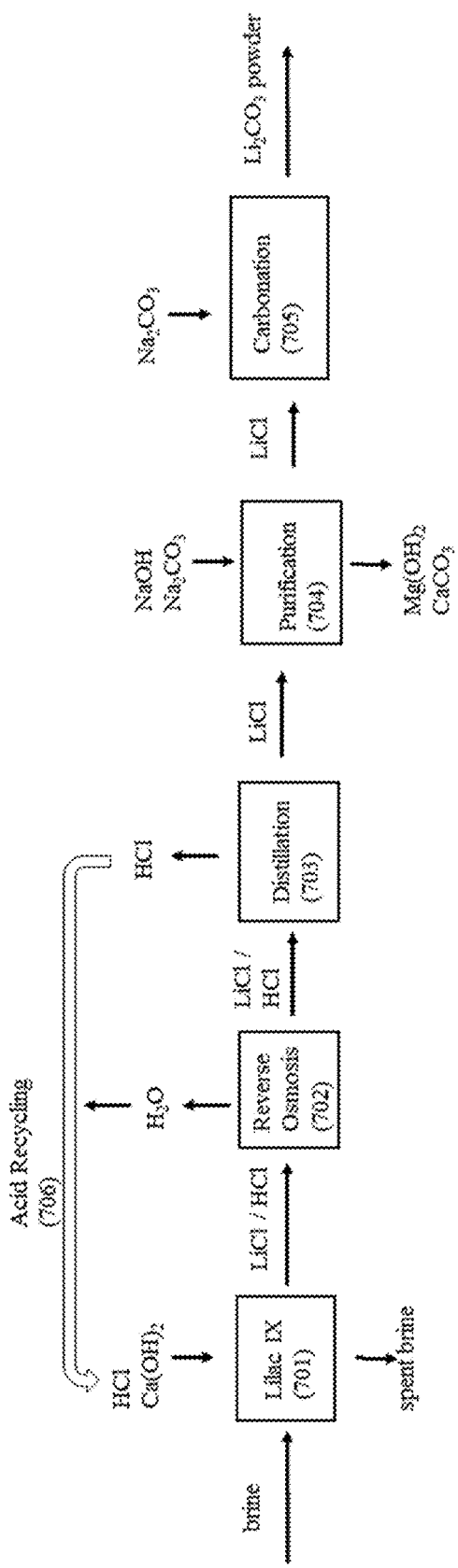
FIG. 7 illustrates an integrated system for producing $Li_2CO_3$ from brine via LiCl using chemical precipitation.

Example 9: Integrated System for Producing $Li_2CO_3$ from Brine Via LiCl $Li_2CO_3$ powder is produced from an integrated system (FIG. 7) comprising an ion exchange system for selective lithium uptake (701), a reverse osmosis system (702), a distillation system (703), a purification system (704), a carbonation system (705), and an acid recycling system (706).

The ion exchange system for selective lithium uptake comprises an ion exchange material and an ion exchange reactor setup. The ion exchange material comprises $Li_4Mn_5O_{12}$ particles that are typically 20-50 microns in diameter with a 10 wt % $SiO_2$ coating to prevent dissolution and degradation of the material. The ion exchange reactor setup comprises a set of 7 stirred tank reactors containing ion exchange material, and these tanks are divided into a brine circuit, a water washing circuit, and an acid elution circuit. The brine circuit is comprised of 4 stirred tank reactors connected in series such that brine flows from a first tank into a next tank and so on until a last brine tank, and as the brine flows through the brine circuit, the ion exchange material in the tanks absorbs lithium out of the brine while releasing hydrogen. $Ca(OH)_2$ base is added as an aqueous slurry to the tanks in the brine circuit to maintain the pH between 4-6. The water washing circuit is comprised of 2 stirred tank reactors connected in series such that water flows from a first water tank into a second water tank, and as the water flows through the water washing circuit, the water removes residual brine and other impurities from the ion exchange material. The acid circuit is comprised of 1 stirred tank reactor, and the ion exchange material in the acid circuit releases lithium while absorbing hydrogen. The tank piping connections are switched between the circuits so that the first tank in the brine circuit becomes the last tank in the water washing circuit, the first tank in the water washing circuit becomes the last tank in the acid elution circuit, and the first tank in the acid elution circuit becomes the last tank in the brine circuit. The brine contains 180 mg/L Li, 70,000 mg/L Na, 20,000 mg/L Ca, and 3,000 mg/L Mg. HCl acid is added to the acid tank to elute a lithium chloride solution. The solution exiting the acid circuit is a lithium eluate solution containing about 6,000 mg/L Li and containing impurities such as Na, Mg, Ca, and other impurities totaling around 1,000 mg/L.

The reverse osmosis system is used to remove water from the lithium eluate solution. The permeate from the reverse osmosis system is water with trace amounts of HCl. The retentate contains a concentrated lithium solution with a lithium concentration around 40,000 mg/L.

The distillation system is used to remove remaining HCl from the lithium eluate solution. The distillation system heats the lithium eluate solution to generate HCl vapor and uses an absorption column to recapture the HCl in aqueous solution.

The acid recycling system (706) uses the HCl solution from the distillation system in combination with the permeate from the reverse osmosis system to generate aqueous HCl acid, which is reused for acid elution in the ion exchange system for selective lithium uptake.

The purification system is used to remove divalent and multivalent impurities through addition of sodium hydroxide and sodium carbonate. Sodium hydroxide is added to precipitate $Mg(OH)_2$ and other impurities. Sodium carbonate is added to precipitate $CaCO_3$ and other impurities.

The carbonation system is used to precipitate $Li_2CO_3$ solids from the concentrated purified lithium salt solution through addition of $Na_2CO_3$. The $Li_2CO_3$ solids are separated and purified through a recrystallization process wherein the $Li_2CO_3$ is redissolved in water in the presence of $CO_2$ to form $LiHCO_3$ and then $Li_2CO_3$ is recrystallized by heating the solution to release the $CO_2$. The $CO_2$ is captured and recycled. The final $Li_2CO_3$ product has a purity exceeding 99%.

Figure 8:
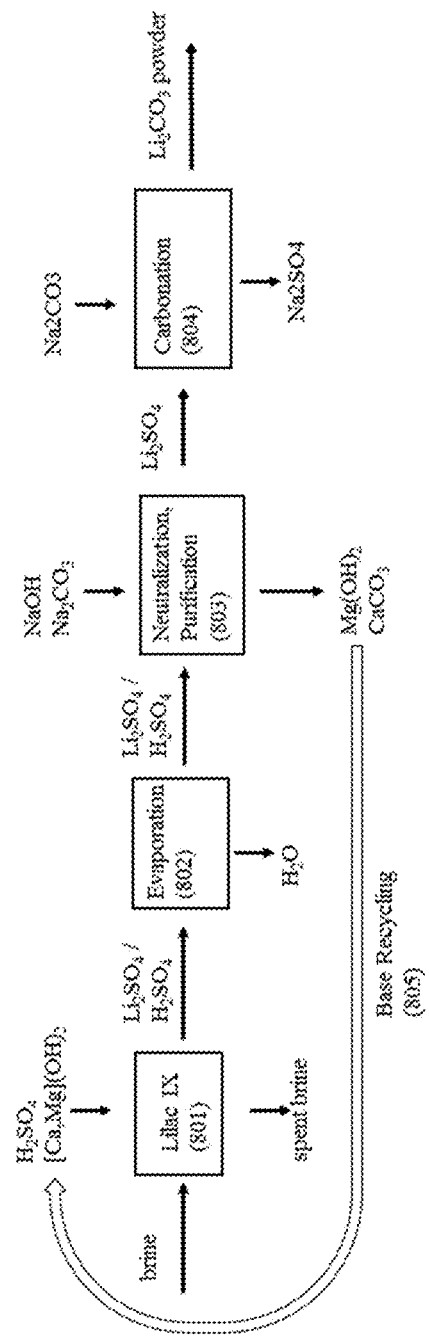
FIG. 8 illustrates an integrated system for producing $Li_2CO_3$ from brine via $Li_2SO_4$ using chemical precipitation.

Example 10: Integrated System for Producing $Li_2CO_3$ from Brine via $Li_2SO_4$ $Li_2CO_3$ powder is produced from an integrated system (FIG. 8) comprising an ion exchange system for selective lithium uptake (801), an evaporation system (802), a neutralization and purification system (803), a carbonation system (804), and a base recycling system (805).

The ion exchange system for selective lithium uptake comprises an ion exchange material and an ion exchange reactor setup. The ion exchange material comprises $Li_4Mn_5O_{12}$ particles that are typically 25-35 microns in diameter with a 3 wt % $ZrO_2$ coating to prevent dissolution and degradation of the material. The ion exchange reactor setup comprises a set of 20 stirred tank reactors containing ion exchange material. Each tank is operated through a cycle of brine, water, and acid steps. During the brine step, the ion exchange material is mixed with brine and $Ca(OH)_2$ base is added as a water-based slurry to the tanks in the brine circuit to maintain the pH between 4-6. During the water step, the ion exchange material is washed with water to remove residual brine. During the acid step, the ion exchange material is treated with acid to elute lithium ions from the material, while the material absorbs hydrogen ions. The brine contains 300 mg/L Li, 50,000 mg/L Na, 30,000 mg/L Ca, and 10,000 mg/L Mg. The acid is 0.75 M $H_2SO_4$. The solution exiting the acid circuit is a lithium eluate solution based on sulfate anions containing 6,000 mg/L Li and total impurities such as Na, Mg, Ca, and other impurities totaling around 1,200 mg/L.

The evaporation system uses heat to remove water from the lithium eluate solution to increase the concentration of lithium. The concentrated lithium solution contains approximately 12,000 mg/L Li. The increased concentration of lithium facilitates removal of impurities.

The neutralization and purification system uses NaOH to neutralize residual acid in the lithium eluate solution. Additional NaOH is added to precipitate $Mg(OH)_2$ and other impurities. $Na_2CO_3$ is added to precipitate $CaCO_3$ and other impurities.

The carbonation system produces $Li_2CO_3$ from the lithium sulfate solution. $Li_2CO_3$ is precipitated in a first step by addition of an aqueous solution of $Na_2CO_3$ to the lithium sulfate solution at 95 degrees Celsius. The amount of $Na_2CO_3$ added in the first step is limited to avoid precipitation of $Na_2SO_4$ during $Li_2CO_3$ precipitation. In the first precipitation step, lithium recovery is approximately 85%. The remaining solution is concentrated to precipitate $Na_2SO_4$ and additional water and aqueous $Na_2CO_3$ is added to precipitate more $Li_2CO_3$ while avoiding precipitation of $Na_2SO_4$. The $Li_2CO_3$ solids are separated via filtration, re-dissolved in the presence of $CO_2$ through formation of $LiHCO_3$, and recrystallized to yield a $Li_2CO_3$ powder with purity exceeding 99%.

The base recycling system collects the $Mg(OH)_2$ precipitates from the purification system through a filtration unit, and reuses this basic material for pH control in the ion exchange system for selective lithium uptake. An aqueous slurry of the $Mg(OH)_2$ material is added to the stirred tank reactors during lithium uptake from brine to maintain the pH of the brine in the range of 4-7.

Example 11: Integrated System for Producing LiOH from Brine Via $Li_2SO_4$

Figure 9:
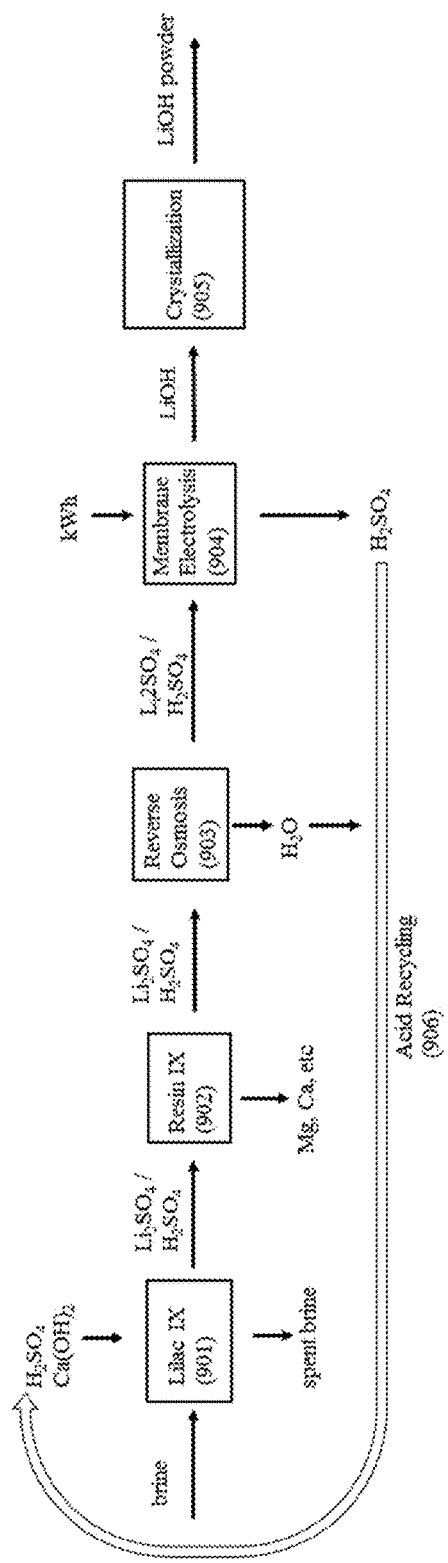
FIG. 9 illustrates an integrated system for producing LiOH from brine via $Li_2SO_4$ using membrane electrolysis.

LiOH powder is produced from an integrated system (FIG. 9) comprising an ion exchange system for selective lithium uptake (901), a resin ion exchange system for impurity removal (902), a reverse osmosis system (903), a membrane electrolysis system (904), a crystallization system (905), and an acid recycling system (906).

The ion exchange system for selective lithium uptake comprises an ion exchange material and an ion exchange reactor setup. The ion exchange material comprises $Li_4Mn_5O_{12}$ particles that are typically 15-45 microns in diameter with a 5 wt % $SiO_2$ coating to prevent dissolution and degradation of the material. The ion exchange reactor setup comprises a set of 6 recirculating batch reactors. Each circulating batch reactor comprises a tank with a compartment that spans the cross section of the tank near the bottom of the tank. The compartment contains the ion exchange material and is loaded into the tank. The compartment contains the ion exchange material but is permeable to flows of liquid solutions. Each batch reactor is filled with brine and the brine is pumped from the top of the tank above the compartment to the bottom of the tank below the compartment. This circulation of brine functions to force the brine through the compartment and into contact with the ion exchange material so that the material can absorb lithium from the brine while releasing hydrogen. An aqueous solution of NaOH base is added to the reactor to neutralize the protons released from the material, maintain the pH of the brine in the range of 5-7, and facilitate the lithium uptake process. After six hours, the brine is drained from the tank, and water is used to wash residual brine from the tank. The water from washing is purified using reverse osmosis and reused. Acid is added to the tank to elute lithium from the ion exchange material producing a lithium eluate solution. The brine contains 80 mg/L Li, 60,000 mg/L Na, 40,000 mg/L Ca, and 5,000 mg/L Mg. The acid is aqueous sulfuric acid in the concentration range of 0.5-2.0 N. The lithium eluate solution contains 3,500 mg/L Li and total impurities such as Na, Mg, Ca, and other impurities totaling around 300 mg/L.

The resin ion exchange system for impurity removal contains sulfonated polystyrene-based polymer beads. The lithium eluate solution is percolated through the beads in a series of columns, and the beads remove Mg, Ca, Mn, and other multi-valent ions from the solution while releasing Na.

The reverse osmosis system is used to remove water from the purified lithium eluate solution. The permeate from the reverse osmosis system is water, which is fed to the acid recycling system. The retentate contains a concentrated lithium sulfate solution with a lithium concentration around 25,000 mg/L with a pH of approximately 0-1.

The membrane electrolysis system takes as input the purified concentrated lithium sulfate solution, a dilute LiOH solution, and an electrical current. The membrane electrolysis system is based on 2-compartment electrolysis cells divided by cation-conducting membranes.

The membrane electrolysis system produces an acidified solution comprising aqueous $H_2SO_4$ with a minority component of $Li_2SO_4$ and an aqueous LiOH solution.

The crystallization system converts the LiOH solution to a LiOH powder by removing water through evaporation. This evaporation and crystallization occurs in a forced circulation evaporator. The purity of the LiOH powder is controlled by removing liquid containing elevated levels of NaOH and KOH during the evaporation process.

The acid recycling system collects the acidified solution from the membrane electrolysis system and collects water from the reverse osmosis system, and produces acid solutions for elution in the ion exchange system for selective lithium uptake.

Example 12: Integrated System for Producing LiOH from Brine Via LiCl

Figure 10:
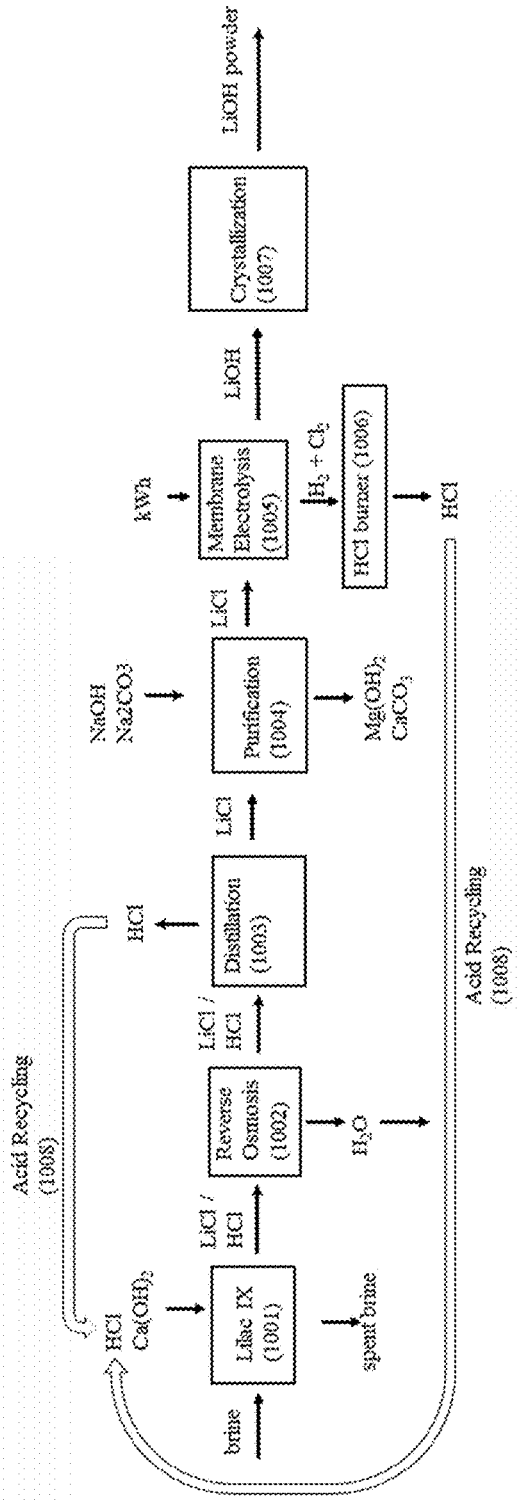
FIG. 10 illustrates an integrated system for producing LiOH from brine via LiCl using membrane electrolysis.

LiOH powder is produced from an integrated system (FIG. 10) comprising an ion exchange system for selective lithium uptake (1001), a reverse osmosis system (1002), an HCl distillation system (1003), a purification system (1004), a membrane electrolysis system (1005), an HCl burner (1006), a crystallizer (1007), and an acid recycling system (1008).

The ion exchange system for selective lithium uptake comprises an ion exchange material and an ion exchange reactor setup. The ion exchange material comprises $Li_4Mn_5O_{12}$ particles. The ion exchange reactor setup comprises a set of 7 stirred tank reactors containing ion exchange material, and these tanks are divided into a brine circuit, a water washing circuit, and an acid elution circuit. The brine circuit is comprised of 4 stirred tank reactors connected in series such that brine flows from a first tank into a next tank and so on until a last brine tank, and as the brine flows through the brine circuit, the ion exchange material in the tanks absorbs lithium out of the brine while releasing hydrogen. $Ca(OH)_2$ base is added as an aqueous slurry to the tanks in the brine circuit to maintain the pH between 4-6. The water washing circuit is comprised of 2 stirred tank reactors connected in series such that water flows from a first water tank into a second water tank, and as the water flows through the water washing circuit, the water removes residual brine and other impurities from the ion exchange material. The acid circuit is comprised of 1 stirred tank reactor, and the ion exchange material in the acid circuit releases lithium while absorbing hydrogen. The tank piping connections are switched between the circuits so that the first tank in the brine circuit becomes the last tank in the water washing circuit, the first tank in the water washing circuit becomes the last tank in the acid elution circuit, and the first tank in the acid elution circuit becomes the last tank in the brine circuit. The brine contains 150 mg/L Li, 60,000 mg/L Na, 30,000 mg/L Ca, and 2,000 mg/L Mg. HCl acid is added to the acid tank to elute a lithium chloride solution. The solution exiting the acid circuit is a lithium eluate solution containing about 4,000 mg/L Li and containing impurities such as Na, Mg, Ca, and other impurities totaling around 1,000 mg/L.

The reverse osmosis system is used to remove water from the lithium eluate solution. The permeate from the reverse osmosis system is water with trace amounts of HCl. The retentate contains a concentrated lithium solution with a lithium concentration around 70,000 mg/L.

The distillation system is used to remove remaining HCl from the lithium eluate solution. The distillation system heats the lithium eluate solution to generate HCl vapor and uses an absorption column to recapture the HCl in aqueous solution.

The purification system is used to remove divalent and multivalent impurities through addition of sodium hydroxide and sodium carbonate. Sodium hydroxide is added to precipitate $Mg(OH)_2$ and other impurities. Sodium carbonate is added to precipitate $CaCO_3$ and other impurities. The solution is then passed through a series of columns containing ion exchange resin that binds multivalent ions while releasing sodium.

The membrane electrolysis system takes as input the purified concentrated lithium chloride solution, a dilute LiOH solution, and an electrical current. The membrane electrolysis system is based on 2-compartment electrolysis cells divided by cation-conducting membranes. The membrane electrolysis system produces $Cl_2$ gas at the electrochemically oxidizing electrode and produces $H_2$ gas at the electrochemically reducing electrode. The compartment containing the electrochemically reducing electrode produces an aqueous LiOH solution. The compartment containing the electrochemically oxidizing electrode produces a dilute solution of LiCl that is reused in the acid eluate solution.

The acid recycling system uses HCl from the distillation system and from the HCl burner in combination with the permeate from the reverse osmosis system and dilute LiCl solution from the membrane electrolysis system to generate aqueous HCl acid containing dilute LiCl, which is reused to elute a lithium eluate solution from ion exchange material in the ion exchange system for selective lithium uptake.

Example 13: Integrated System for Producing LiCl from Brine

Figure 11:
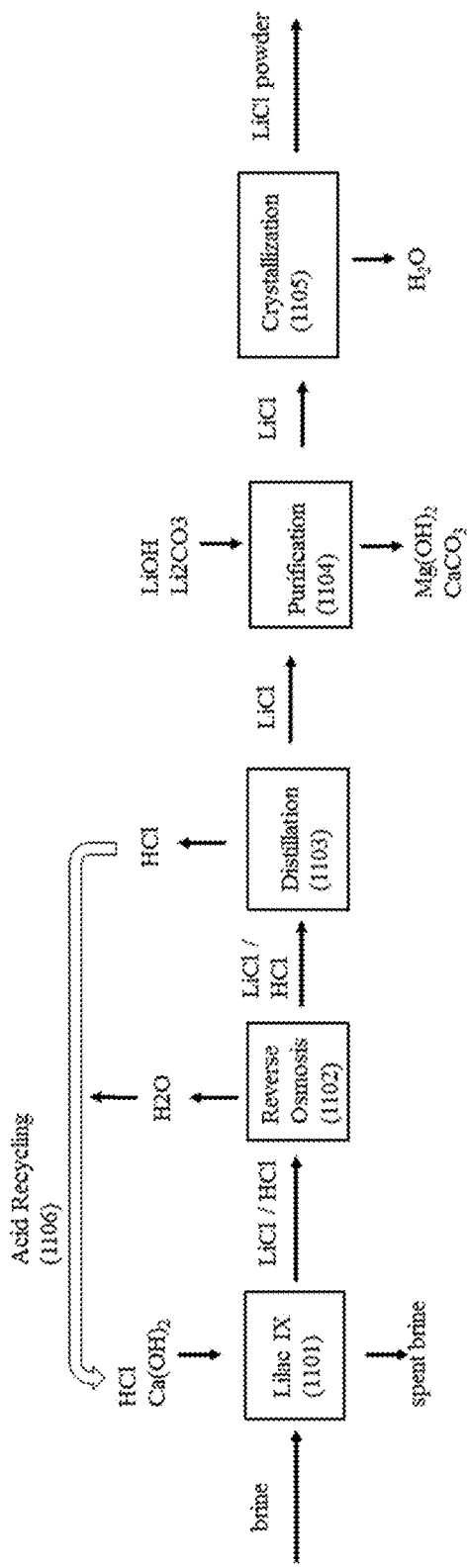
FIG. 11 illustrates an integrated system for producing LiCl from brine using evaporation.

LiCl powder is produced from an integrated system (FIG. 11) comprising an ion exchange system for selective lithium uptake (1101), a reverse osmosis system (1102), an HCl distillation system (1103), a purification system (1104), a crystallization system (1105), and an acid recycling system.

The ion exchange system for selective lithium uptake comprises an ion exchange material and an ion exchange reactor setup. The ion exchange material comprises $Li_4Mn_5O_{12}$ particles that are typically 15-45 microns in diameter. The ion exchange reactor setup comprises a set of 6 recirculating batch reactors. Each circulating batch reactor comprises a tank with a compartment that spans the cross section of the tank near the bottom of the tank. The compartment contains the ion exchange material and is loaded into the tank. The compartment contains the ion exchange material but is permeable to flows of liquid solutions. Each batch reactor is filled with brine and the brine is pumped from the top of the tank above the compartment to the bottom of the tank below the compartment. This circulation of brine functions to force the brine through the compartment and into contact with the ion exchange material so that the material can absorb lithium from the brine while releasing hydrogen. An aqueous slurry of $Ca(OH)_2$ base is added to the reactor to neutralize the protons released from the material, maintain the pH of the brine in the range of 5-7, and facilitate the lithium uptake process. After six hours, the brine is drained from the tank, and water is used to wash residual brine from the tank. Acid is added to the tank to elute lithium from the ion exchange material producing a lithium eluate solution. The brine contains 500 mg/L Li, 70,000 mg/L Na, 10,000 mg/L Ca, and 2,000 mg/L Mg. The acid is aqueous hydrochloric acid in the concentration range of 0.5-2.0 N. The lithium eluate solution contains 4,500 mg/L Li and total impurities such as Na, Mg, Ca, and other impurities totaling around 300 mg/L.

The reverse osmosis system is used to remove water from the lithium eluate solution. The permeate from the reverse osmosis system is water with trace amounts of HCl. The retentate contains a concentrated lithium solution with a lithium concentration around 100,000 mg/L.

The distillation system is used to remove remaining HCl from the lithium eluate solution. The distillation system heats the lithium eluate solution to generate HCl vapor and uses an absorption column to recapture the HCl in aqueous solution.

The purification system is used to remove divalent and multivalent impurities through addition of sodium hydroxide and sodium carbonate. Lithium hydroxide is added to precipitate $Mg(OH)_2$ and other impurities. Lithium carbonate is added to precipitate $CaCO_3$ and other impurities.

The crystallization system uses a draft tube baffle crystallizer to remove water from the concentrated purified lithium chloride solution and precipitate LiCl solids. The solids are dried, ground, packaged, and shipped.

The acid recycling system collects HCl from the distillation system and combines the HCl with water including water from the reverse osmosis system to produce aqueous HCl solutions for elution of lithium eluate solution from the ion exchange system for selective lithium uptake.

Figure 12:
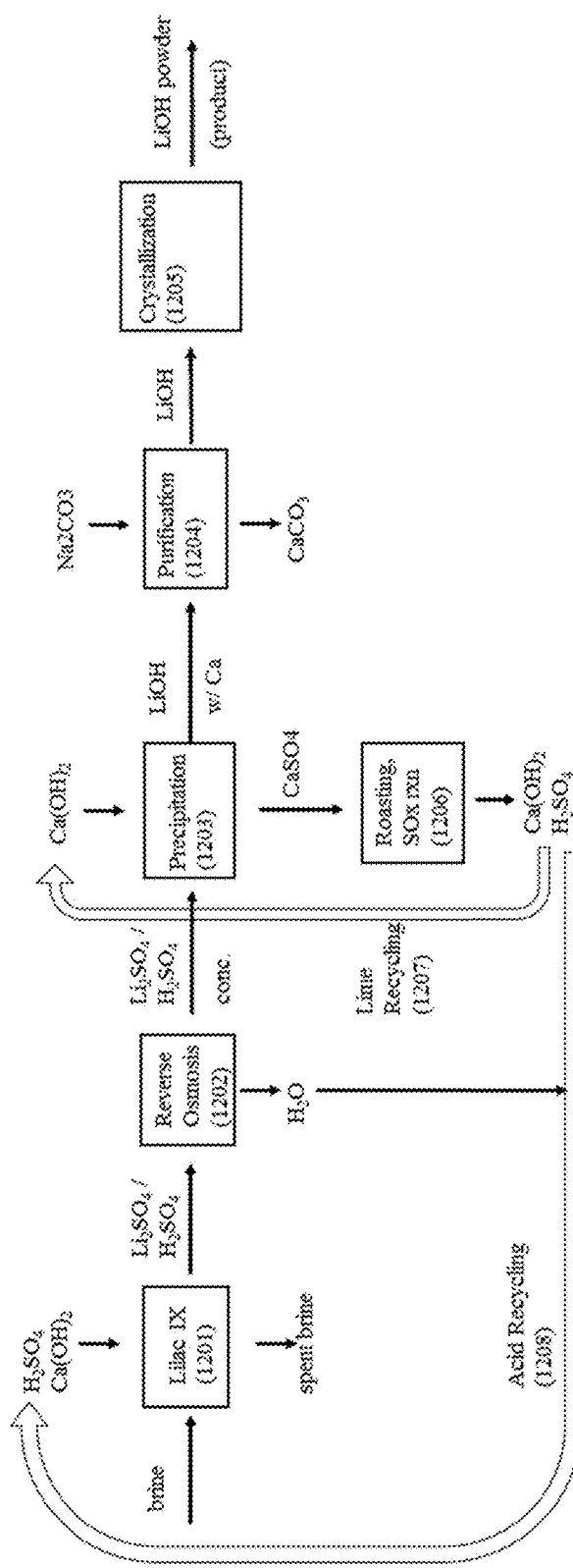
FIG. 12 illustrates an integrated system for producing LiOH from brine via $Li_2SO_4$ using chemical precipitation.

Example 14: Integrated System for Producing LiOH from Brine Via $Li_2SO_4$ and $CaSO_4$ LiOH powder is produced from an integrated system (FIG. 12) comprising an ion exchange system for selective lithium uptake (1201), a reverse osmosis system (1202), a chemical precipitation system (1203), a purification system (1204), a crystallization system (1205), a roasting system (1206), a lime recycling system (1207), and an acid recycling system (1208).

The ion exchange system for selective lithium uptake comprises an ion exchange material and an ion exchange reactor setup. The ion exchange material comprises $Li_4Mn_5O_{12}$ particles that are typically 25-45 microns in diameter with a 8 wt % $SiO_2$ coating to prevent dissolution and degradation of the material. The ion exchange reactor setup comprises a set of 7 stirred tank reactors containing ion exchange material, and these tanks are divided into a brine circuit, a water washing circuit, and an acid elution circuit. The brine circuit is comprised of 4 stirred tank reactors connected in series such that brine flows from a first tank into a next tank and so on until a last brine tank, and as the brine flows through the brine circuit, the ion exchange material in the tanks absorbs lithium out of the brine while releasing hydrogen. $Ca(OH)_2$ base is added as an aqueous slurry to the tanks in the brine circuit to maintain the pH between 4-6. The water washing circuit is comprised of 2 stirred tank reactors connected in series such that water flows from a first water tank into a second water tank, and as the water flows through the water washing circuit, the water removes residual brine and other impurities from the ion exchange material. The acid circuit is comprised of 1 stirred tank reactor, and the ion exchange material in the acid circuit releases lithium while absorbing hydrogen. The tank piping connections are switched between the circuits so that the first tank in the brine circuit becomes the last tank in the water washing circuit, the first tank in the water washing circuit becomes the last tank in the acid elution circuit, and the first tank in the acid elution circuit becomes the last tank in the brine circuit. The brine contains 150 mg/L Li, 60,000 mg/L Na, 30,000 mg/L Ca, and 5,000 mg/L Mg. The acid is aqueous sulfuric acid in the concentration range of 0.5-2.0 N. The lithium eluate solution contains 4,000 mg/L Li and total impurities such as Na, Mg, Ca, and other impurities totaling around 1,200 mg/L.

The reverse osmosis system is used to remove water from the lithium eluate solution. The permeate from the reverse osmosis system is water, which is fed to the acid recycling system. The retentate contains a concentrated lithium sulfate solution with a lithium concentration around 25,000 mg/L with a pH of approximately 0-1.

The chemical precipitation system combines the concentrated lithium sulfate solution with $Ca(OH)_2$ to neutralize the solution and precipitate $CaSO_4$. The lithium sulfate solution is converted to a lithium hydroxide solution.

The purification system processes the lithium hydroxide solution to remove impurities. $Na_2CO_3$ is added to precipitate $CaCO_3$. $CaCO_3$ solids are removed via filtration.

The crystallization system converts the LiOH solution to a LiOH powder by removing water through evaporation. This evaporation and crystallization occurs in a forced circulation evaporator. The purity of the LiOH powder is controlled by removing liquid containing elevated levels of NaOH and KOH during the evaporation process.

The roasting system heats the $CaSO_4$ from the chemical precipitation system to regenerate CaO, which is converted into $Ca(OH)_2$ through a reaction with water at high temperature. This roasting system uses heat and low pressure to evolve $SO_x$ species from the solids. $SO_x$ gas is released during roasting, and this gas is processed to form sulfuric acid.

The lime recycling system collects $Ca(OH)_2$ from the roasting system and forms a $Ca(OH)_2$ slurry suitable for addition to the chemical precipitation system.

The acid recycling system collects sulfuric acid from the roasting system and combines the acid with water from the reverse osmosis system to produces acid solutions for elution in the ion exchange system for selective lithium uptake.

Figure 15:
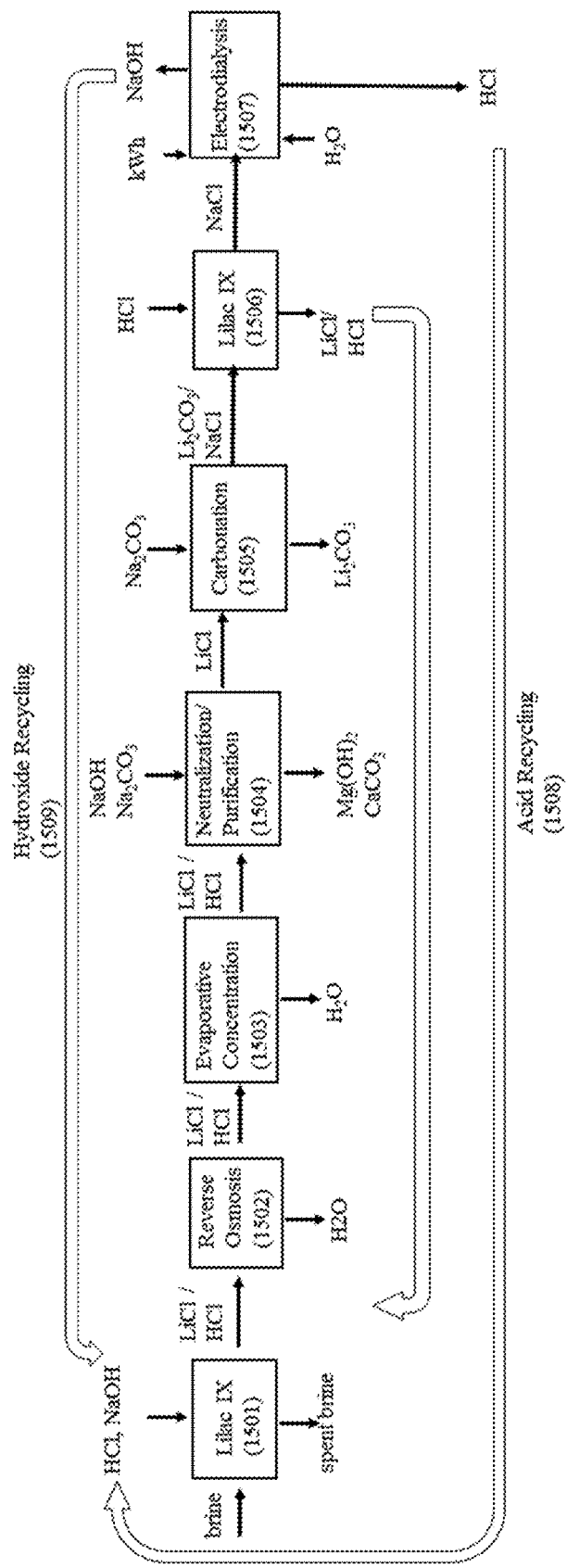
FIG. 15 illustrates an integrated system for producing lithium carbonate with electrodialysis regeneration of HCl and NaOH from a carbonate mother liquor.

Example 15: Integrated System for Producing Lithium Carbonate with Electrodialysis Regeneration of HCl and NaOH from the Carbonate Mother Liquor $Li_2CO_3$ powder is produced from an integrated system (FIG. 15) comprising an ion exchange system for selective lithium uptake (1501), a reverse osmosis system (1502), an evaporative concentrator system (1503), a neutralization and purification system (1504), a carbonation system (1505), a secondary ion exchange system for selective lithium uptake (1506), an electrodialysis system for regeneration of acid and base from the carbonation mother liquor (1507), an acid recycling system (1508), and a hydroxide recycling system (1509).

The ion exchange system for selective lithium uptake (1501) comprises an ion exchange media and an ion exchange reactor setup. The ion exchange media comprises $Li_4Mn_5O_{12}$ particles embedded in a polymer matrix with a media size around 100 microns. The ion exchange reactor setup comprises a set of 100 stirred tank reactors containing ion exchange media, wherein stirring is used to contact the media with alternating flows of brine, water, and acid. When the media is contacted with the brine, the media absorbs lithium from the brine and releases protons. Sodium hydroxide is added to the brine to maintain the pH of the brine in the range of about 4-7. After 85% of the lithium has been recovered from the brine and absorbed into the media, the brine is removed from the tank, and the tank is washed with water to remove residual brine. Then, acid is used to elute lithium with the ion exchange media absorbing protons and releasing lithium ions to produce a lithium eluate solution. The brine contains 200 mg/L Li, 100,000 mg/L Na, 3,000 mg/L Ca, and 2,000 mg/L Mg. The acid is aqueous 1.0 N hydrochloric acid. The lithium eluate solution contains 5,000 mg/L Li and impurities including Na, Mg, and Ca.

The reverse osmosis system (1502) is used to remove water from the lithium eluate solution. The permeate from the reverse osmosis system is water, which is reused in the integrated system. The retentate contains a concentrated lithium chloride solution with a lithium concentration around 15,000 mg/L.

The evaporative concentrator system (1503) is used to remove more water from the lithium eluate solution, and the water is reused in the integrated system. The evaporative concentrator yields a further-concentrated lithium chloride solution with a lithium concentration around 25,000 mg/L.

The neutralization and purification system (1504) combines the further-concentrated lithium chloride solution with NaOH and $Na_2CO_3$ to neutralize the solution and precipitate multivalent cations as hydroxide and carbonate solids such as $CaCO_3$, $Mg(OH)_2$, and other precipitates. The neutralization and purification system further used ion exchange resins to remove trace amounts of Mg, Ca, B, and other impurities from the solution. The product of the neutralization and purification system is a concentrated monovalent chloride solution containing Li, Na, and K.

The carbonation system (1505) is used to convert the lithium in the concentrated monovalent chloride solution into lithium carbonate, which precipitates and is removed from the system as lithium carbonate. Part of the lithium carbonate stream is converted to lithium hydroxide through addition of calcium hydroxide. The other product of the carbonation system is a carbonate mother liquor comprising a chloride solution containing Na, K, and residual Li. The secondary ion exchange system for selective lithium uptake (1506) is used to remove residual Li from the carbonate mother liquor, leaving a mostly Na and K chloride solution.

The electrodialysis system (1507) comprising membrane cells with electrodes is used to convert the carbonate mother liquor into a base stream and an acid stream, using electricity and the carbonate mother liquor as inputs. One product of the electrodialysis system is the acid recycle stream comprising hydrochloric acid solution (1508). One product of the electrodialysis system is a base recycle stream comprising a hydroxide solution (1509).

The base recycle stream is used for base addition to the brine during lithium uptake in the ion exchange system for selective lithium uptake to neutralize protons release from the ion exchange media and adjust the pH to the range of about 4-7. The acid recycle stream is used in the ion exchange system for selective lithium uptake and secondary ion exchange system for selective lithium uptake to elute lithium from the ion exchange media and for other purposes.

The acid recycle stream is also used to regenerate cation-exchanging ion exchange resins used in a purification circuit.

Figure 16:
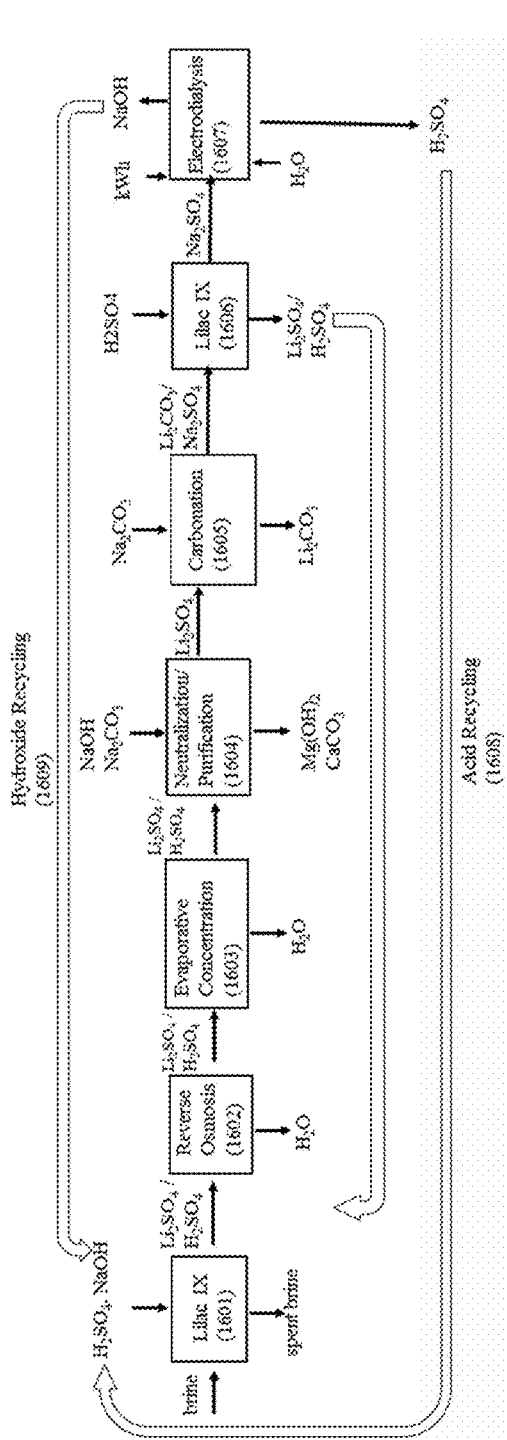
FIG. 16 illustrates an integrated system for producing lithium carbonate with electrodialysis regeneration of $H_2SO_4$ and NaOH from a carbonate mother liquor.

Example 16: Integrated System for Producing Lithium Carbonate with Electrodialysis Regeneration of $H_2SO_4$ and NaOH from the Carbonate Mother Liquor $Li_2CO_3$ powder is produced from an integrated system (FIG. 16) comprising an ion exchange system for selective lithium uptake (1601), a reverse osmosis system (1602), an evaporative concentrator system (1603), a neutralization and purification system (1604), a carbonation system (1605), a secondary ion exchange system for selective lithium uptake (1606), an electrodialysis system for regeneration of acid and base from the carbonation mother liquor (1607), an acid recycling system (1608), and a hydroxide recycling system (1609).

The ion exchange system for selective lithium uptake (1601) comprises an ion exchange media and an ion exchange reactor setup. The ion exchange media comprises $Li_4Mn_5O_{12}$ particles with a protective coating to prevent dissolution and degradation of the particles. The ion exchange reactor setup comprises a set of 50 stirred tank reactors containing ion exchange media, wherein stirring is used to contact the media with alternating flows of brine, water, and acid. When the media is contacted with the brine, the media absorbs lithium from the brine and releases protons. Sodium hydroxide is added to the brine to maintain the pH of the brine in the range of about 4-7. After 85% of the lithium has been recovered from the brine and absorbed into the media, the brine is removed from the tank, and the tank is washed with water to remove residual brine. Then, acid is used to elute lithium with the ion exchange media absorbing protons and releasing lithium ions to produce a lithium eluate solution. The brine contains 200 mg/L Li, 100,000 mg/L Na, 3,000 mg/L Ca, and 2,000 mg/L Mg. The acid is aqueous 1.0 N sulfuric acid. The lithium eluate solution contains 5,000 mg/L Li and impurities including Na, Mg, and Ca.

The reverse osmosis system (1602) is used to remove water from the lithium eluate solution. The permeate from the reverse osmosis system is water, which is reused in the integrated system. The retentate contains a concentrated lithium sulfate solution with a lithium concentration around 15,000 mg/L.

The evaporative concentrator system (1603) is used to remove more water from the lithium eluate solution, and the water is reused in the integrated system. The evaporative concentrator yields a further-concentrated lithium sulfate solution with a lithium concentration around 25,000 mg/L.

The neutralization and purification system (1604) combines the further-concentrated lithium chloride solution with NaOH and $Na_2CO_3$ to neutralize the solution and precipitate multivalent cations as hydroxide and carbonate solids such as $CaCO_3$, $Mg(OH)_2$, and other precipitates. The neutralization and purification system further used ion exchange resins to remove trace amounts of Mg, Ca, B, and other impurities from the solution. The product of the neutralization and purification system is a concentrated monovalent chloride solution containing Li, Na, and K.

The carbonation system (1605) is used to convert the lithium in the concentrated monovalent sulfate solution into lithium carbonate, which precipitates and is removed from the system as lithium carbonate. Part of the lithium carbonate stream is converted to lithium hydroxide through addition of calcium hydroxide. The other product of the carbonation system is a carbonate mother liquor comprising a sulfate solution containing Na, K, and residual Li. The secondary ion exchange system for selective lithium uptake (1606) is used to remove residual Li from the carbonate mother liquor, leaving a mostly Na and K sulfate solution.

The electrodialysis system (1607) comprising membrane cells with electrodes is used to convert the carbonate mother liquor into a base stream and an acid stream, using electricity and the carbonate mother liquor as inputs. One product of the electrodialysis system is the acid recycle stream comprising hydrochloric acid solution (1608). One product of the electrodialysis system is a base recycle stream comprising a hydroxide solution (1609).

The base recycle stream is used for base addition to the brine during lithium uptake in the ion exchange system for selective lithium uptake to neutralize protons release from the ion exchange media and adjust the pH to the range of about 4-7. The acid recycle stream is used in the ion exchange system for selective lithium uptake and secondary ion exchange system for selective lithium uptake to elute lithium from the ion exchange media and for other purposes. The acid recycle stream is also used to regenerate cation-exchanging ion exchange resins used in a purification circuit.

Figure 17:
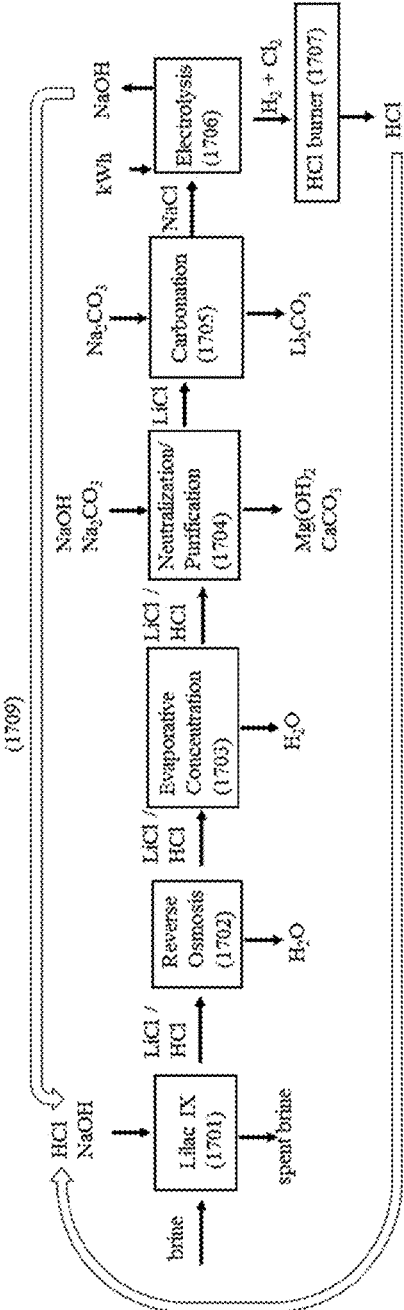
FIG. 17 illustrates an integrated system for producing lithium carbonate with electrolysis regeneration of HCl and NaOH from a carbonate mother liquor.

Example 17: Integrated System for Producing Lithium Carbonate with Electrolysis Regeneration of HCl and NaOH from the Carbonate Mother Liquor $Li_2CO_3$ powder is produced from an integrated system (FIG. 17) comprising an ion exchange system for selective lithium uptake (1701), a reverse osmosis system (1702), an evaporative concentrator system (1703), a neutralization and purification system (1704), a carbonation system (1705), an electrolysis system for regeneration of acid and base from the carbonation mother liquor (1706), an HCl burner (1707), an acid recycling system (1708), and a hydroxide recycling system (1709).

The ion exchange system for selective lithium uptake (1701) comprises an ion exchange media and an ion exchange reactor setup. The ion exchange media comprises $Li_4Mn_5O_{12}$ particles embedded in a polymer matrix with a media size around 100 microns. The ion exchange reactor setup comprises a set of 100 stirred tank reactors containing ion exchange media, wherein stirring is used to contact the media with alternating flows of brine, water, and acid. When the media is contacted with the brine, the media absorbs lithium from the brine and releases protons. Sodium hydroxide is added to the brine to maintain the pH of the brine in the range of about 4-7. After 85% of the lithium has been recovered from the brine and absorbed into the media, the brine is removed from the tank, and the tank is washed with water to remove residual brine. Then, acid is used to elute lithium with the ion exchange media absorbing protons and releasing lithium ions to produce a lithium eluate solution.

The brine contains 200 mg/L Li, 100,000 mg/L Na, 3,000 mg/L Ca, and 2,000 mg/L Mg. The acid is aqueous 1.0 N hydrochloric acid. The lithium eluate solution contains 5,000 mg/L Li and impurities including Na, Mg, and Ca.

The reverse osmosis system (1702) is used to remove water from the lithium eluate solution. The permeate from the reverse osmosis system is water, which is reused in the integrated system. The retentate contains a concentrated lithium chloride solution with a lithium concentration around 15,000 mg/L.

The evaporative concentrator system (1703) is used to remove more water from the lithium eluate solution, and the water is reused in the integrated system. The evaporative concentrator yields a further-concentrated lithium chloride solution with a lithium concentration around 25,000 mg/L.

The neutralization and purification (1704) system combines the further-concentrated lithium chloride solution with NaOH and $Na_2CO_3$ to neutralize the solution and precipitate multivalent cations as hydroxide and carbonate solids such as $CaCO_3$, $Mg(OH)_2$, and other precipitates. The product of the chemical precipitation system is a concentrated monovalent chloride solution containing Li, Na, and K.

The carbonation system (1705) is used to convert the lithium in the concentrated monovalent chloride solution into lithium carbonate, which precipitates and is removed from the system as lithium carbonate. Part of the lithium carbonate stream is converted to lithium hydroxide through addition of calcium hydroxide. The other product of the carbonation system is a carbonate mother liquor comprising a chloride solution containing Na, K, and residual Li.

The electrolysis system (1706) takes as input the carbonate mother liquor, a NaCl, LiCl, KCl solution, and an electrical current. The membrane electrolysis system produces $Cl_2$ gas at the electrochemically oxidizing electrode and produces $H_2$ gas at the electrochemically reducing electrode. An alkali hydroxide solution is also produced, which is fed to the hydroxide recycling systems (1709)

The HCl burner (1707) takes as an input the $Cl_2$ and $H_2$ streams from electrolysis combined with water to produce a hydrochloric acid solution, which is fed to the acid recycling system (1708).

The base recycle stream is used for base addition to the brine during lithium uptake in the ion exchange system for selective lithium uptake to neutralize protons release from the ion exchange media and adjust the pH to the range of about 4-7. The base recycle stream is also used for neutralization and purification of the lithium eluate solution. The acid recycle stream is used in the ion exchange system for selective lithium uptake and secondary ion exchange system for selective lithium uptake to elute lithium from the ion exchange media and for other purposes. The acid recycle stream is also used to regenerate cation-exchanging ion exchange resins used in a purification circuit.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein is optionally employed in practicing the invention. It is intended that the following claims define the scope of the invention and that methods and structures within the scope of these claims and their equivalents be covered thereby.

What is claimed is:

1. An integrated process for generating a lithium salt from a liquid resource, comprising:
   (a) providing an ion exchange unit, wherein said ion exchange unit comprises ion exchange particles comprising hydrogen ions;
   (b) contacting said ion exchange particles in said ion exchange unit with said liquid resource, wherein hydrogen ions from said ion exchange particles are exchanged with lithium ions from said liquid resource to produce lithium-enriched ion exchange particles in said ion exchange unit;
   (c) treating said lithium-enriched ion exchange particles with an acid solution, wherein lithium ions from said lithium-enriched ion exchange particles are exchanged with hydrogen ions from said acid solution to produce a lithium eluate;
   (d) optionally providing a first crystallizer to treat said lithium eluate of step (c) with a precipitant to precipitate said lithium salt and create a residual eluate;
   (e) providing an electrolysis system in fluid communication with said ion exchange unit or in fluid communication with said first crystallizer, wherein said electrolysis system comprises (A) one or more electrochemically reducing electrodes, (B) one or more electrochemically oxidizing electrodes, and (C) one or more ion-conducting membranes;
   (f) (i) passing said lithium eluate from step (c) to said electrolysis system, or
       (ii) passing said residual eluate from step (d) to said electrolysis system;
   (g) (i) subjecting said lithium eluate from step (c) in said electrolysis system of step (e) to an electric current, wherein said electric current causes electrolysis of said lithium eluate from step (c) to produce an acidified solution and a lithium salt solution, or
       (ii) subjecting said residual eluate from step (d) to said electrolysis system of step (e) to an electric current, wherein said electric current causes electrolysis of said residual eluate to produce an acidified solution and a basified solution; and
   (h) optionally providing a second crystallizer to crystallize said lithium salt solution of step (g)(i) to form said lithium salt;
   wherein said ion exchange particles comprise coated ion exchange particles and said coated ion exchange particles comprise an ion exchange material and a coating material comprising a chloro-polymer, a fluoro-polymer, a chloro-fluoro-polymer, a hydrophilic polymer, a hydrophobic polymer, co-polymers thereof, mixtures thereof, or combinations thereof.

2. The integrated process of claim 1, wherein step (b) further comprises pH modulation, wherein said pH modulation maintains an equilibrium in favor of hydrogen ions from said hydrogen-rich ion exchange particles being exchanged with lithium ions from said liquid resource.

3. The integrated process of claim 2, wherein said basified solution of step (g)(ii) is cycled back into the ion exchange unit of step (b) for pH modulation.

4. The integrated process of claim 1, wherein said acidified solution of step (g)(i) is cycled back into the ion exchange unit of step (c) to produce said lithium eluate.

5. The integrated process of claim 1, wherein said acidified solution of step (g)(ii) is cycled back into the ion exchange unit of step (c) to produce said lithium eluate.

6. The integrated process of claim 1, wherein said lithium salt is lithium carbonate, lithium bicarbonate, lithium hydroxide, lithium chloride, lithium bromide, lithium sulfate, lithium bisulfate, lithium phosphate, lithium hydrogen phosphate, lithium dihydrogen phosphate, or lithium nitrate.

7. The integrated process of claim 1, wherein said liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

8. The integrated process of claim 1, wherein said ion exchange particles further comprise uncoated ion exchange particles and said uncoated ion exchange particles comprise an ion exchange material.

9. The integrated process of claim 8, wherein said ion exchange material of said coated ion exchange particles and said ion exchange material of said uncoated ion exchange particles are independently selected from the group consisting of $LiFePO_4$, $LiMnPO_4$, $Li_2TiO_3$, $Li_2MnO_3$, $Li_2SnO_3$, $Li_4Ti_5O_{12}$, $Li_4Mn_5O_{12}$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $Li_2CuP_2O_7$, $Al(OH)_3$, $LiCl.xAl(OH)_3.yH_2O$, $SnO_2.xSb_2O_5.yH_2O$, $TiO_2.xSb_2O_5.yH_2O$, solid solutions thereof, and combinations thereof; wherein x is from 0.1-10 and y is from 0.1-10.

10. The integrated process of claim 1, wherein said one or more ion-conducting membranes are one or more cation-conducting membranes or one or more anion-conducting membranes.

11. The integrated process of claim 10, wherein said one or more cation-conducting membranes or said one or more anion-conducting membranes comprise sulfonated tetrafluoroethylene-based fluoropolymer-copolymer, sulfonated tetrafluoroethylene, sulfonated fluoropolymer, sulfonated styrene-divinylbenzene polymer, co-polymers thereof, or combinations thereof.

12. The integrated process of claim 10, wherein said one or more anion-conducting membranes comprise a functionalized polymer structure.

13. The integrated process of claim 1, wherein said polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof.

14. The integrated process of claim 1, wherein said one or more ion-conducting membranes have a thickness from about 1 μm to about 1000 μm.

15. The integrated process of claim 1, wherein said one or more ion-conducting membranes have a thickness from about 1 mm to about 10 mm.

16. The integrated process of claim 1, wherein said one or more electrochemically reducing electrodes and said one or more electrochemically oxidizing electrodes are comprised of titanium, niobium, zirconium, tantalum, magnesium, titanium dioxide, oxides thereof, or combinations thereof.

17. The integrated process of claim 16, wherein said one or more electrochemically reducing electrodes and said one or more electrochemically oxidizing electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof.

18. The integrated process of claim 1, wherein said electrolysis system comprises one or more electrochemical cells, one or more electrodialysis cells, or combinations thereof.

19. The integrated process of claim 1, wherein said electrolysis system further produces one or more gases that are processed into said acidified solution.

20. The integrated process of claim 1, wherein said electrolysis system further produces one or more gases that are combusted to generate heat.

\* \* \* \* \*